(12) United States Patent
Accogli et al.

(10) Patent No.: US 12,555,813 B2
(45) Date of Patent: Feb. 17, 2026

(54) ENVIRONMENTALLY FRIENDLY ZINC/AQUEOUS POLYSULFIDE RECHARGEABLE FLOW BATTERY WITH HIGH ENERGY EFFICIENCY

(71) Applicant: Politecnico di Milano, Milan (IT)

(72) Inventors: Alessandra Accogli, Diso (IT); Matteo Salerno, Saronno (IT); Gabriele Panzeri, Cornate d'Adda (IT); Luca Bertoli, Brescia (IT); Eugenio Gibertini, Cusago (IT); Luca Magagnin, Rho (IT)

(73) Assignee: Politecnico di Milano

( * ) Notice: Subject to any disclaimer, the term of this patent is extended or adjusted under 35 U.S.C. 154(b) by 573 days.

(21) Appl. No.: 17/924,399

(22) PCT Filed: May 14, 2021

(86) PCT No.: PCT/EP2021/062896
§ 371 (c)(1),
(2) Date: Nov. 10, 2022

(87) PCT Pub. No.: WO2021/229087
PCT Pub. Date: Nov. 18, 2021

(65) Prior Publication Data
US 2023/0187675 A1 Jun. 15, 2023

(30) Foreign Application Priority Data
May 15, 2020 (IT) .................. 102020000011263

(51) Int. Cl.
*H01M 8/18* (2006.01)
*H01M 8/0239* (2016.01)
*H01M 8/0245* (2016.01)

(52) U.S. Cl.
CPC ......... *H01M 8/188* (2013.01); *H01M 8/0239* (2013.01); *H01M 8/0245* (2013.01)

(58) Field of Classification Search
CPC .. H01M 8/0239; H01M 8/0245; H01M 8/188; Y02E 60/50
See application file for complete search history.

(56) References Cited

U.S. PATENT DOCUMENTS

2013/0122344 A1    5/2013  Visco et al.
2020/0006796 A1    1/2020  Su et al.

FOREIGN PATENT DOCUMENTS

JP         2014170715 A   *  9/2014
WO    WO-2018098451 A1   *  5/2018  ........... C25B 11/051

OTHER PUBLICATIONS

Machine translation JP2014170715A (Year: 2014).*
(Continued)

*Primary Examiner* — Victoria H Lynch
(74) *Attorney, Agent, or Firm* — RANKIN, HILL & CLARK LLP; Erik J. Overberger

(57) ABSTRACT

The present invention relates to a zinc/aqueous polysulfide rechargeable flow battery (100) made of
a first half-cell (110) comprising a first electrolyte (114) containing a source of $Zn^{2+}$ ions and a static (112) or flowable electrode disposed within the first half-cell, said first half-cell being connected in a closed-loop configuration through a first pump (116) to a first external tank (115) containing the first electrolyte;
a second half-cell (120) comprising a second electrolyte (124) in which polysulfides are dissolved and a static (122) or flowable electrode disposed within the second half-cell, said second half-cell being connected in a closed-loop configuration through a second pump (126) to a second external tank (125) containing the second electrolyte; and (Continued)

a catalyst in the second half-cell, on the surface of a static electrode or dispersed in form of particles in the second electrolyte; and a separator (130) between the two half-cells.

The rechargeable flow battery of the invention avoids the use of toxic or environmentally harmful chemicals.

19 Claims, 39 Drawing Sheets

(56) References Cited

OTHER PUBLICATIONS

Search Report and Written Opinion dated May 11, 2021; Application No. PCT/EP2021/062896; 11 pages.

Frank Y. Fan et al: "Polysulfide Flow Batteries Enabled by Percolating Nanoscale Conductor Networks", Nano Letters; vol. 14, No. 4; Apr. 9, 2014 ; pp. 2210-2218.

Martha M. Gross et al: "A Rechargeable Zinc-Aqueous Polysulfide Battery with a Mediator-Ion Solid Electrolyte"; ACS Applied Materials & Interfaces, vol. 10, No. 13, Mar. 21, 2018, pp. 10612-10617.

Puiki Leung et al: "Progress in redox flow batteries, remaining challenges and their applications in energy storage", RSC Advances, vol. 2, No. 27, Sep. 7, 2012, p. 10125.

Minjoon Park et al: "Material design and engineering of next-generation flow-battery technologies", Nature Reviews Materials, vol. 2, No. 1, Nov. 8, 2016.

Matthew S. Faber et al., Earth-Abundant Metal Pyrites (FeS2, CoS2, NiS2, and Their Alloys) for Highly Efficient Hydrogen Evolution and Polysulfide Reduction Electrocatalysis, The Journal of Physical Chemistry C, Aug. 26, 2014, vol. 118, pp. 21347-21356; cited in JP office action dated Apr. 22, 2025.

\* cited by examiner

ENVIRONMENTALLY FRIENDLY ZINC/AQUEOUS POLYSULFIDE RECHARGEABLE FLOW BATTERY WITH HIGH ENERGY EFFICIENCY

FIELD OF THE INVENTION

The present invention relates to a zinc/aqueous polysulfide rechargeable flow battery that avoids the use of toxic or environmentally harmful chemicals.

STATE OF THE ART

In recent years there is a continuously increasing need of energy, and new renewable clean sources are being gradually adopted in substitution of traditional fossil fuels. However, since renewable energy sources are highly dependent on atmospheric conditions, there is the requirement to couple them with reliable energy storage systems. One common form of energy storage systems is represented by batteries, able to store the energy in the form of chemical energy and to release it whenever required in the form of electricity.

For example, the Redox Flow Battery (RFB) represents a promising and versatile architecture, able to accumulate high amounts of energy and characterized by a long lifecycle. An RFB cell is constituted mainly by two half-cells separate by a membrane (or separator), each containing an electrode (positive and negative electrodes respectively) and an electrolyte. Current collectors are generally present, in contact with the electrical circuit outside the RFB; bipolar plates separate the current collectors from the electrodes. The electrolytes, called anolyte and catholyte, contain the redox-active species dissolved in an aqueous or non-aqueous solvent and flow in the half-cells, in contact with the electrodes, thanks to external pumps.

This structure results in a complete decoupling of the power and energy density of the device because, as opposed to a traditional static battery architecture, the active material is stored outside the cell in two external tanks. In this way the volume of the reservoirs guarantees the possibility to scale up the system according to need, determining the overall energy density of the battery; in order to achieve an effective volumetric energy density, the solubility of the active species must be considered and optimized.

The power output is, on the other hand, determined by the active area of the electrodes because only the electrolyte that is inside the cell undergoes a redox reaction. The most common electrodes are carbon materials, like carbon felt because of its high active surface area and chemical inertness toward most solutions and pH.

Different types of RFB have been studied since the '70s, the most common ones being the all-vanadium, Fe—Cr and Zn—Br systems. The capacity decay and toxicity of the last two systems, and the high cost of vanadium salts, limit their commercialization worldwide, giving rise to an urgent need for improvements of the RFB systems.

The paper "Polysulfide flow batteries enabled by percolating nanoscale conductor networks", F. Y. Fan et al., Nano Lett. 2014, 14, 4, 2210-2218, describes an RFB based on the lithium-polysulfide system. The presence of lithium imposes the use of organic polar non-protic solvents; in the paper is exemplified the use of tetraethylene glycol dimethyl ether. The use of solvents of this kind complicates the production and in particular the disposal at the of life of these batteries, further to increasing their cost, making them not suitable for a widespread production and usage.

Patent US 2020/0006796 A1 describes an aqueous polysulfide-based electrochemical cell using a polysulfide-based electrolyte, used as anolyte, for the assembly of a rechargeable flow battery in alkaline conditions, coupled with a catholyte based on manganate, permanganate or iron-cyanide ions, exploiting the redox reactions of ions dissolved into them.

The paper "Rechargeable zinc-aqueous polysulfide battery with a mediator-ion solid electrolyte" by M. M. Gross et al., ACS Appl. Mater. Interfaces 2018, 10, 13, 10612-10617, describes a zinc/polysulfide battery based on aqueous solutions. The battery described in this paper is a static device, thus not of the RFB type, and has several limitations and drawbacks. First, at the positive side (catholyte), the low concentration of the polysulfide species and hydroxides ions in the electrolyte (0.1 M $Na_2S_4$, 0.1 M NaOH) has as a consequence the fact that the electrochemical redox reaction involved ($S_4^{2-} \rightarrow HS^-$). This leads to lower battery performances and inferior electrochemical reversibility, since the $HS^-$ species favors the evolution of gaseous hydrogen sulfide, which seriously affects the capacity and the device reliability over cycling, and consequently the overall battery cycle life; besides, the production of gaseous $H_2S$ might create over-pressures inside the electrochemical flow cell, which is sealed to prevent liquids leakages, along with the hazardous concerns of $H_2S$ exhibiting extremely high risks for human health. A second problem of the battery of this paper is linked to the negative half-cell (anolyte), because in the disclosed conditions the $OH^-$ species are consumed accordingly to the reaction $Zn^{2+}+4OH^- \rightarrow Zn(OH)_4^{2-}$; since the solubility of zincate species increases with the concentration of $OH^-$, the reduction of the electrolyte pH favors the formation of a passive layer on the electrode surface, causing the electrical conductivity decay over time. These limitations hamper the transfer of the system of this paper to RFB batteries. Finally, the solid-state ceramic separator, reported by Gross et al., shows an intrinsically low ionic conductivity (1 mS $cm^{-1}$) and a high thickness (500 μm), preventing the battery to operate at high current and power densities, with a low peak power of 1 mW $cm^{-2}$ at 2.5 mA $cm^{-2}$.

It is an object of the present invention to provide a rechargeable flow battery that overcomes the drawbacks of the prior art. In particular, it is an objection of the invention to provide a rechargeable flow battery that avoids the use of toxic or environmentally potentially harmful chemicals like cyanides species, able to sustain high number of cycles at high energy efficiency using for the first time a polysulfides-based solution as catholyte coupled with a zinc-based anolyte in alkaline conditions, exploiting in this case the metal deposition of zinc on one side of the cell, obtaining in this way a hybrid metal-polysulfides rechargeable flow battery. Moreover, it is a further object of the present invention the promotion of the polysulfides reactions by means of properly tuned catalytic materials.

SUMMARY OF THE INVENTION

The present invention relates to a rechargeable flow battery based on safe, low cost and earth abundant materials able to provide a power source with high energy efficiency.

In particular, the present invention provides a zinc-polysulfide RFB comprising:
  a first half-cell comprising a first electrolyte containing a source of $Zn^{2+}$ ions and a static or flowable electrode disposed within the first half-cell, said first half-cell being connected in a closed-loop configuration through a first pump to a first external tank containing the first electrolyte;

a second half-cell comprising a second electrolyte in which polysulfides are dissolved and a static or flowable electrode, disposed within the second half-cell, said second half-cell being connected in a closed-loop configuration through a second pump to a second external tank containing the second electrolyte; and in the second half-cell, a catalyst on the surface of a static electrode or dispersed in the second electrolyte in the form of particles; and a separator between the two half-cells.

The two electrolytes are circulated, by means of the two pumps, to and from the corresponding half-cell.

In the two half-cells oxidation and reduction reactions occur to charge and discharge the battery. The electrodes in the two half-cells may be static, e.g. metallic, slurry electrodes or porous carbon electrodes; alternatively, and independently from each other, the electrodes in the two half-cells may be flowable, i.e. the first electrolyte may contain the electrode in form of dispersed conductive particles where Zn can be deposited onto, and/or the second electrolyte may contain the electrode in form of dispersed conductive particles where polysulfide oxido-reduction (redox) reaction can occur.

Moreover, in the present invention, the electrode contained in the second half-cell is modified with a catalyst necessary to promote and sustain the electrochemical reactions involving sulfur species during charge and discharge phases of the battery. Herein, the term "catalyst" may refer to a single catalyst or a mixture of different catalytic materials, as described later on.

Several additives can be preferentially included in either or both the electrolytes. In particular, the first electrolyte may comprise a hydrogen evolution-suppressing agent, a complexing agent and/or a buffering agent. The second electrolyte may comprise a complexing agent and/or a buffering agent. In case of dispersed electrodes, also thickener additives may be included in the electrolytes formulation.

DESCRIPTION OF THE FIGURES

The invention will be described in detail in the following with reference to the Figures, in which.

DETAILED DESCRIPTION OF THE INVENTION

Figure 1:
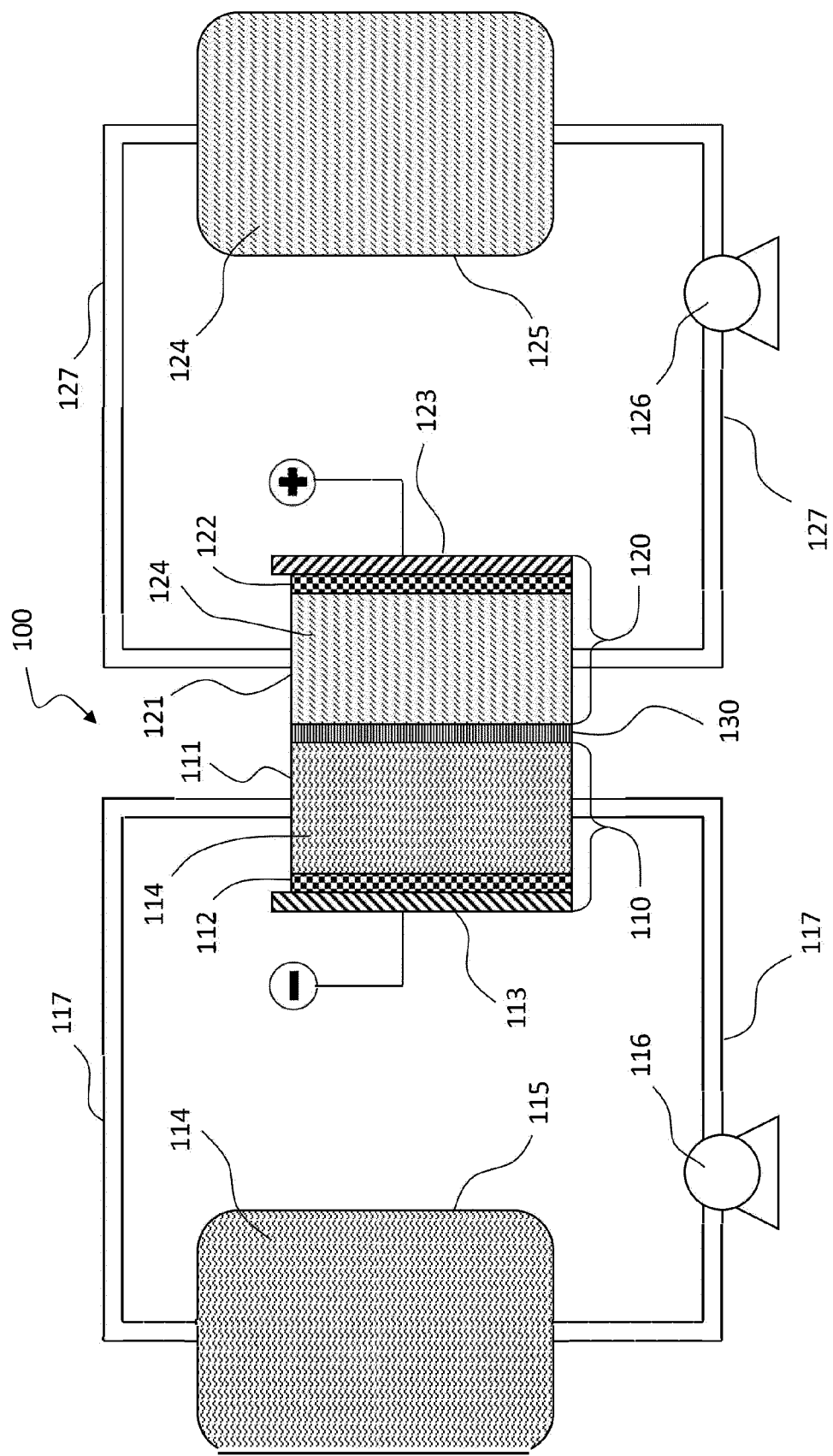
FIG. 1 shows a schematic representation of a flow battery according to the present invention in its most general embodiment.

In the present invention, an aqueous RFB is obtained by coupling an alkaline zinc electrolyte with an aqueous polysulfide electrolyte. This invention not only addresses the issues related to toxicity and high costs, previously described, of the RFB systems of the prior art, but also allows to achieve high efficiency and safety: indeed, zinc is one of the most abundant and cheap elements and sulfur, another very cheap element, in the presence of alkali metal ions shows a high solubility in aqueous electrolytes, forming chains of polysulfides with different lengths, increasing in this way the energy density of the battery.

Unlike other kinds of chemical systems involving zinc salts, e.g. zinc bromine or zinc iron batteries, the chemistry of the RFB of the present invention allows working in alkaline conditions, avoiding the issues associated to acidic environments.

Besides, compared to the static battery described in the paper of Gross et al. mentioned above, the battery of the present invention is a rechargeable flow battery, where electrolytes flow from an external tank to the electrochemical cell, decoupling in this way power and energy density of the device and allowing the possibility to charge and discharge the battery at higher current densities and for longer times.

Different from the system of the paper of M. M. Gross et al. discussed above, the redox reaction taking place in the cathodic compartment of a RFB of the present invention, namely, $S_4^{2-} \rightarrow S^{2-}$, does not lead to the possible production of $H_2S$, leading to increased energy density and longer lifetime of the battery, and avoiding the risks connected to possible leakages of a toxic gas from the battery. The RFB of the present invention also avoids the above-described problems encountered with the anolyte half-cell and the solid-state ceramic separator of the paper of M. M. Gross et al. As illustrated below, the system described in the present invention works at current densities up to fifty times higher than any available prior art device based on similar chemistry, with higher stability over cycles and longer battery lifetime.

In the description that follows and in the claims, by the definition "the solvent", when referred to the liquid phase of the electrolytes (both the anolyte and the catholyte), it is meant water or a water-based mixtures containing at least 40% by volume of water with one or more compounds selected among C1-C4 alcohols, ethylene glycol, acetic acid, glycerol, or a combination of two or more thereof, preferably C1-C4 alcohols, ethylene glycol, or a combination thereof. In a preferred embodiment of the invention, the solvent comprises water and a polar protic solvent with a water percentage higher than 70% by volume, preferably higher than 80% by volume, still more preferably higher than 90%.

In the description and in the accompanying drawings, same elements are identified by the same reference numbers in all embodiments.

Finally, in the following will be described in different embodiments the preparation of the first and second electrolytes of the invention; for clarity, the preparation of any electrolyte is described as a sequence of steps (i), (ii), . . . . While the first step of any preparation, (i), consists in providing a solvent and adding a first compound to produce an ionic conductive solution, the order of the following steps (that is, the order of addition of components to obtain the complete composition of each electrolyte) can be altered and the next components can be added in any sequence, as will be apparent to the skilled person.

Rechargeable flow batteries work as energy sources when they operate in discharge mode, while act as energy storage devices when they operate in charge (recharge) mode.

In the RFB of the present invention, the two different half-cells reactions involved during charge and discharge phase are:

| 1. Charge phase: | |
|---|---|
| $Zn^{2+} + 2e^- \rightarrow Zn^0$ | Negative electrode, cathode, reduction |
| $mS_n^{2-} \xrightarrow{cat.} nS_m^{2-} + 2(m-n)e^-$ | Positive electrode, anode, oxidation |
| 2. Discharge phase: | |
| $Zn^0 \rightarrow Zn^{2+} + 2e^-$ | Negative electrode, anode, oxidation |
| $nS_m^{2-} + 2(m-n)e^- \xrightarrow{cat.} mS_n^{2-}$ | Positive electrode, cathode, reduction |

In other words, during the charging phase zinc is electroplated onto the negative electrode, while $S_n^{2-}$ ion is oxidized to $S_m^{2-}$ (m>n); during the discharge phase the reverse reactions occur, i.e. zinc is oxidized to $Zn^{2+}$ and $S_m^{2-}$ is reduced, bringing back the electrolytes to the initial state.

The electrolyte containing the zinc ions, reacting at the negative electrode, is called anolyte, while the electrolyte containing the polysulfide ions, reacting at the positive electrode, is called catholyte.

FIG. 1 schematically represents a zinc-polysulfide RFB of the invention, 100, in its most general embodiment. RFB 100 is formed by the coupling of a first half-cell, 110, to a second half-cell, 120, through a membrane separator 130. The first half-cell comprises a container 111 in which is present the first electrolyte 114 and an electrode 112, that can be both flow-through (3D) or planar (2D), in electric contact with a current collector, 113; the first electrolyte 114 is recirculated to an external reservoir 115 by means of a pump 116, a valve system (not shown in the figure) and piping 117. Similarly, the second half-cell comprises a container 121 in which is present the second electrolyte 124 and an electrode 122, that can be both flow-through (3D) or planar (2D), in electric contact with a current collector, 123; the second electrolyte 124 is recirculated to an external reservoir 125 by means of a pump 126, a valve system (not shown in the figure) and piping 127. In the second half-cell is also present a catalyst necessary to promote the redox reactions of polysulfides chains; the catalyst is not represented in the general embodiment of FIG. 1, which is intended to represent the general construction of an RFB of the invention; the various possible ways of introducing the catalyst in the second half-cell will be presented in detail in the following, with reference to the description of the various specific embodiments of the invention.

The description of the operation of an RFB of the invention in its most general configuration is reported below, divided into two separate parts; the first part referred to the charge or recharge phase (i.e., the RFB acting as an energy storage device) and the second part referred to the discharge phase (i.e., the RFB acting as an energy source); this avoids ambiguities in the use of terms like cathode/anode and similar.

Operation in (Re)Charge Phase

In (re)charge, in the first half-cell 110 takes place the cathodic reaction, that is, the reduction of $Zn^{2+}$ to metallic zinc, at the surface of electrode 112. The first electrolyte, 114, is stored in external tank 115, and flows by means of pump 116 through half-cell 110 while the redox reaction occurs. Once the redox reaction has taken place, the first electrolyte is recirculated to storage tank 115 through external pipe 117, while the fresh/regenerated electrolyte can enter the electrolytic cell.

Similarly, the second half-cell 120 includes electrode 122 in contact with the second electrolyte 124 and a current collector (123); in this half-cell takes place the anodic reaction, the oxidation of polysulfides, at the surface of electrode 122. The second electrolyte, 124, is stored in external tank 125, and flows by means of pump 126 through half-cell 120 while the redox reaction occurs. Once the redox reaction has taken place, the second electrolyte is recirculated to storage tank 125 through external pipe 127, while the fresh/regenerated electrolyte can enter the electrolytic cell.

Operation in Discharge Phase

In the discharge phase, the zinc-polysulfide RFB 100 of the invention operates contrary to the (re)charge phase described above. The elements of the RFB are the same, but in this case in the first half-cell takes place the oxidation reaction of metallic zinc to $Zn^{2+}$, while in the second half-cell takes place the reduction reaction of polysulfides.

As said above with reference to FIG. 1, a complete RFB of the invention is made of the coupling of two different half-cells divided by a membrane separator. The specific construction of each half-cell, in particular the kind of electrode used in a half-cell and, in the second half-cell, the arrangement of the catalyst, mostly depend on the composition of first and second electrolytes. Electrolytes, electrodes, catalysts and membrane separators, as well as other optional elements of the invention, are described separately below.

The Zn-Based Alkaline Electrolyte (the First Electrolyte)

The first electrolyte of the invention, or anolyte, contains $Zn^{2+}$ ions and may be prepared by dissolving any suitable source of zinc ions in an aqueous supporting electrolyte containing one or more hydroxides.

In the first and simplest possible embodiment, the anolyte is prepared by dissolving a zinc compound, e.g. zinc oxide (ZnO), zinc hydroxide ($Zn(OH)_2$), acetate ($Zn(CH_3COO)_2$), chloride ($ZnCl_2$), carbonate ($ZnCO_3$) or a combination of two or more thereof in the solvent. In a preferred embodiment, this electrolyte is produced by dissolving zinc acetate or chloride, in order to have a concentration of $Zn^{2+}$ ions between 0.001 M and 1.5 M, preferably from 0.01 M to 1 M, still more preferably from 0.1 M to 1 M, in the solvent containing one or more compounds selected among sodium hydroxide, potassium hydroxide, lithium hydroxide, ammonium hydroxide, bismuth hydroxide or a combination of two or more thereof. In a preferred embodiment, the overall concentration of hydroxides is between 0.5 M and 20 M, preferably from 1 M to 12 M, still more preferably from 1.5 M to 10 M;

As an example, in one embodiment ZnO is dissolved in an aqueous solution containing NaOH at a concentration ranging from 5 M to 10 M, in such an amount to give rise to a concentration of $Zn^{2+}$ ions of 0.3 M to 1 M.

The first half-cell using this first possible composition of anolyte is represented schematically in FIG. 2, and corresponds to the first half-cell 110 already described with reference to FIG. 1 (in this figure, and in all figures described below representing half-cells, is also shown the presence of the membrane separator); this basic anolyte, containing only the solvent, zinc ions and at least one hydroxide, is electrolyte 114.

In a second embodiment of the invention, the anolyte is obtained by:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more
(ii) dissolving in the solution of step (i) any suitable source of zinc ions, e.g. zinc oxide (ZnO), zinc hydroxide ($Zn(OH)_2$), zinc acetate ($Zn(CH_3COO)_2$), zinc chloride ($ZnCl_2$), zinc carbonate ($ZnCO_3$) or a combination of two or more thereof. In a preferred embodiment, this electrolyte is produced by dissolving zinc acetate or chloride, in order to have a concentration of $Zn^{2+}$ ions between 0.001 M and 1.5 M, preferably from 0.01 M to 1 M, still more preferably from 0.1 M to 1 M; and
(iii) suspending in the solution of step (ii) conductive particles, preferably zinc-based and/or carbon-based particles, selected among zinc particles, zinc oxide particles, zinc coated particles, graphene, expanded graphite, reduced graphene oxide, active carbon, carbon blacks, acetylene black, carbon nanotubes or a combination of two or more thereof. These particles are introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight of the electrolyte.

Figure 3:
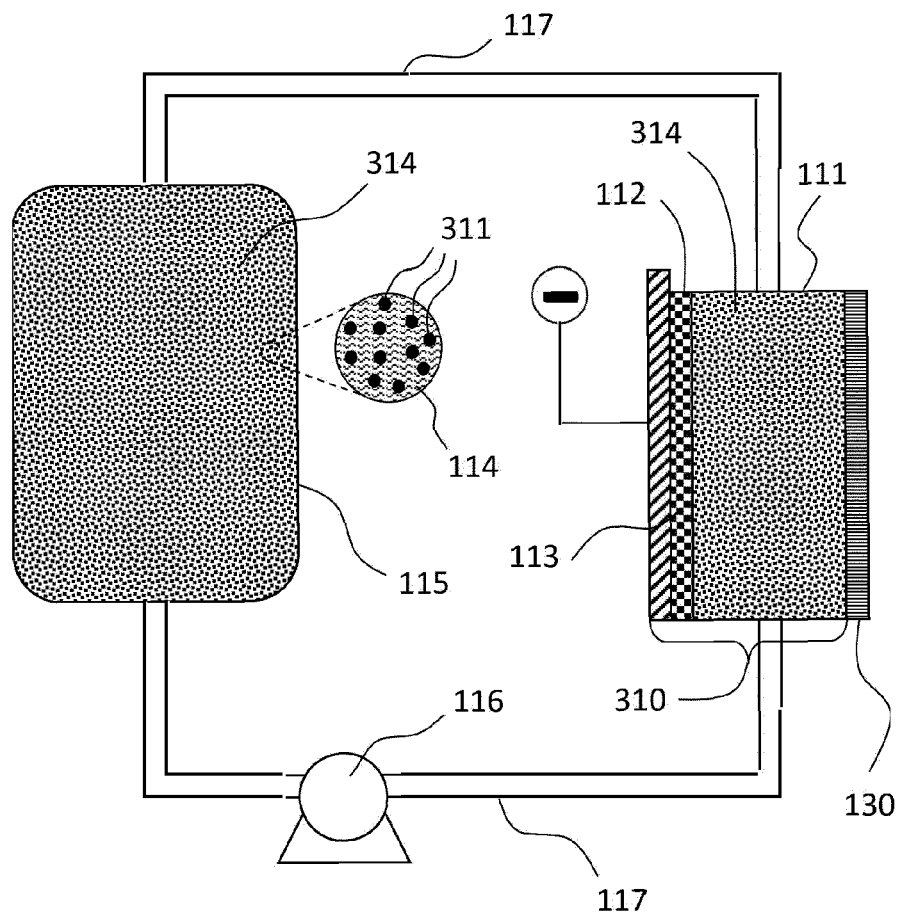

A first half-cell, 310, using the anolyte having this second possible composition is represented schematically in FIG. 3. The anolyte of this embodiment, 314, is obtained adding conductive particles 311 to the electrolyte 114 described above; this situation is represented in the inset in FIG. 3. Inside the electrochemical cell the anolyte is in contact with the planar electrode, 112.

In a third possible embodiment of the invention, the anolyte contains electroactive particles containing zinc in a supporting electrolyte. The average size of the particles is in the range from 10 nm to 1000 µm, preferably from 20 nm to 500 µm, more preferably from 20 nm to 200 µm, still more preferably from 20 nm to 10 µm. This electrolyte may be prepared by:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;
(ii) dissolving in the solution of step (i) a suitable source of zinc ions, e.g. zinc oxide (ZnO), zinc hydroxide ($Zn(OH)_2$), zinc acetate ($Zn(CH_3COO)_2$), zinc chloride ($ZnCl_2$), zinc carbonate ($ZnCO_3$) or a combination of two or more thereof. In a preferred embodiment, this electrolyte is produced by dissolving zinc acetate or chloride, in order to have a concentration of $Zn^{2+}$ ions between 0.001 M and 1.5 M, preferably from 0.01 M to 1 M, still more preferably from 0.1 M to 1 M; and
(iii) dissolving or suspending in the solution of step (ii) organic and/or inorganic electroactive particles containing zinc ions in different oxidation states that can be subjected to redox reaction at the surface of the electrode. The redox reaction can lead to a change in the coordination number of the ion either in the crystalline lattice of the electroactive particle or at the interface between the electroactive particle and the current collector. Electroactive particles, acting as source of Zn ions, can be introduced in an amount in the range from 0.01% by weight to 50% by weight, preferably from 1% by weight to 30% by weight, still more preferably from 5% by weight to 20% by weight.

Figure 4:
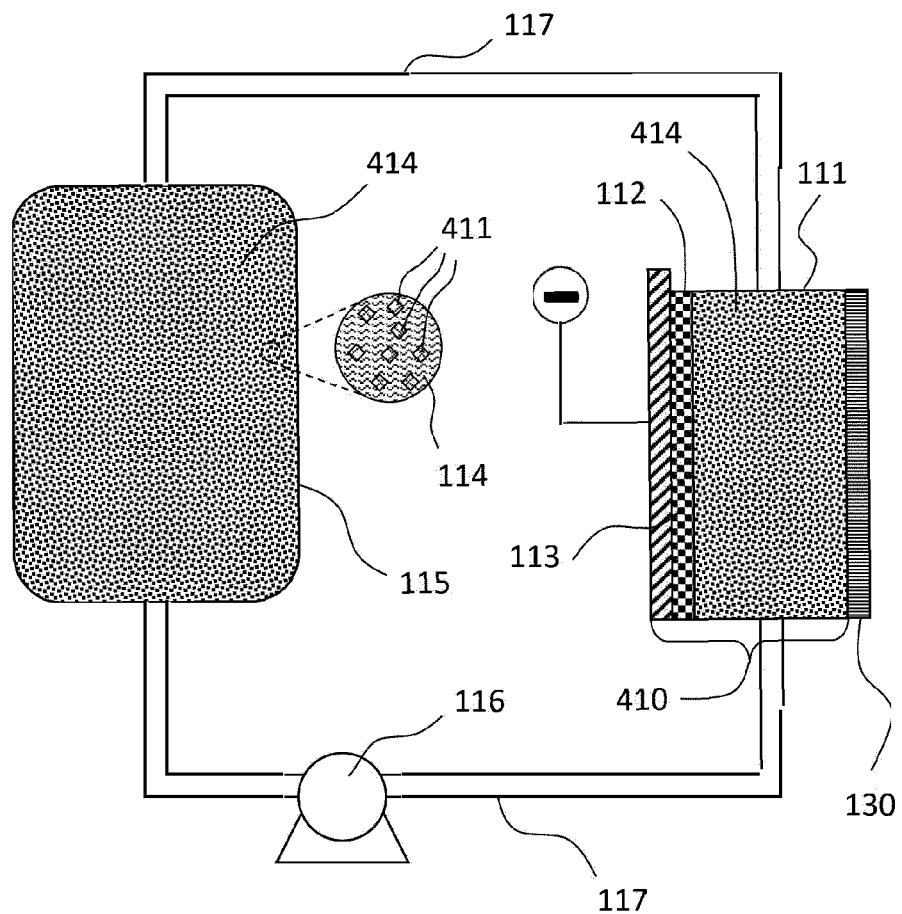

A first half-cell, 410, using the anolyte according to this third possible composition is represented schematically in FIG. 4. The anolyte of this embodiment, 414, is obtained adding electroactive particles 411 to the electrolyte 114 described above; this situation is represented in the inset in FIG. 4. Inside the electrochemical cell the anolyte is in contact with the planar electrode, 112.

In still another (fourth) embodiment of the invention, the anolyte is obtained by dissolving or suspending, in a supporting electrolyte, electroactive particles containing zinc and carbon particles forming a percolated conductive network in/on which redox reaction can occur. The average size of both particles of the dispersion is in the range from 10 nm to 1000 µm, preferably from 20 nm to 500 µm, more preferably from 20 nm to 200 µm, still more preferably from 20 nm to 10 µm. This electrolyte may be prepared by:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more
(ii) dissolving in the solution of step (i) any suitable source of zinc ions, e.g. zinc oxide (ZnO), zinc hydroxide ($Zn(OH)_2$), zinc acetate ($Zn(CH_3COO)_2$), zinc chloride ($ZnCl_2$), zinc carbonate ($ZnCO_3$) or a combination of two or more thereof. In a preferred embodiment, this electrolyte is produced by dissolving zinc acetate or zinc chloride, in order to have a concentration of $Zn^{2+}$ ions between 0.001 M and 1.5 M, preferably from 0.01 M to 1 M, still more preferably from 0.1 M to 1 M;
(iii) dissolving or suspending in the solution of step (ii) organic and/or inorganic electroactive particles containing zinc ions in different oxidation states that can be subjected to redox reaction. The redox reaction can lead to a change in the coordination number of the ion either in the crystalline lattice of the electroactive particle or at the interface between the electroactive particle and the current collector. Electroactive particles, acting as source of Zn ions, can be introduced in an amount in the range from 0.01% by weight to 50% by weight, preferably from 1% by weight to 30% by weight, still more preferably from 5% by weight to 20% by weight; and (iv) suspending in the solution of step (iii) conductive particles, preferably zinc-based and/or carbon-based particles, selected among graphene, expanded graphite, reduced graphene oxide, active carbon, carbon blacks, acetylene black, carbon nanotubes or a combination of two or more thereof. In a preferred embodiment, the overall concentration ranges from 0.01% by weight to 20% by weight, preferably from 0.1% by weight to 10% by weight, still more preferably from 1% by weight to 5% by weight.

Figure 5:
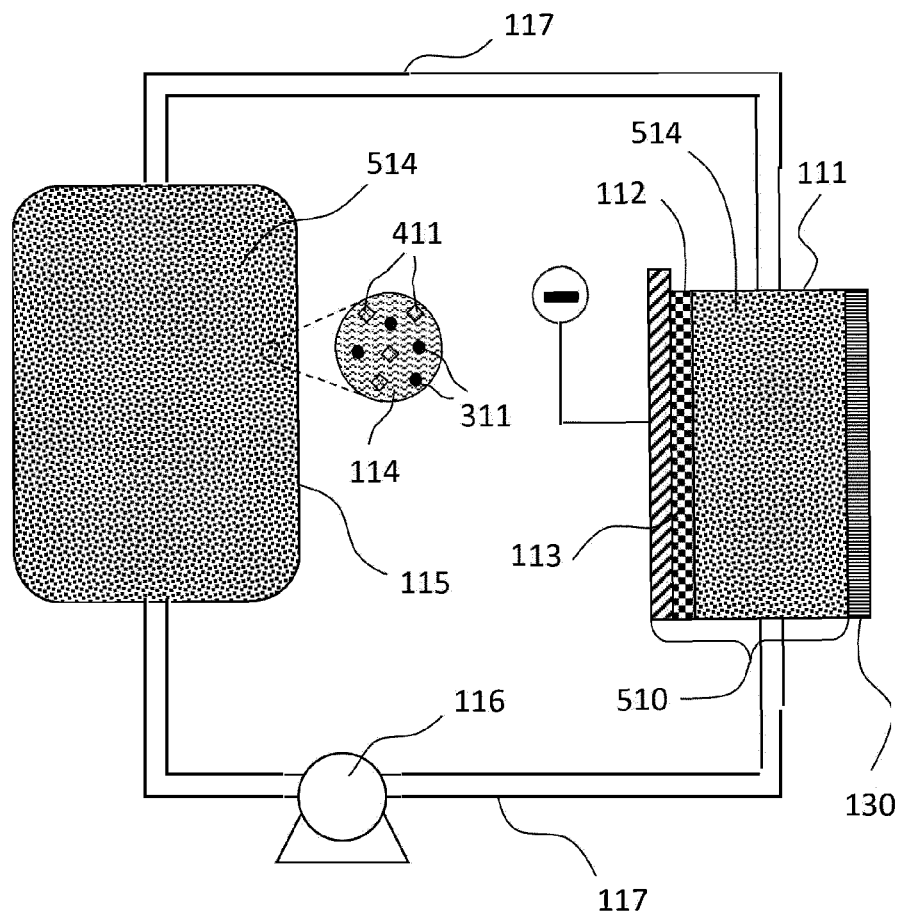

A first half-cell, 510, using the anolyte according to this fourth possible composition is represented schematically in FIG. 5. The anolyte of this embodiment, 514, is obtained adding to the electrolyte 114 described above conductive particles 311, that in this case are only carbon-based particles, and zinc-based electroactive particles 411; this situation is represented in the inset in FIG. 5. Inside the electrochemical cell the anolyte is in contact with the planar electrode, 112.

In a fifth possible embodiment of the invention, the anolyte contains electroactive particles containing zinc in a supporting electrolyte. The average size of the particles is in the range from 10 nm to 1000 μm, preferably from 20 nm to 500 μm, more preferably from 20 nm to 200 μm, still more preferably from 20 nm to 10 μm. This electrolyte may be prepared by:

(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M; and (ii) dissolving or suspending in the solution of step (i) organic and/or inorganic electroactive particles containing zinc ions in different oxidation states that can be subjected to redox reaction at the surface of the electrode. The redox reaction can lead to a change in the coordination number of the ion either in the crystalline lattice of the electroactive particle or at the interface between the electroactive particle and the current collector. Electroactive particles, acting as source of Zn ions, can be introduced in an amount in the range from 0.01% by weight to 50% by weight, preferably from 1% by weight to 30% by weight, still more preferably from 5% by weight to 20% by weight.

Figure 6:
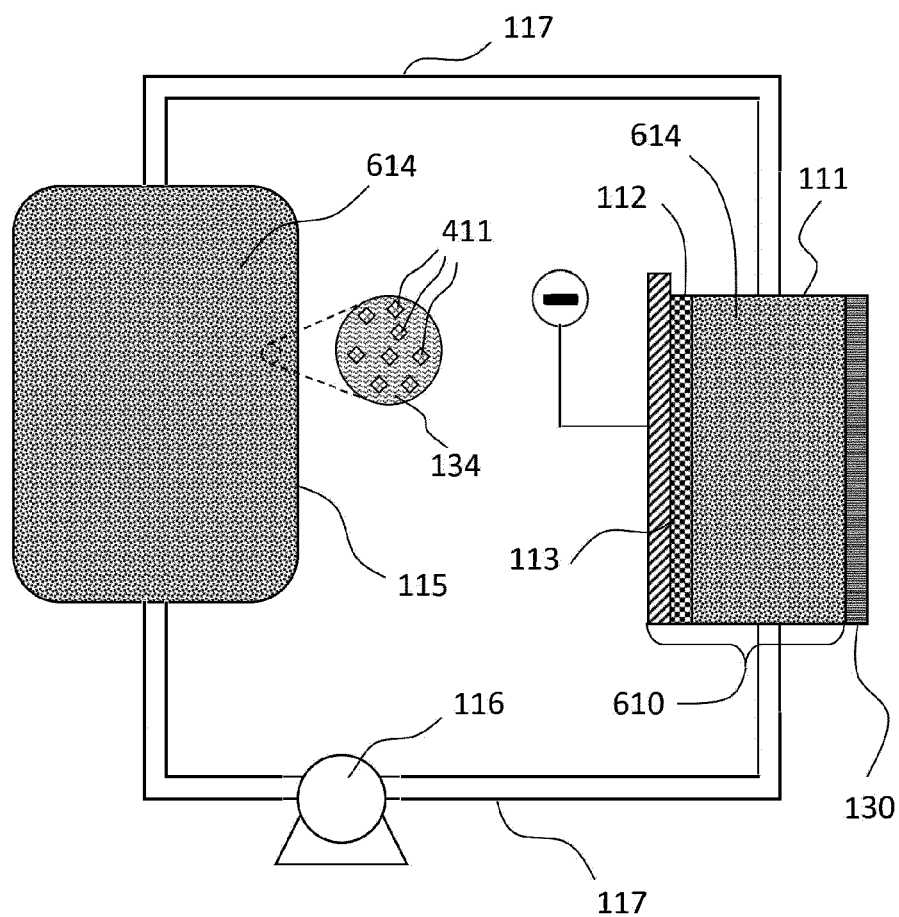

A first half-cell, 610, using the anolyte according to this fifth possible composition is represented schematically in FIG. 6. The liquid phase of this anolyte comprises a solvent and a hydroxide, and differs from electrolyte 114 of the previous embodiments in that it does not contain dissolved zinc salts; this liquid phase acts thus as a supporting electrolyte and is indicated by numeral 134. The anolyte of this embodiment, 614, is obtained adding electroactive particles 411 to the supporting electrolyte 134; this situation is represented in the inset in FIG. 6. Inside the electrochemical cell the anolyte is in contact with the planar electrode, 112.

In still another (sixth) embodiment of the invention, the anolyte is obtained by dissolving or suspending, in a supporting electrolyte, electroactive particles containing zinc and carbon particles forming a percolated conductive network in/on which redox reaction can occur. The average size of both particles of the dispersion is in the range from 10 nm to 1000 μm, preferably from 20 nm to 500 μm, more preferably from 20 nm to 200 μm, still more preferably from 20 nm to 10 μm. This electrolyte may be prepared by:

(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;

(ii) dissolving or suspending in the solution of step (i) organic and/or inorganic electroactive particles containing zinc ions in different oxidation states that can be subjected to redox reaction. The redox reaction can lead to a change in the coordination number of the ion either in the crystalline lattice of the electroactive particle or at the interface between the electroactive particle and the current collector. Electroactive particles, acting as source of Zn ions, can be introduced in an amount in the range from 0.01% by weight to 50% by weight, preferably from 1% by weight to 30% by weight, still more preferably from 5% by weight to 20% by weight; and (iii) suspending in the solution of step (ii) conductive particles, preferably zinc-based and/or carbon-based particles, selected among graphene, expanded graphite, reduced graphene oxide, active carbon, carbon blacks, acetylene black, carbon nanotubes or a combination of two or more thereof. In a preferred embodiment, the overall concentration ranges from 0.01% by weight to 20% by weight, preferably from 0.1% by weight to 10% by weight, still more preferably from 1% by weight to 5% by weight.

Figure 7:
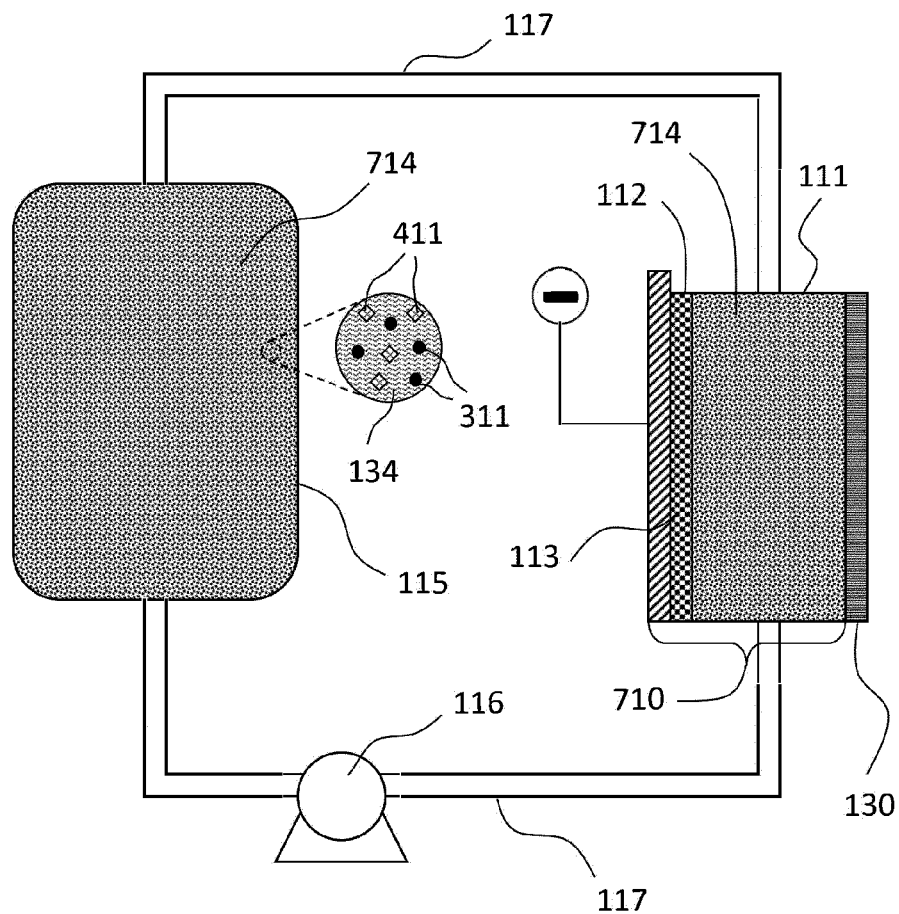

A first half-cell, 710, using the anolyte according to this sixth possible composition is represented schematically in FIG. 7. The anolyte of this embodiment, 714, is obtained adding to the supporting electrolyte 134 described above conductive particles 311, that in this case are only carbon-based particles, and zinc-based electroactive particles 411; this situation is represented in the inset in FIG. 7. Inside the electrochemical cell the anolyte is in contact with the planar electrode, 112.

Any suitable metallic element able to be co-deposited with zinc, forming an alloy, can be added to the anolyte of any one of the embodiments above. In particular, metallic elements, in the form of ions, are obtained from their respective salts, oxides and hydroxides and properly selected in order to (i) shift the zinc electrochemical potential and (ii) to increase the overvoltage of hydrogen evolution. These metallic elements selected among Pb, Mn, Sn, Fe, Ni, Cu, Mg, Ti, Co, Al, Li, Zr or a combination of two or more thereof. In a preferred embodiment they are introduced in a concentration ranging from 0.001 M to 1 M, preferably from 0.01 M to 0.5 M, still more preferably from 0.05 M to 0.3 M.

Besides, any one of the anolytes described above may further contain additives such as hydrogen evolution suppressor(s), Zn complexing agents, leveling agent(s), brightener(s), corrosion protective compounds, and similar additives, for stabilizing the operation of the first half-cell and increasing the battery performances, as detailed below.

A first possible additive of the first electrolyte is a hydrogen evolution suppressor. This component is added in order to increase the battery coulombic efficiency and to reduce side reaction during the charging phase; this additive could be also effective in avoiding pH variation of the electrolyte. The hydrogen evolution suppressor may be selected among silicates, Pb, Bi, Mn, W, Cd, As, Sb, Sn, In and their oxides, boric acid or a combination thereof, in an overall concentration in the range between 0.001 M to 5 M, preferably from 0.01 M to 2 M, still more preferably from 0.05 M to 1 M.

The anolyte may further contain Rochelle salts in a concentration between 0.001 M and 10 M, preferably from 0.1 M to 5 M, preferably from 0.5 M to 2 M; these salt act complexing zinc ions and increasing the conductivity of the electrolyte.

Another possible additive of the anolyte is a leveling agent, reducing the dendritic growth of electrodeposited zinc, which would affect the long-time performances of the battery. Leveling agents include, e.g., polyethylene glycol (PEG), polyethylenimine (PEI), thiourea, quaternary ammonium salts, dextrins, cyclodextrins, sucrose, polytetrafluoroethylene (PTFE), sodium dodecyl sulfate (SDS), polyacrylic acid, glucose and cellulose or combinations thereof, with a concentration between 0.0001 ppm to 10000 ppm, preferably from 0.002 ppm to 5000 ppm, still more preferably from 1 ppm to 1000 ppm. In a preferred embodiment, the Zn-based electrolyte contains PEI from 0.01 ppm to 5000 ppm, preferably from 1 ppm to 2000 ppm, more preferably from 5 ppm to 1000 ppm.

In another embodiment, plasticizer additives may be added to the electrolyte formulation. These additives comprise polyols (such as polyethylene glycol (PEG), ethylene glycol, diethylene glycol (DEG), tetraethylene glycol (TEG), propylene glycol (PG), glycerol, mannitol, sorbitol, xylitol), monosaccharides (e.g., glucose, mannose, fructose, sucrose), fatty acids, urea, ethanolamine, triethanolamine, vegetable oils, lecithin, waxes, amino acids, surfactants and oleic acid, in a range between 0.1% by weight and 5% by weight, more preferably between 0.3% by weight and 3% by weight, still more preferably between 0.5% by weight and 1% by weight.

In still another embodiment, the invention relates also the addition of thickener additives necessary to guarantee the best particles dispersion and a suitable electrolyte viscosity in case of dispersed particles. The amount of these organic additives is comprised in a range between 0.0001% to 10% by weight of the electrolyte, preferably from 0.1% by weight to 5% by weight, still more preferably from 0.1% by weight to 1% by weight.

In a preferred embodiment, the zinc-based electrolyte contains organic additives selected among xanthan gum, gum arabic, carboxymethyl cellulose, chitosan, agar-agar, sodium alginate and polyethylene oxide in an amount comprised in a range between 0.0001% to 10% by weight of the electrolyte, preferably from 0.1% by weight to 5% by weight, still more preferably from 0.1% by weight to 1% by weight.

The Aqueous Polysulfide-Based Electrolyte (the Second Electrolyte)

The second electrolyte of the invention, or catholyte, contains polysulfide ions and requires the presence of a catalyst for its working. The co-presence of polysulfide ions and catalyst may be achieved according to vary different embodiments, which are described in detail below. The selection of water or a water-based mixture as the liquid phase of the electrolyte, and their combination with other chemicals described below, allows to exploit the electrochemical reaction of short-length polysulfide chains fostered by the combination with the developed electrocatalytic materials.

A first second electrolyte, or catholyte, of the invention, may be prepared by:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more
(ii) dissolving in the solution obtained in step (i) any suitable source of polysulfides, selected among lithium sulfide ($Li_2S$), sodium sulfide ($Na_2S$), potassium sulfide ($K_2S$) or a combination of two or more thereof in water or the water-based solvent. In a preferred embodiment, the overall concentration of alkali sulfides is between 0.5 M and 8 M, preferably from 1 M to 7 M, still more preferably from 2 M to 6 M; and
(iii) dissolving in the solution obtained in step (ii) elemental sulfur, S, in order to form $A_2S_n$ chains where n=2-6, where A might be selected among Li, Na, K and a combination thereof. In a preferred embodiment, the overall concentration of elemental sulfur added is between 0.5 M and 40 M, preferably from 1 M to 35 M, still more preferably from 2 M to 30 M;

In an embodiment of the invention, $Na_2S$ is dissolved in a concentration of 2 M to 3 M, with an elemental sulfur concentration from 3 M to 12 M in an aqueous solution containing NaOH whose concentration ranging from 2 M to 8 M.

In order to effectively employ the catholyte of this first embodiment, the static electrode contained in the second half-cell is modified with the catalyst necessary to promote catholyte electrochemical reactions; this is generally a catalytic metal M, in particular selected from the group of metals Mo, Zr, Ti, Ni, In, Pb, Zn, Fe, Co, Cu, Mn, Cd, Bi, Al, Ga, Cr, W, Nb, Au, Ag, Pt, Ru, Ir, Pd and their alloys, and compounds of one or more metals. These compounds are indicated below adopting the general nomenclature M-X (or M-M'-X) which refers to any possible composition between metal cation(s) M, M' and the indicated anion(s), possibly in crystalline phases. Examples of possible catalytic compounds are metal oxides or mixed oxides (M-O or M-M'-O); chalcogenide compounds containing sulfur anions and at least one metal cation (M-X or M-M'-X=Co—S, Cu—S, Fe—S, Ni—S, Zn—S, Sn—S, Cu—Zn—S, Cu—Sn—S, etc.) or other chalcogenides such as selenides and tellurides (M-X=M-Se, M-Te); nitrides (M-N); oxonitrides (M-O—N) and carbonitrides (M-C—N); or carbon-based non-noble metals (M/N/C). The catalyst is described in greater detail below.

Figure 8:
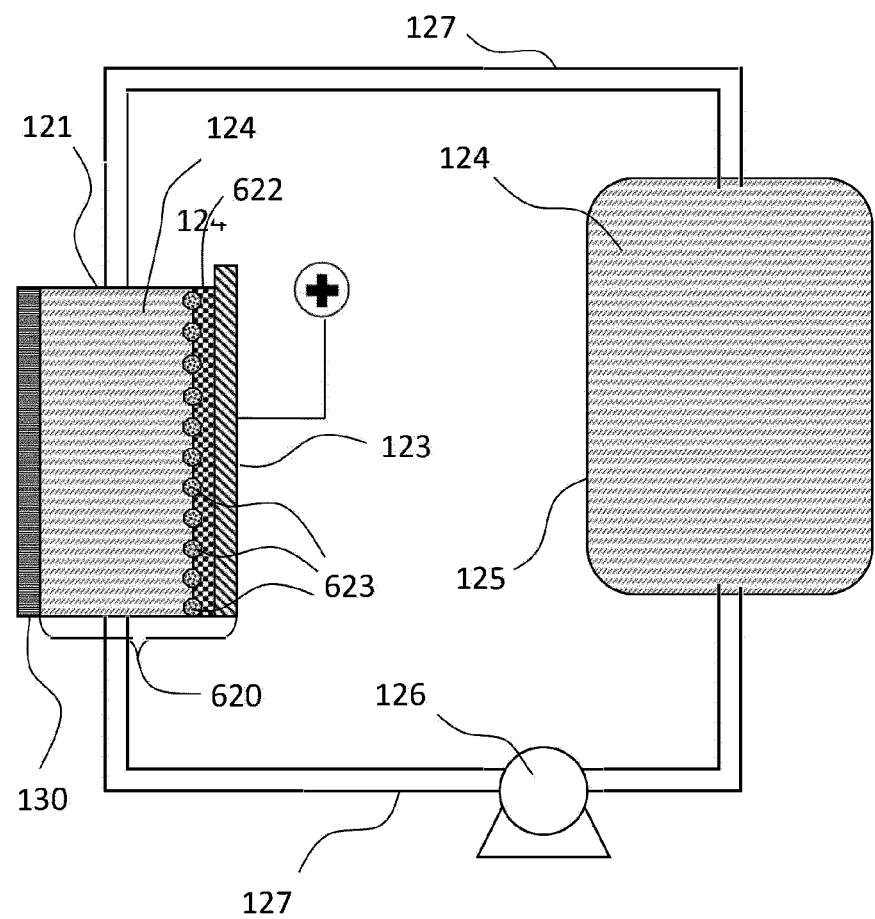
FIGS. 8 to 25 show schematic representations of possible second half-cells for the construction of a flow battery according to the present invention.

A second half-cell, 620, using the catholyte according to this first possible composition is represented schematically in FIG. 8. The catholyte of this embodiment, 124, contains the solvent, at least one hydroxide, and polysulfide ions. In the half-cell of this embodiment, the catalyst is present in the form of particles 623 adhered on the surface of electrode 622.

A second embodiment of catholyte of the invention is obtained by introducing dispersed catalytic particles in it. This electrolyte may be prepared by:
(i) dissolving one or more compounds selected among sodium hydroxide, potassium hydroxide, lithium hydroxide, ammonium hydroxide, bismuth hydroxide or a combination of two or more thereof in the solvent.

In a preferred embodiment, the overall concentration of hydroxides is between 0.5 M and 20 M, preferably from 1 M to 12 M, still more preferably from 1.5 M to 10 M;

(ii) dissolving in the solution obtained in step (i) sulfide salts and elemental sulfur in a ratio above 1:1 ($A_2S_2$), preferably a ratio comprised between 1:3 and 1:4 in order to produce $A_2S_n$ where n=4-5 (where A might be selected among Li, Na, K and a combination of them) for an overall concentration of $S_n^{2-}$ ions between 0.5 M and 8 M, preferably from 1 M to 7 M, still more preferably from 2 M to 6 M;

(iii) suspending in the solution obtained in step (ii) catalytic particles containing M-X compounds in different oxidation states that can catalyze the polysulfide redox reaction at the surface of the static electrode. Catalytic particles, can be introduced in an amount in the range from 0.001% by weight to 10% by weight, preferably from 0.01% by weight to 5% by weight, still more preferably from 0.1% by weight to 1% by weight.

The average size of the dispersed catalytic particles is in the range from 10 nm to 1000 μm, preferably from 20 nm to 500 μm, more preferably from 20 nm to 200 μm, still more preferably from 20 nm to 10 μm.

These catalytic particles may be made of the same metals and metal alloys and compounds listed above as modifier of electrode 622.

Figure 9:
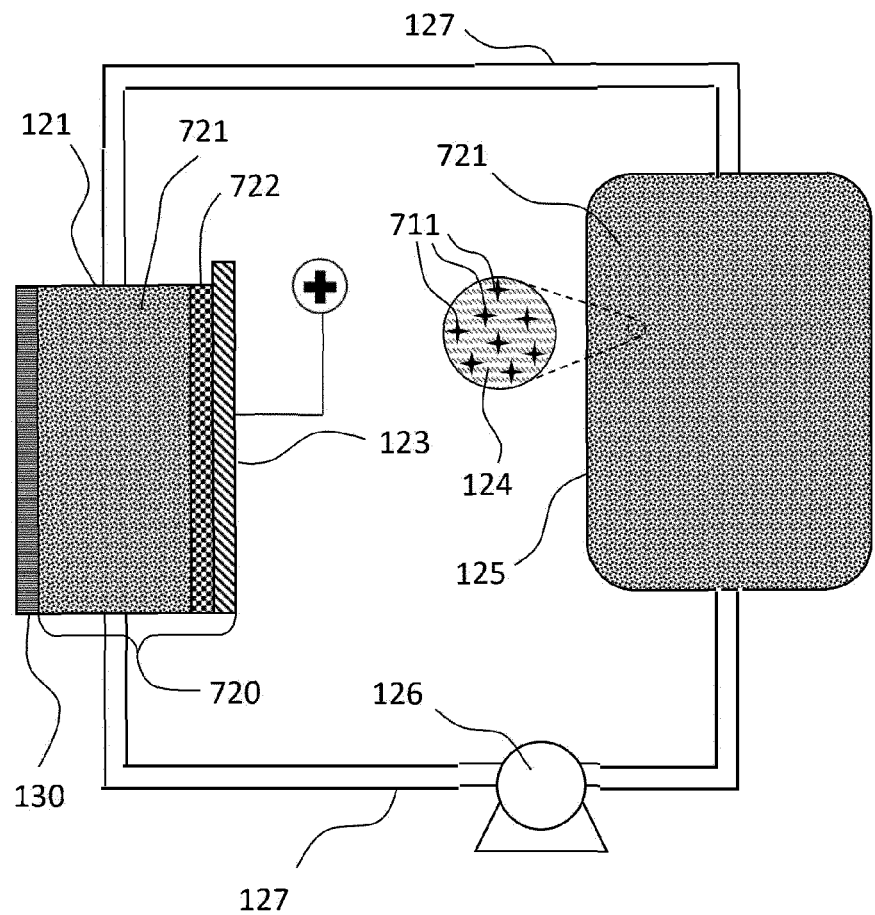

A second half-cell, 720, using the catholyte according to this second possible composition is represented schematically in FIG. 9. The catholyte of this embodiment, 721, is obtained adding catalytic particles 711 (represented by stars in the inset in the figure) to the electrolyte 124 described above. In this case the planar electrode, 722, in contact with catholyte 721 has no catalytic particles adhered to its surface.

A third possible embodiment of catholyte the invention is obtained by introducing, in the supporting electrolyte, dispersed catalytic particles previously described and conductive particles, preferably carbon-based particles, forming a percolated conductive network in/on which redox reaction can occur. The average size of the particles of the dispersion is in the range from 10 nm to 1000 μm, preferably from 20 nm to 500 μm, more preferably from 20 nm to 200 μm, still more preferably from 20 nm to 10 μm.

This electrolyte may be prepared by:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;

(ii) dissolving in the solution obtained in step (i) sulfide salts and elemental sulfur in a ratio above 1:1 ($A_2S_2$), preferably a ratio comprised between 1:3 and 1:4 in order to produce $A_2S_n$ where n=4-5 (where A might be selected among Li, Na, K and a combination of them) for an overall concentration of $S_n^{2-}$ ions between 0.5 M and 8 M, preferably from 1 M to 7 M, still more preferably from 2 M to 6 M;

(iii) suspending in the solution obtained in step (ii) catalytic particles containing M-X compounds in different oxidation states that can catalyse the polysulfide redox reaction. Catalytic particles can be introduced in an amount in the range from 0.001% by weight to 10% by weight, preferably from 0.01% by weight to 5% by weight, still more preferably from 0.1% by weight to 1% by weight; and (iv) suspending in the solution obtained in step (iii) conductive particles, preferably carbon based particles, selected among graphene, expanded graphite, reduced graphene oxide, active carbon, carbon blacks, acetylene black, carbon nanotubes or a combination of two or more thereof are then introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight.

Figure 10:
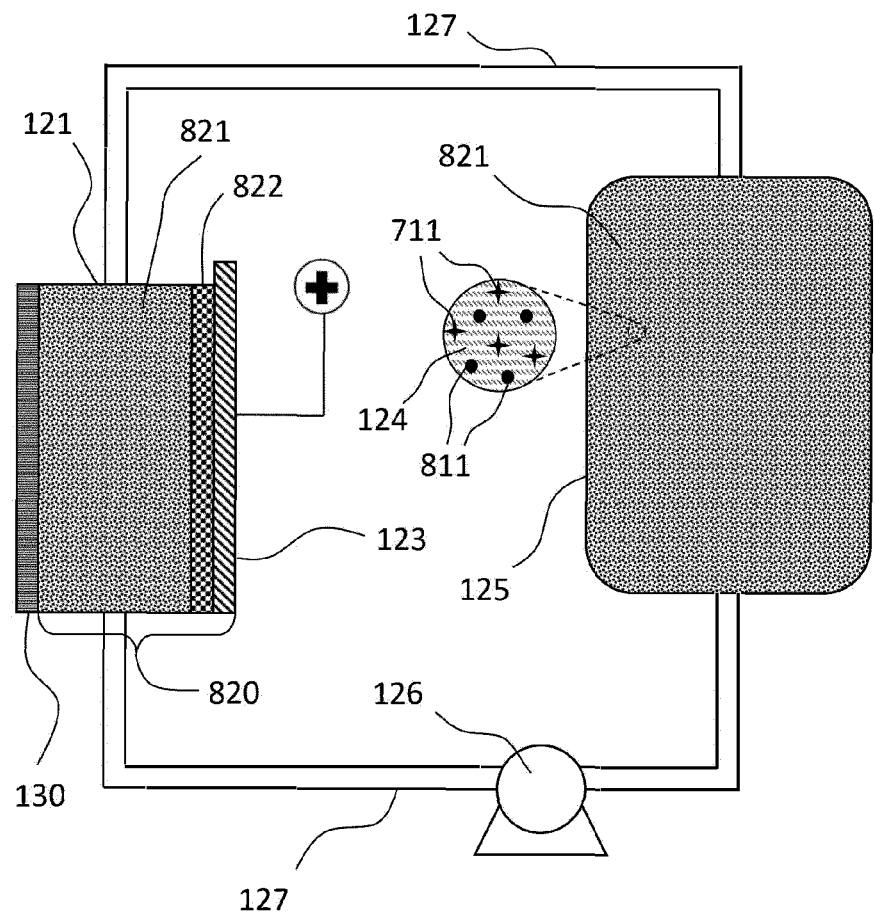

A second half-cell, 820, using the catholyte according to this third possible composition is represented schematically in FIG. 10. The catholyte of this embodiment, 821, is obtained adding to the electrolyte 124 previously described catalytic particles 711 and conductive particles 811 (both kinds of particles are represented in the inset in the figure). Also in this case the planar electrode, 822, in contact with catholyte 821 does not require catalytic particles adhered to its surface.

In a fourth possible embodiment of the invention, the catholyte includes some conductive particles decorated with catalytic particles dispersed into the electrolyte, forming a percolated conductive network in/on which redox reaction can occur.

The average size of the conductive particles is in the range from 10 nm to 1000 μm, preferably from 20 nm to 500 μm, more preferably from 20 nm to 200 μm, still more preferably from 20 nm to 10 μm. This electrolyte may be prepared by:

(i) dissolving a supporting electrolyte containing one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;

(ii) dissolving in the solution obtained in step (i) sulfide salts and elemental sulfur in a ratio above 1:1 ($A_2S_2$), preferably a ratio comprised between 1:3 and 1:4 in order to produce $A_2S_n$ where n=4-5 (where A might be selected among Li, Na, K and a combination of them) for an overall concentration of $S_n^{2-}$ ions between 0.5 M and 8 M, preferably from 1 M to 7 M, still more preferably from 2 M to 6 M; and (iii) suspending in the solution obtained in step (ii) conductive particles, preferably carbon-based particles, selected among graphene, expanded graphite, reduced graphene oxide, active carbon, carbon blacks, acetylene black, carbon nanotubes or a combination of two or more thereof, previously decorated by catalyst particles and introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight.

Figure 11:
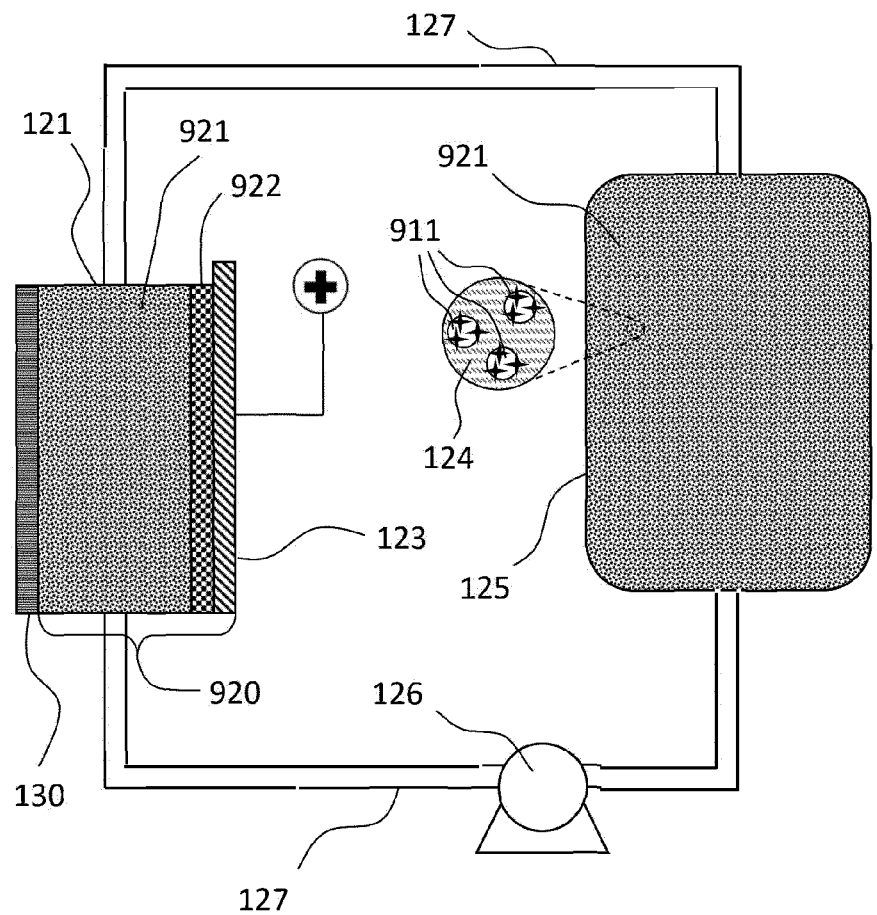

A second half-cell, 920, using the catholyte according to this fourth possible composition is represented schematically in FIG. 11. The catholyte of this embodiment, 921, is obtained adding to the electrolyte 124 previously described particles 911 (in the inset) obtained decorating basic conductive particles with catalytic particles. Electrode 922 has no catalytic particles adhered to its surface.

A fifth possible embodiment of the invention is a catholyte including electroactive particles containing sulfide ions dispersed in a supporting electrolyte and reacting by means of redox reactions thanks to the presence of the catalyst on the surface of the static electrode. The average size of the electroactive particles is in the range from 10 nm to 1000 µm, preferably from 20 nm to 500 µm, more preferably from 20 nm to 200 µm, still more preferably from 20 nm to 10 µm. This electrolyte may be prepared by:
  (i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M; and
  (ii) organic and/or inorganic sulfide-based electroactive particles containing sulfide ions in different oxidation states that can be subjected to redox reaction. The redox reaction can lead to a change in the coordination number of the ion either in the crystalline lattice of the electroactive particle or at the interface between the electroactive particle and the current collector. Electroactive particles, acting as source of polysulfide ions, can be introduced in an amount in the range from 0.01% by weight to 50% by weight, preferably from 1% by weight to 30% by weight, still more preferably from 5% by weight to 20% by weight.

Figure 12:
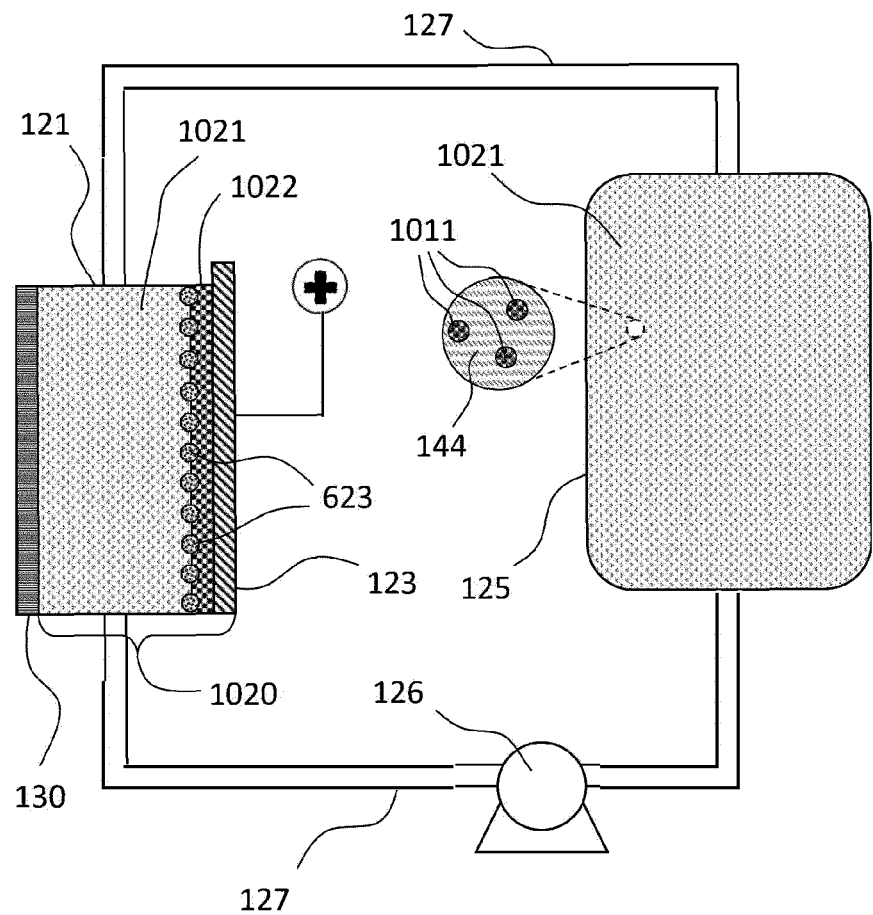

A second half-cell, 1020, using the catholyte according to this fifth possible composition is represented schematically in FIG. 12. The liquid phase of this catholyte comprises a solvent and a hydroxide, and differs from electrolyte 124 of the previous embodiments in that it does not contain sulfides; this liquid phase acts thus as a supporting electrolyte and is indicated by numeral 144. The catholyte of this embodiment, 1021, consists of the supporting electrolyte 144 added with the electroactive particles 1011 containing sulfide ions. In this embodiment of the invention, the electrode 1022 can be a catalyst-modified static electrode similar to electrode 622, or it may be in the form of a slurry electrode.

In a sixth embodiment of the invention, the catholyte contains some electroactive particles containing sulfide ions dispersed in a supporting electrolyte and reacting by means of redox reactions thanks to the presence of catalytic particles co-dispersed in it. The average size of the particles is in the range from 10 nm to 1000 µm, preferably from 20 nm to 500 µm, more preferably from 20 nm to 200 µm, still more preferably from 20 nm to 10 µm.
  This electrolyte may be prepared by:
  (i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;
  (ii) dissolving or suspending in the solution obtained in step (i) organic and/or inorganic sulfide-based electroactive particles containing sulfide ions in different oxidation states that can be subjected to redox reaction. The redox reaction can lead to a change in the coordination number of the ion either in the crystalline lattice of the electroactive particle or at the interface between the electroactive particle and the current collector. Electroactive particles, acting as source of polysulfide ions, can be introduced in an amount in the range from 0.01% by weight to 50% by weight, preferably from 1% by weight to 30% by weight, still more preferably from 5% by weight to 20% by weight; and
  (iii) suspending in the solution obtained in step (ii) catalytic particles containing M-X compounds in different oxidation states that can catalyze the polysulfide redox reaction. Catalytic particles can be introduced in an amount in the range from 0.001% by weight to 10% by weight, preferably from 0.01% by weight to 5% by weight, still more preferably from 0.1% by weight to 1% by weight.

Figure 13:
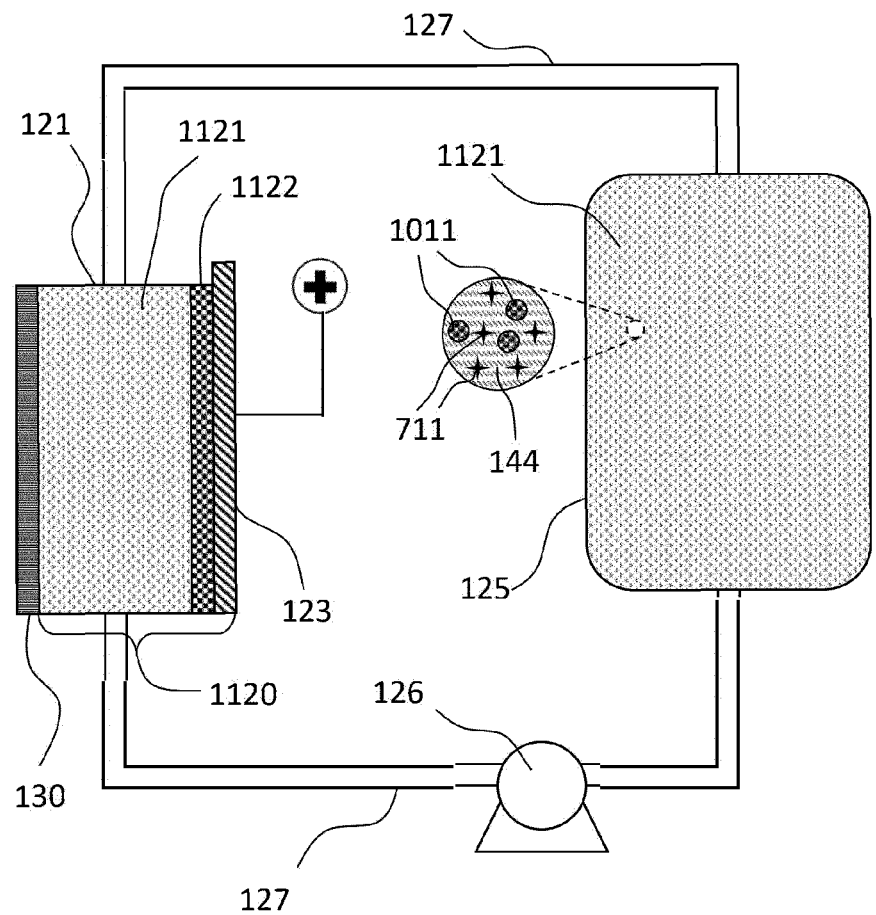

A second half-cell, 1120, using the catholyte according to this sixth possible composition is represented schematically in FIG. 13. The catholyte of this embodiment, 1121, consists of the supporting electrolyte, 144, added with electroactive particles 1011 containing sulfide ions, and catalytic particles 711. Inside the electrochemical cell the catholyte is in contact with the planar electrode, 1122.

In the seventh embodiment of the catholyte of the invention, this includes (i) electroactive particles containing sulfide ions dispersed in a supporting electrolyte, (ii) catalytic particles necessary to promote redox reaction of the catholyte and (iii) flowable electrodes in form of conductive particles, preferably carbon-based particles, forming a percolated conductive network in/on which redox reaction can occur. The average size of all dispersed particles is in the range from 10 nm to 1000 µm, preferably from 20 nm to 500 µm, more preferably from 20 nm to 200 µm, still more preferably from 20 nm to 10 µm.
  This electrolyte may be prepared by:
  (i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;
  (ii) dissolving or suspending in the solution obtained in step (i) organic and/or inorganic sulfide-based electroactive particles containing sulfide ions in different oxidation states that can be subjected to redox reaction. The redox reaction can lead to a change in the coordination number of the ion either in the crystalline lattice of the electroactive particle or at the interface between the electroactive particle and the current collector. Electroactive particles, acting as source of polysulfide ions, can be introduced in an amount in the range from 0.01% by weight to 50% by weight, preferably from 1% by weight to 30% by weight, still more preferably from 5% by weight to 20% by weight;
  (iii) suspending in the solution obtained in step (ii) catalytic particles containing M-X compounds in different oxidation states that can catalyze the polysulfide redox reaction. Catalytic particles, can be introduced in an amount in the range from 0.001% by weight to 10% by weight, preferably from 0.01% by weight to 5% by weight, still more preferably from 0.1% by weight to 1% by weight; and
  (iv) suspending in the solution obtained in step (iii) conductive particles, preferably carbon-based particles, selected among graphene, expanded graphite, reduced graphene oxide, active carbon, carbon blacks, acetylene black, carbon nanotubes or a combination of two or more thereof introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight.

Figure 14:
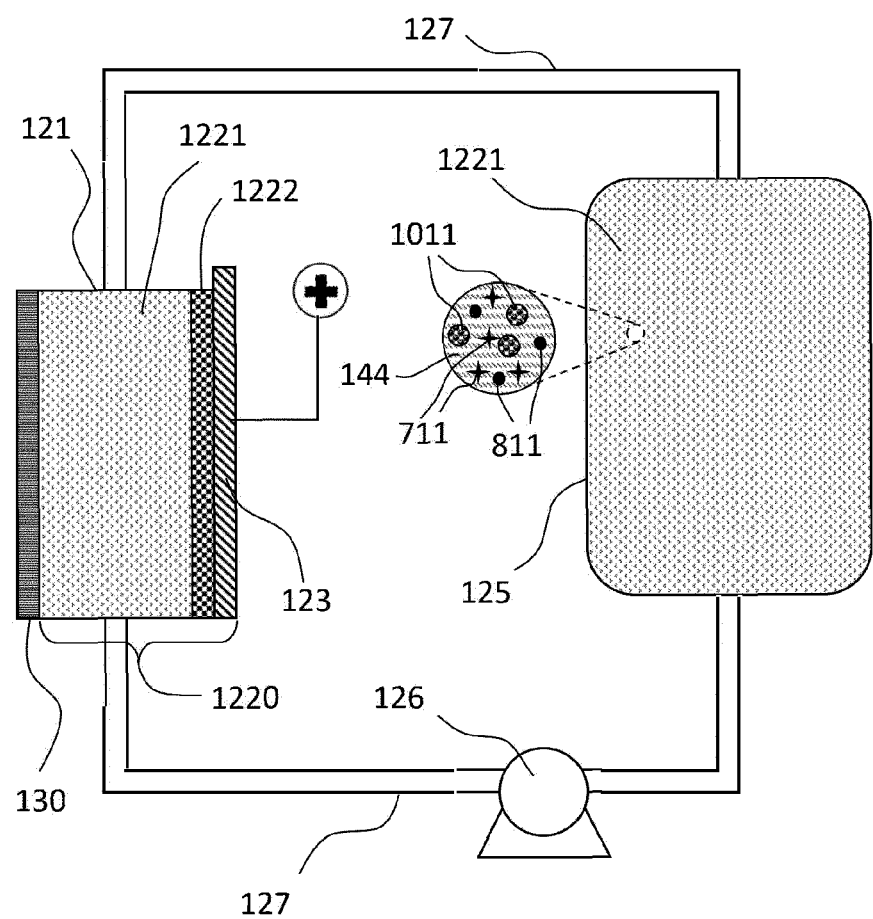

A second half-cell, 1220, using the catholyte according to this seventh possible composition is represented schematically in FIG. 14. The catholyte of this embodiment, 1221, consists of the supporting electrolyte, 144, added with electroactive particles 1011 containing sulfide ions, catalytic particles 711 and conductive particles 811, which form in this case the slurry/flowable electrode in contact with a 2D electrode 1222.

In the eighth embodiment of the invention, the catholyte includes some electroactive particles containing sulfide ions decorated by catalyst particles dispersed in a supporting electrolyte and a static electrode with/without catalyst on which redox reaction can occur. The average size of the decorated electroactive particles is in the range from 10 nm to 1000 μm, preferably from 20 nm to 500 μm, more preferably from 20 nm to 200 μm, still more preferably from 20 nm to 10 μm.

This electrolyte may be prepared by:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M; and
(ii) dissolving or suspending in the solution obtained in step (i) organic and/or inorganic sulfide-based electroactive particles containing sulfide ions in different oxidation states that can be subjected to redox reaction. The redox reaction can occur at the interface between the electroactive particle and the electrode thanks to the presence of the catalyst on the surface of the electroactive particle itself. These decorated electroactive particles, acting as source both of polysulfide ions and catalyst, can be introduced in an amount in the range from 0.01% by weight to 50% by weight, preferably from 1% by weight to 30% by weight, still more preferably from 5% by weight to 20% by weight.

Figure 15:
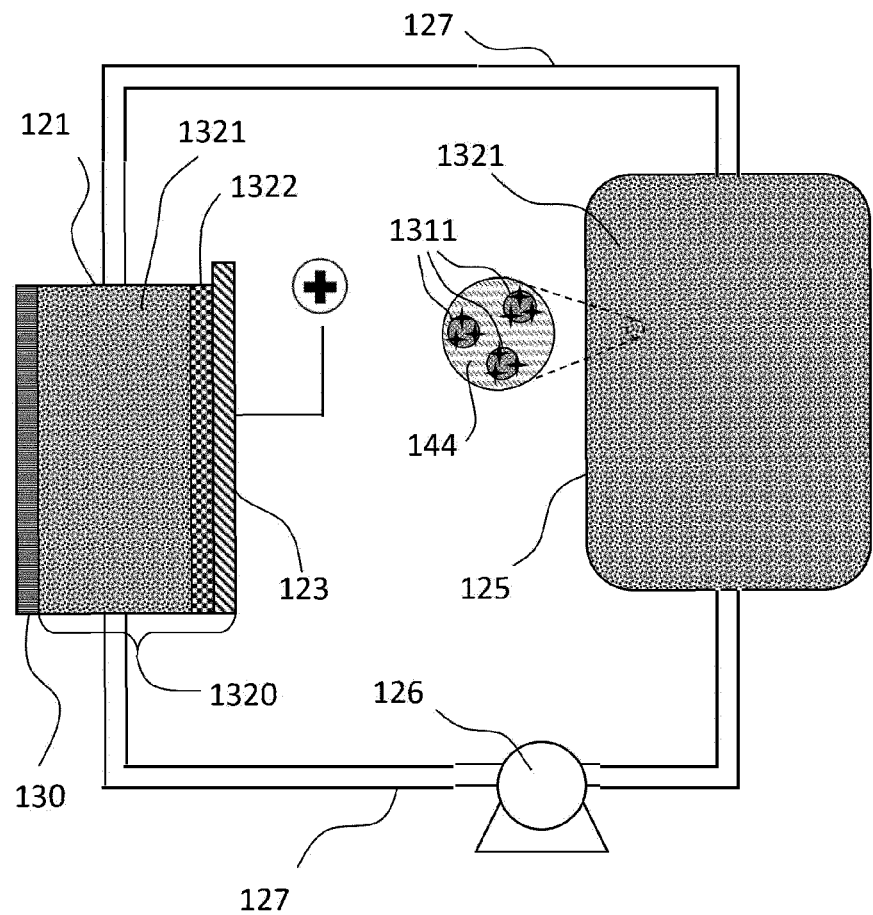

This composition of catholyte, 1321, and the resulting second half-cell are represented in FIG. 15, in which numeral 1311 in the inset indicates the sulfide-based electroactive particles having on their surface the catalyst particles, suspended in the supporting electrolyte 144.

According to a ninth possible embodiment of the invention, the catholyte includes some electroactive particles containing sulfide ions decorated by catalyst particles dispersed in a supporting electrolyte and flowable electrodes in form of conductive particles, preferably carbon-based particles, forming a percolated conductive network in/on which redox reaction can occur. The average size of the decorated electroactive particles is in the range from 10 nm to 1000 μm, preferably from 20 nm to 500 μm, more preferably from 20 nm to 200 μm, still more preferably from 20 nm to 10 μm.

This electrolyte may be prepared by:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;
(ii) dissolving or suspending in the solution obtained in step (i) organic and/or inorganic sulfide-based electroactive particles containing sulfide ions in different oxidation states that can be subjected to redox reaction. The redox reaction can occur at the interface between the electroactive particle and the flowable electrode thanks to the presence of the catalyst on the surface of the electroactive particle itself. These decorated electroactive particles, acting as source both of polysulfide ions and catalyst, can be introduced in an amount in the range from 0.01% by weight to 50% by weight, preferably from 1% by weight to 30% by weight, still more preferably from 5% by weight to 20% by weight; and
(iii) suspending in the solution obtained in step (ii) conductive particles, preferably carbon-based particles, selected among graphene, expanded graphite, reduced graphene oxide, active carbon, carbon blacks, acetylene black, carbon nanotubes or a combination of two or more thereof are then introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight.

Figure 16:
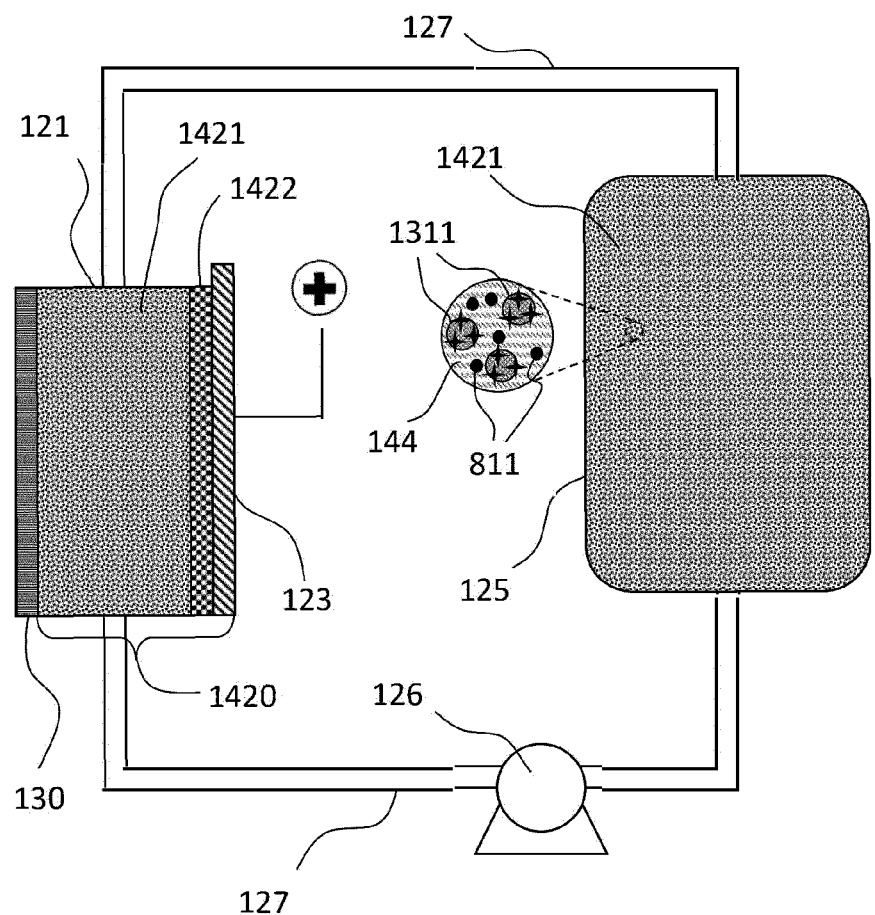

The second half-cell, 1420, obtained with this ninth possible catholyte composition, 1421, is represented schematically in FIG. 16; numeral 1311 in the inset indicates the sulfide-based electroactive particles having on their surface the catalyst particles, while numeral 811 indicates the conductive particles. The particles are dispersed in the supporting electrolyte 144.

In a tenth possible embodiment of the invention, the catholyte includes some electroactive particles containing sulfide ions dispersed in a supporting electrolyte and flowable electrodes in form of conductive particles, preferably carbon-based particles, decorated by catalyst particles, forming a percolated conductive network in/on which redox reaction can occur. The average size of the particles is in the range from 10 nm to 1000 μm, preferably from 20 nm to 500 μm, more preferably from 20 nm to 200 μm, still more preferably from 20 nm to 10 μm.

In this case, the catholyte may be prepared:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;
(ii) dissolving or suspending in the solution obtained in step (i) organic and/or inorganic sulfide-based electroactive particles containing sulfide ions in different oxidation states that can be subjected to redox reaction. The redox reaction can be led by a change in the coordination number of the ion either in the crystalline lattice of the electroactive particle or at the interface between the electroactive particle and the current collector. Electroactive particles, acting as source of polysulfide ions, can be introduced in an amount in the range from 0.01% by weight to 50% by weight, preferably from 1% by weight to 30% by weight, still more preferably from 5% by weight to 20% by weight; and (iii) suspending in the solution obtained in step (ii) conductive particles, preferably carbon-based particles, selected among graphene, expanded graphite, reduced graphene oxide, active carbon, carbon blacks, acetylene black, carbon nanotubes or a combination of two or more thereof, decorated by catalyst particles and introduced to form a conductive percolation path inside the electrolyte and to provide catalyst for electrochemical reactions. In a preferred embodiment, the overall concentration ranges from 0.01% by weight to 20% by weight, preferably from 0.1% by weight to 10% by weight, still more preferably from 1% by weight to 5% by weight.

Figure 17:
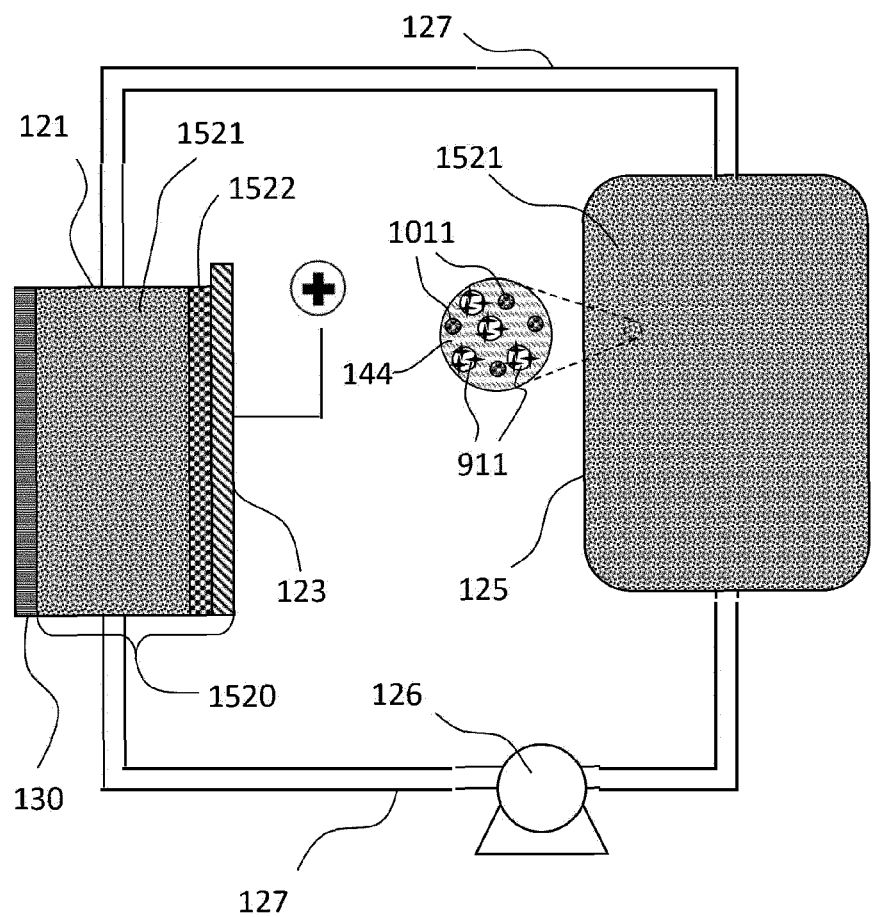

The second half-cell, 1520, obtained with this tenth possible catholyte composition, 1521, is represented schematically in FIG. 17; numeral 1011 in the inset indicates the sulfide-based electroactive particles, while numeral 911 indicates the conductive particles having on their surface the catalyst particles. The particles are dispersed in the supporting electrolyte 144 and inside the electrochemical cell the catholyte is in contact with the planar electrode 1522.

In the eleventh embodiment of the catholyte of the invention, this includes (i) electroactive particles containing sulfide ions dispersed in a supporting electrolyte (ii) catalytic particles necessary to promote redox reaction of the catholyte and (iii) flowable electrodes in form of conductive particles, preferably carbon-based particles, forming a percolated conductive network in/on which redox reaction can occur. The average size of all dispersed particles is in the range from 10 nm to 1000 μm, preferably from 20 nm to 500 μm, more preferably from 20 nm to 200 μm, still more preferably from 20 nm to 10 μm.

This electrolyte may be prepared by:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;
(ii) dissolving or suspending in the solution obtained in step (i) organic and/or inorganic sulfide-based electroactive particles containing sulfide ions in different oxidation states that can be subjected to redox reaction. The redox reaction can lead to a change in the coordination number of the ion either in the crystalline lattice of the electroactive particle or at the interface between the electroactive particle and the current collector. Electroactive particles, acting as source of polysulfide ions, can be introduced in an amount in the range from 0.01% by weight to 50% by weight, preferably from 1% by weight to 30% by weight, still more preferably from 5% by weight to 20% by weight;
(iii) suspending in the solution obtained in step (ii) conductive particles, preferably carbon-based particles, selected among graphene, expanded graphite, reduced graphene oxide, active carbon, carbon blacks, acetylene black, carbon nanotubes or a combination of two or more thereof introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight.

Figure 18:
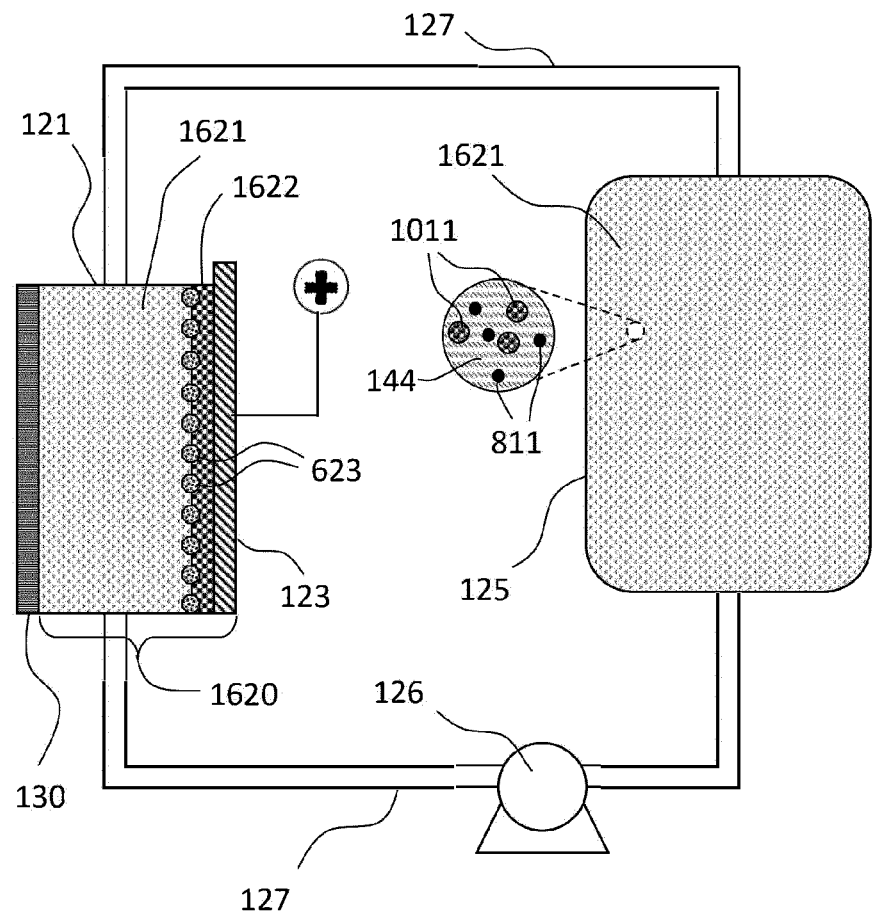

A second half-cell, 1620, using the catholyte according to this eleventh possible composition is represented schematically in FIG. 18. The catholyte of this embodiment, 1621, consists of the supporting electrolyte, 144, added with electroactive particles 1011 containing sulfide ions, and conductive particles 811, which form in this case the slurry/flowable electrode in contact with a 2D catalyst-modified static electrode 1622 similar to electrode 622, comprising catalyst particles 623 on its surface.

A twelfth possible embodiment of the invention is a catholyte including electroactive particles containing sulfide ions dispersed in a supporting electrolyte and reacting by means of redox reactions thanks to the presence of the catalyst on the surface of the static electrode. The average size of the electroactive particles is in the range from 10 nm to 1000 μm, preferably from 20 nm to 500 μm, more preferably from 20 nm to 200 μm, still more preferably from 20 nm to 10 μm. This electrolyte may be prepared by:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M; and
(ii) dissolving in the solution obtained in step (i) sulfide salts and elemental sulfur in a ratio above 1:1 ($A_2S_2$), preferably a ratio comprised between 1:3 and 1:4 in order to produce $A_2S_n$ where n=4-5 (where A might be selected among Li, Na, K and a combination of them) for an overall concentration of $S_n^{2-}$ ions between 0.5 M and 8 M, preferably from 1 M to 7 M, still more preferably from 2 M to 6 M; and
(iii) organic and/or inorganic sulfide-based electroactive particles containing sulfide ions in different oxidation states that can be subjected to redox reaction. The redox reaction can lead to a change in the coordination number of the ion either in the crystalline lattice of the electroactive particle or at the interface between the electroactive particle and the current collector. Electroactive particles, acting as source of polysulfide ions, can be introduced in an amount in the range from 0.01% by weight to 50% by weight, preferably from 1% by weight to 30% by weight, still more preferably from 5% by weight to 20% by weight.

Figure 19:
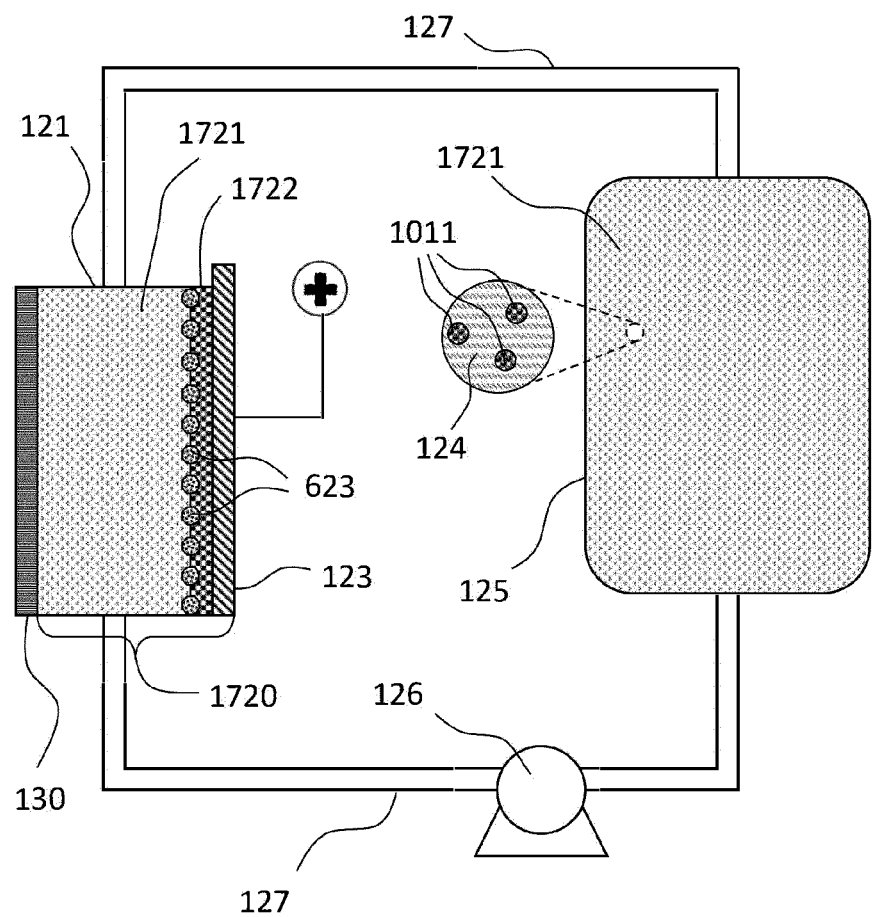

A second half-cell, 1720, using the catholyte according to this twelfth possible composition is represented schematically in FIG. 19. The catholyte of this embodiment, 1721, is obtained adding to the electrolyte 124 the electroactive particles 1011 containing sulfide ions. In this embodiment of the invention, the electrode 1722 can be a catalyst-modified static electrode similar to electrode 622.

In a thirteenth embodiment of the invention, the catholyte contains some electroactive particles containing sulfide ions dispersed in a supporting electrolyte and reacting by means of redox reactions thanks to the presence of catalytic particles co-dispersed in it. The average size of the particles is in the range from 10 nm to 1000 μm, preferably from 20 nm to 500 μm, more preferably from 20 nm to 200 μm, still more preferably from 20 nm to 10 μm.

This electrolyte may be prepared by:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;

(ii) dissolving in the solution obtained in step (i) sulfide salts and elemental sulfur in a ratio above 1:1 ($A_2S_2$), preferably a ratio comprised between 1:3 and 1:4 in order to produce $A_2S_n$ where n=4-5 (where A might be selected among Li, Na, K and a combination of them) for an overall concentration of $S_n^{2-}$ ions between 0.5 M and 8 M, preferably from 1 M to 7 M, still more preferably from 2 M to 6 M; and (iii) dissolving or suspending in the solution obtained in step (i) organic and/or inorganic sulfide-based electroactive particles containing sulfide ions in different oxidation states that can be subjected to redox reaction. The redox reaction can lead to a change in the coordination number of the ion either in the crystalline lattice of the electroactive particle or at the interface between the electroactive particle and the current collector. Electroactive particles, acting as source of polysulfide ions, can be introduced in an amount in the range from 0.01% by weight to 50% by weight, preferably from 1% by weight to 30% by weight, still more preferably from 5% by weight to 20% by weight; and (iv) suspending in the solution obtained in step (iii) catalytic particles containing M-X compounds in different oxidation states that can catalyse the polysulfide redox reaction. Catalytic particles can be introduced in an amount in the range from 0.001% by weight to 10% by weight, preferably from 0.01% by weight to 5% by weight, still more preferably from 0.1% by weight to 1% by weight.

Figure 20:
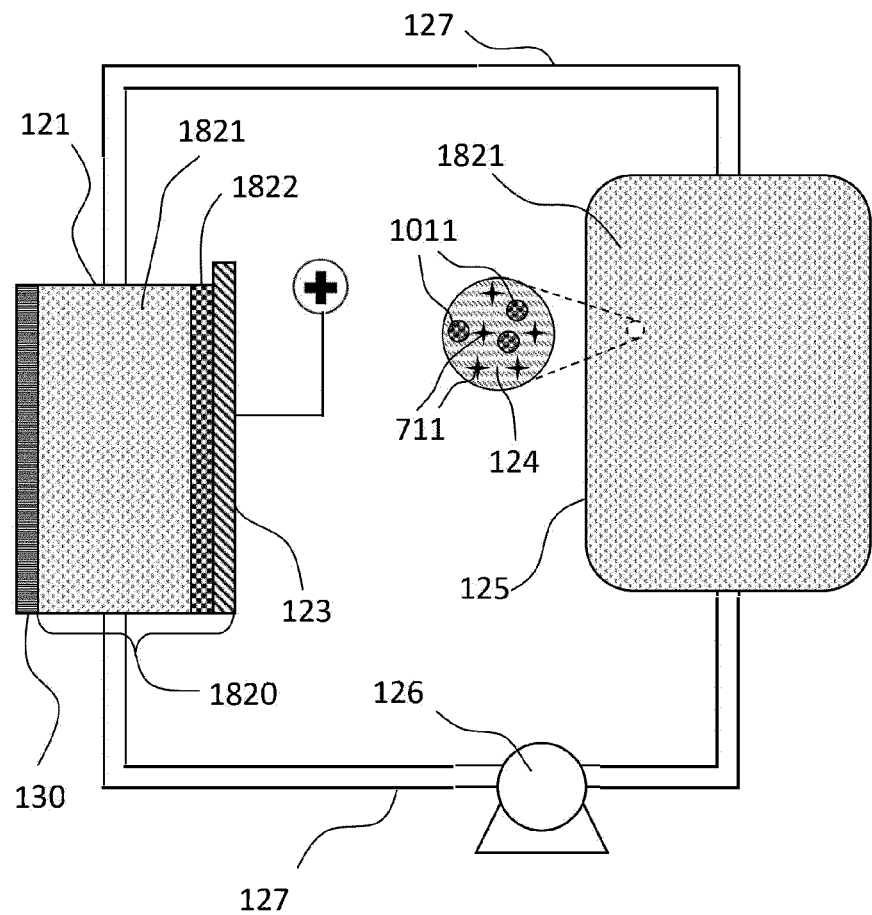

A second half-cell, 1820, using the catholyte according to this thirteenth possible composition is represented schematically in FIG. 20. The catholyte of this embodiment, 1821, consists of the electrolyte 124, added with electroactive particles 1011 containing sulfide ions, and catalytic particles 711. Inside the electrochemical cell the catholyte is in contact with the planar electrode, 1822.

In the fourteenth embodiment of the catholyte of the invention, this includes (i) electroactive particles containing sulfide ions dispersed in a supporting electrolyte (ii) catalytic particles necessary to promote redox reaction of the catholyte and (iii) flowable electrodes in form of conductive particles, preferably carbon-based particles, forming a percolated conductive network in/on which redox reaction can occur. The average size of all dispersed particles is in the range from 10 nm to 1000 μm, preferably from 20 nm to 500 μm, more preferably from 20 nm to 200 μm, still more preferably from 20 nm to 10 μm.

This electrolyte may be prepared by:

(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;

(ii) dissolving in the solution obtained in step (i) sulfide salts and elemental sulfur in a ratio above 1:1 ($A_2S_2$), preferably a ratio comprised between 1:3 and 1:4 in order to produce $A_2S_n$ where n=4-5 (where A might be selected among Li, Na, K and a combination of them) for an overall concentration of $S_n^{2-}$ ions between 0.5 M and 8 M, preferably from 1 M to 7 M, still more preferably from 2 M to 6 M; and (iii) dissolving or suspending in the solution obtained in step (ii) organic and/or inorganic sulfide-based electroactive particles containing sulfide ions in different oxidation states that can be subjected to redox reaction. The redox reaction can lead to a change in the coordination number of the ion either in the crystalline lattice of the electroactive particle or at the interface between the electroactive particle and the current collector. Electroactive particles, acting as source of polysulfide ions, can be introduced in an amount in the range from 0.01% by weight to 50% by weight, preferably from 1% by weight to 30% by weight, still more preferably from 5% by weight to 20% by weight;

(iv) suspending in the solution obtained in step (iii) catalytic particles containing M-X compounds in different oxidation states that can catalyze the polysulfide redox reaction. Catalytic particles, can be introduced in an amount in the range from 0.001% by weight to 10% by weight, preferably from 0.01% by weight to 5% by weight, still more preferably from 0.1% by weight to 1% by weight; and (v) suspending in the solution obtained in step (iv) conductive particles, preferably carbon-based particles, selected among graphene, expanded graphite, reduced graphene oxide, active carbon, carbon blacks, acetylene black, carbon nanotubes or a combination of two or more thereof introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight.

Figure 21:
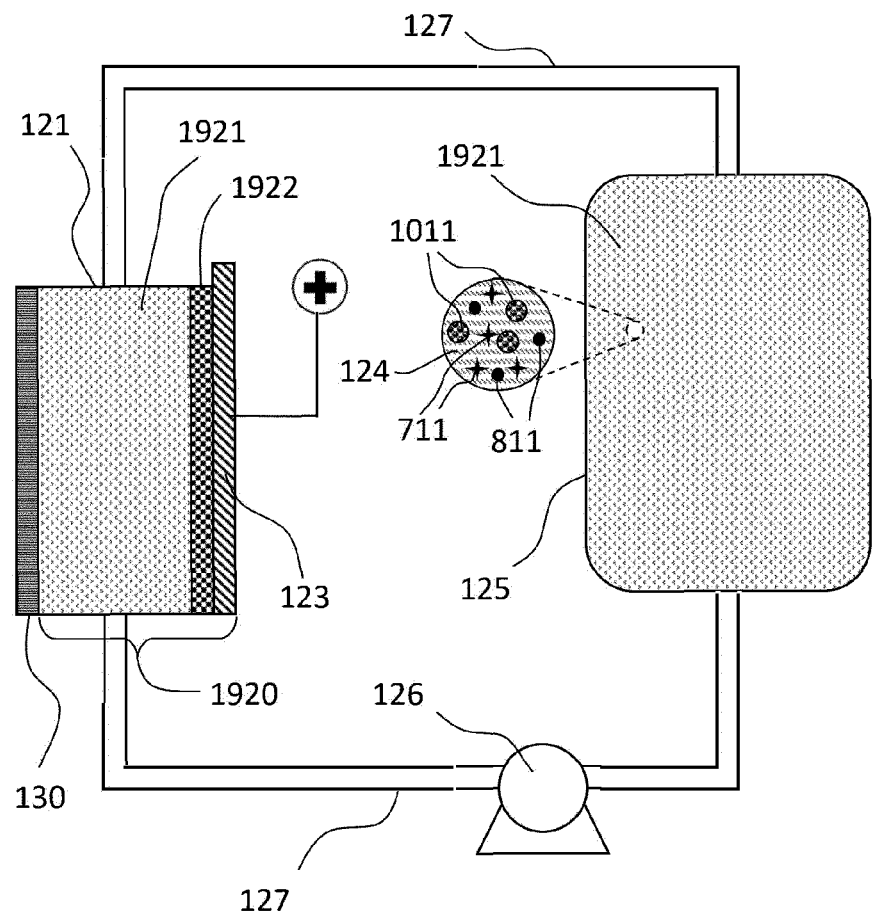

A second half-cell, 1920, using the catholyte according to this fourteenth possible composition is represented schematically in FIG. 21. The catholyte of this embodiment, 1921, consists of the electrolyte 124 added with electroactive particles 1011 containing sulfide ions, catalytic particles 711 and conductive particles 811, which form in this case the slurry/flowable electrode in contact with a 2D electrode 1922.

In another (fifteenth) embodiment of the invention, the catholyte includes some electroactive particles containing sulfide ions decorated by catalyst particles dispersed in a supporting electrolyte and a static electrode with/without catalyst on which redox reaction can occur. The average size of the decorated electroactive particles is in the range from 10 nm to 1000 μm, preferably from 20 nm to 500 μm, more preferably from 20 nm to 200 μm, still more preferably from 20 nm to 10 μm.

This electrolyte may be prepared by:

(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M; and (ii) dissolving in the solution obtained in step (i) sulfide salts and elemental sulfur in a ratio above 1:1 ($A_2S_2$), preferably a ratio comprised between 1:3 and 1:4 in order to produce $A_2S_n$ where n=4-5 (where A might be selected among Li, Na, K and a combination of them) for an overall concentration of $S_n^{2-}$ ions between 0.5 M and 8 M, preferably from 1 M to 7 M, still more preferably from 2 M to 6 M; and (iii) dissolving or suspending in the solution obtained in step (ii) organic and/or inorganic sulfide-based electroactive particles containing sulfide ions in different oxidation states that can be subjected to redox reaction. The redox reaction can occur at the interface between the electroactive particle and the electrode thanks to the presence of the catalyst on the surface of the electroactive particle itself. These decorated electroactive particles, acting as source both of polysulfide ions and catalyst, can be introduced in an amount in the range from 0.01% by weight to 50% by weight, preferably from 1% by weight to 30% by weight, still more preferably from 5% by weight to 20% by weight.

Figure 22:
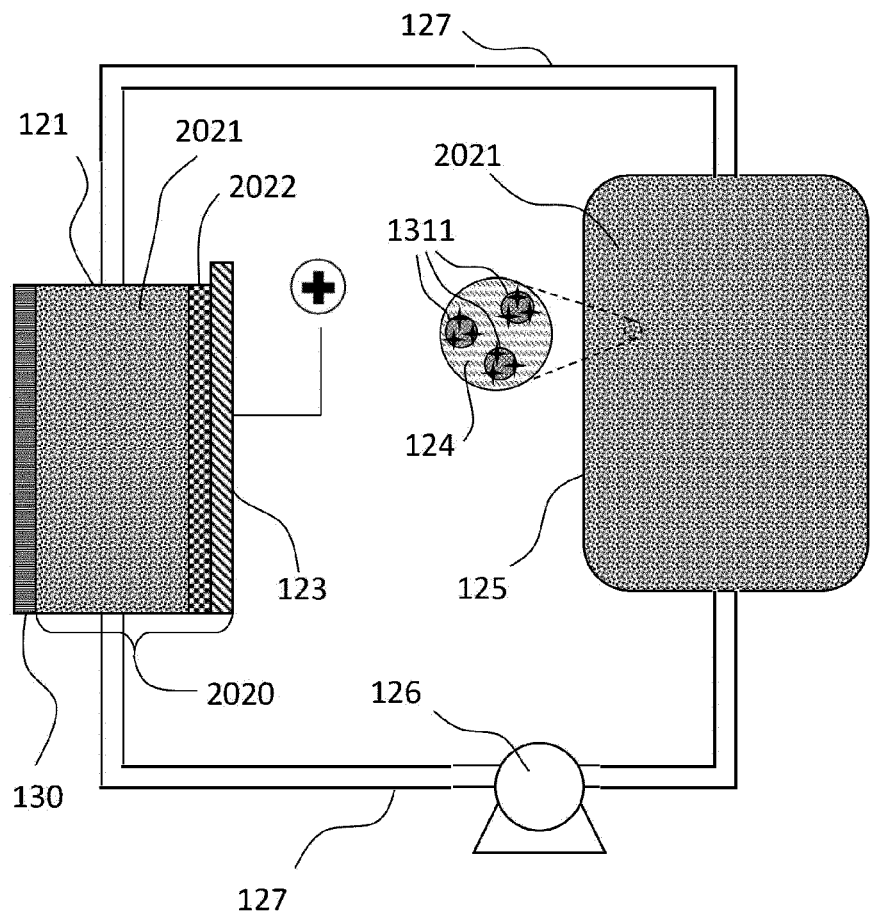

This composition of catholyte 2021 and the resulting second half-cell 2020 are represented in FIG. 22, in which numeral 1311 in the inset indicates the sulfide-based electroactive particles having on their surface the catalyst particles, suspended in electrolyte 124.

According to a sixteenth possible embodiment of the invention, the catholyte includes some electroactive particles containing sulfide ions decorated by catalyst particles dispersed in a supporting electrolyte and flowable electrodes in form of conductive particles, preferably carbon-based particles, forming a percolated conductive network in/on which redox reaction can occur. The average size of the decorated electroactive particles is in the range from 10 nm to 1000 μm, preferably from 20 nm to 500 μm, more preferably from 20 nm to 200 μm, still more preferably from 20 nm to 10 μm. This electrolyte may be prepared by:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;
(ii) dissolving in the solution obtained in step (i) sulfide salts and elemental sulfur in a ratio above 1:1 ($A_2S_2$), preferably a ratio comprised between 1:3 and 1:4 in order to produce $A_2S_n$ where n=4-5 (where A might be selected among Li, Na, K and a combination of them) for an overall concentration of $S_n^{2-}$ ions between 0.5 M and 8 M, preferably from 1 M to 7 M, still more preferably from 2 M to 6 M; and
(iii) dissolving or suspending in the solution obtained in step (ii) organic and/or inorganic sulfide-based electroactive particles containing sulfide ions in different oxidation states that can be subjected to redox reaction. The redox reaction can occur at the interface between the electroactive particle and the flowable electrode thanks to the presence of the catalyst on the surface of the electroactive particle itself. These decorated electroactive particles, acting as source both of polysulfide ions and catalyst, can be introduced in an amount in the range from 0.01% by weight to 50% by weight, preferably from 1% by weight to 30% by weight, still more preferably from 5% by weight to 20% by weight; and
(iv) suspending in the solution obtained in step (iii) conductive particles, preferably carbon-based particles, selected among graphene, expanded graphite, reduced graphene oxide, active carbon, carbon blacks, acetylene black, carbon nanotubes or a combination of two or more thereof are then introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight.

Figure 23:
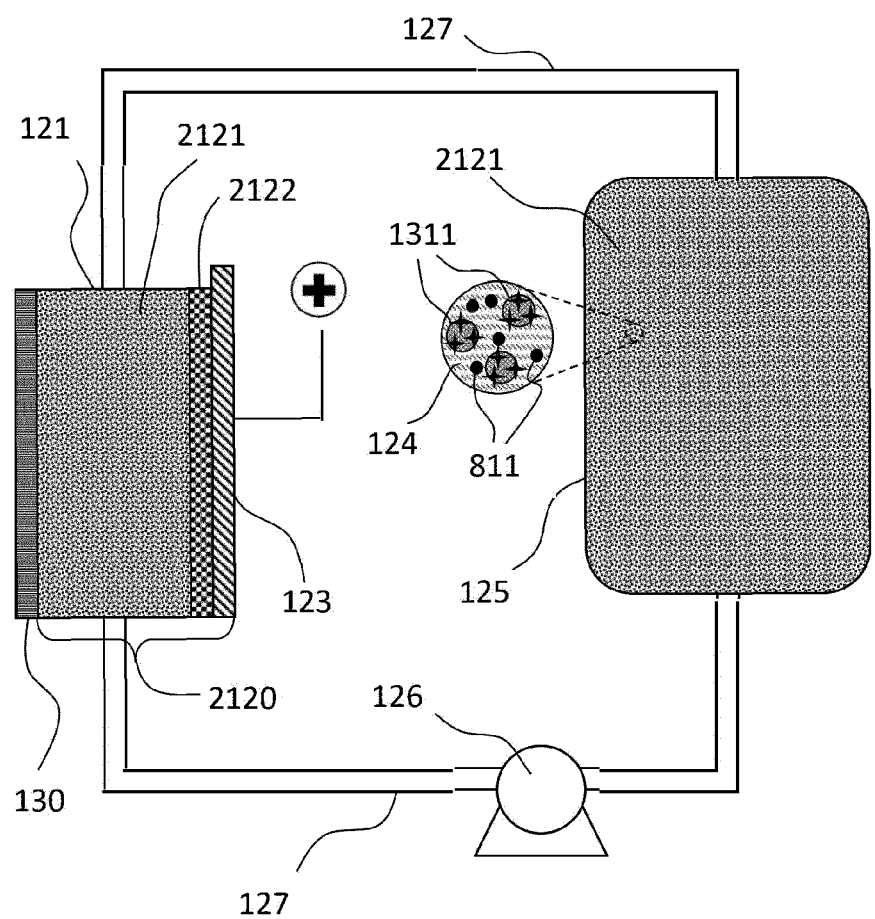

The second half-cell, 2120, obtained with this sixteenth possible catholyte composition, 2121, is represented schematically in FIG. 23; numeral 1311 in the inset indicates the sulfide-based electroactive particles having on their surface the catalyst particles, while numeral 811 indicates the conductive particles. The particles are dispersed in the electrolyte 124.

In a seventeenth possible embodiment of the invention, the catholyte includes some electroactive particles containing sulfide ions dispersed in a supporting electrolyte and flowable electrodes in form of conductive particles, preferably carbon-based particles, decorated by catalyst particles, forming a percolated conductive network in/on which redox reaction can occur. The average size of the particles is in the range from 10 nm to 1000 μm, preferably from 20 nm to 500 μm, more preferably from 20 nm to 200 μm, still more preferably from 20 nm to 10 μm.

In this case, the catholyte may be prepared:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;
(ii) dissolving in the solution obtained in step (i) sulfide salts and elemental sulfur in a ratio above 1:1 ($A_2S_2$), preferably a ratio comprised between 1:3 and 1:4 in order to produce $A_2S_n$ where n=4-5 (where A might be selected among Li, Na, K and a combination of them) for an overall concentration of $S_n^{2-}$ ions between 0.5 M and 8 M, preferably from 1 M to 7 M, still more preferably from 2 M to 6 M; and
(iii) dissolving or suspending in the solution obtained in step (i) organic and/or inorganic sulfide-based electroactive particles containing sulfide ions in different oxidation states that can be subjected to redox reaction. The redox reaction can be led by a change in the coordination number of the ion either in the crystalline lattice of the electroactive particle or at the interface between the electroactive particle and the current collector. Electroactive particles, acting as source of polysulfide ions, can be introduced in an amount in the range from 0.01% by weight to 50% by weight, preferably from 1% by weight to 30% by weight, still more preferably from 5% by weight to 20% by weight; and
(iv) suspending in the solution obtained in step (ii) conductive particles, preferably carbon-based particles, selected among graphene, expanded graphite, reduced graphene oxide, active carbon, carbon blacks, acetylene black, carbon nanotubes or a combination of two or more thereof, decorated by catalyst particles and introduced to form a conductive percolation path inside the electrolyte and to provide catalyst for electrochemical reactions. In a preferred embodiment, the overall concentration ranges from 0.01% by weight to 20% by weight, preferably from 0.1% by weight to 10% by weight, still more preferably from 1% by weight to 5% by weight.

Figure 24:
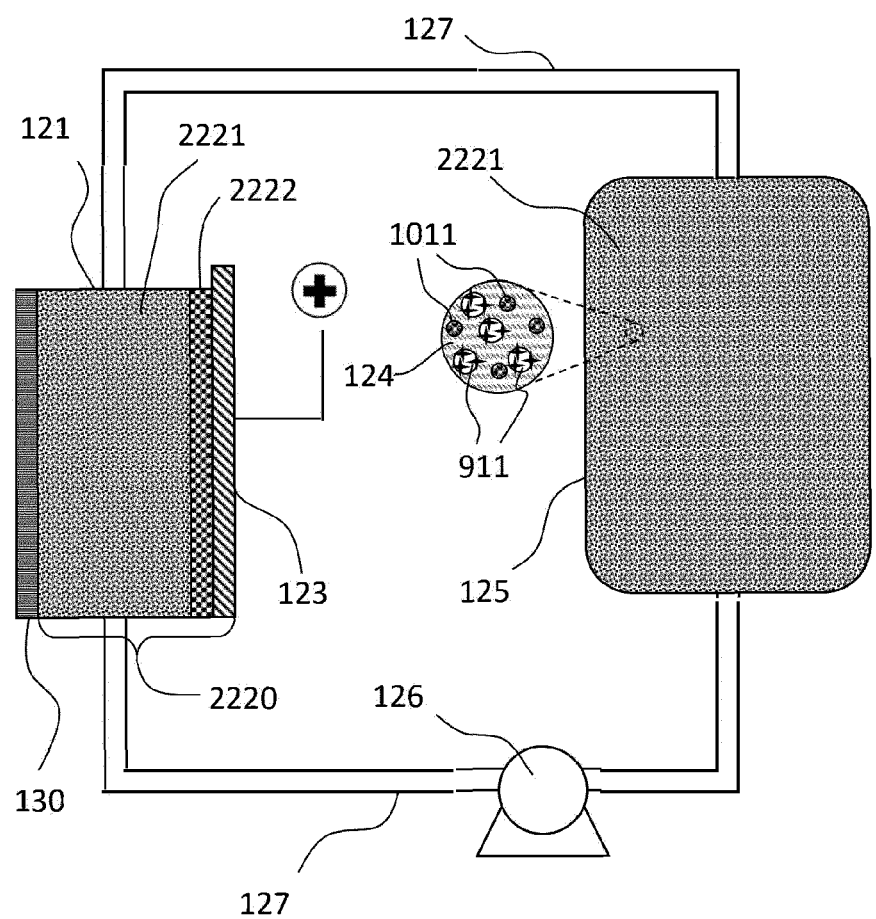

The second half-cell, 2220, obtained with this eighteenth possible catholyte composition, 2221, is represented schematically in FIG. 24; numeral 1011 in the inset indicates the sulfide-based electroactive particles, while numeral 911 indicates the conductive particles having on their surface the catalyst particles. The particles are dispersed in the electrolyte 124 and inside the electrochemical cell the catholyte is in contact with the planar electrode 2222.

In the eighteenth embodiment of the catholyte of the invention, this includes (i) electroactive particles containing sulfide ions dispersed in a supporting electrolyte (ii) catalytic particles necessary to promote redox reaction of the catholyte and (iii) flowable electrodes in form of conductive particles, preferably carbon-based particles, forming a percolated conductive network in/on which redox reaction can occur. The average size of all dispersed particles is in the range from 10 nm to 1000 µm, preferably from 20 nm to 500 µm, more preferably from 20 nm to 200 µm, still more preferably from 20 nm to 10 µm.

This electrolyte may be prepared by:
(i) dissolving one or more compounds selected among sodium hydroxide, potassium hydroxide, lithium hydroxide, ammonium hydroxide, bismuth hydroxide or a combination of two or more thereof in the solvent. In a preferred embodiment, the overall concentration of hydroxides is between 0.5 M and 20 M, preferably from 1 M to 12 M, still more preferably from 1.5 M to 10 M;
(ii) dissolving in the solution obtained in step (i) sulfide salts and elemental sulfur in a ratio above 1:1 ($A_2S_2$), preferably a ratio comprised between 1:3 and 1:4 in order to produce $A_2S_n$ where n=4-5 (where A might be selected among Li, Na, K and a combination of them) for an overall concentration of $S_n^{2-}$ ions between 0.5 M and 8 M, preferably from 1 M to 7 M, still more preferably from 2 M to 6 M; and
(iii) dissolving or suspending in the solution obtained in step (ii) organic and/or inorganic sulfide-based electroactive particles containing sulfide ions in different oxidation states that can be subjected to redox reaction. The redox reaction can lead to a change in the coordination number of the ion either in the crystalline lattice of the electroactive particle or at the interface between the electroactive particle and the current collector. Electroactive particles, acting as source of polysulfide ions, can be introduced in an amount in the range from 0.01% by weight to 50% by weight, preferably from 1% by weight to 30% by weight, still more preferably from 5% by weight to 20% by weight;
(iv) suspending in the solution obtained in step (iii) conductive particles, preferably carbon-based particles, selected among graphene, expanded graphite, reduced graphene oxide, active carbon, carbon blacks, acetylene black, carbon nanotubes or a combination of two or more thereof introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight.

Figure 25:
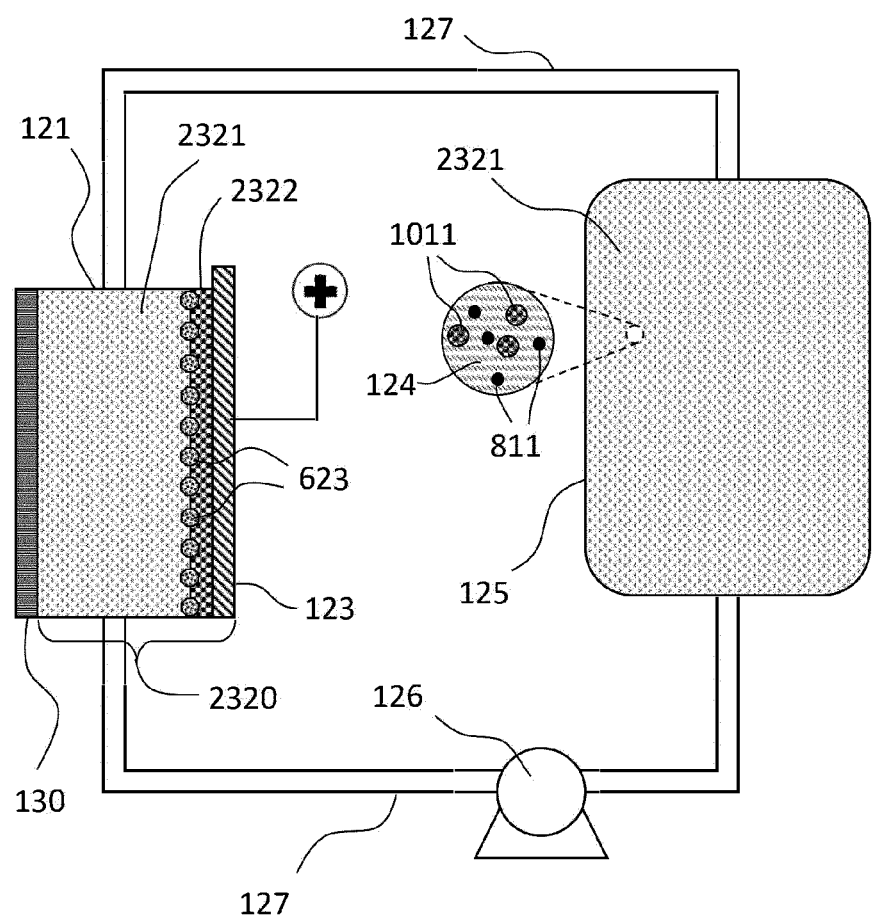

A second half-cell, 2320, using the catholyte according to this nineteenth possible composition is represented schematically in FIG. 25. The catholyte of this embodiment, 2321, consists of the electrolyte 124, added with electroactive particles 1011 containing sulfide ions, and conductive particles 811, which form in this case the slurry/flowable electrode in contact with a 2D catalyst-modified static electrode 2322 similar to electrode 622.

Any one of the catholytes described above can be obtained using sulfur-based solutions, preferably selected among those coming from refining processes for the treatment of sulfur dioxide or any other S-containing waste compounds and/or solutions.

Any one of the catholytes described above may further contain plasticizers and/or thickeners as additives for stabilizing the operation of the second half-cell and increasing the battery performances.

Plasticizer additives that can be added comprise polyols (such as polyethylene glycol (PEG), ethylene glycol, diethylene glycol (DEG), tetraethylene glycol (TEG), propylene glycol (PG), glycerol, mannitol, sorbitol, xylitol), monosaccharides (e.g., glucose, mannose, fructose, sucrose), fatty acids, urea, ethanolamine, triethanolamine, vegetable oils, lecithin, waxes, amino acids, surfactants and oleic acid, in a range between 0.1% by weight and 5% by weight, more preferably between 0.3% by weight and 3% by weight, still more preferably between 0.5% by weight and 1% by weight.

Thickener additives guarantee the best particles dispersion and a suitable electrolyte viscosity in case of dispersed particles and dispersed catalysts. The amount of these organic additives is comprised in a range between 0.0001% to 10% by weight of the electrolyte, preferably from 0.1% by weight to 5% by weight, still more preferably from 0.1% by weight to 1% by weight. In a preferred embodiment, the catholyte contains organic additives selected among xanthan gum, gum arabic, carboxymethyl cellulose, chitosan, agar-agar, sodium alginate and polyethylene oxide.

The Electrodes

The electrodes used in the Zn-polysulfide RFB of the invention can be selected from any kind of electrode material.

The electrodes may be made of carbon-based or metallic material (for instance a plate or in the form of a foam or a net), or they may be in the form of dispersed electrodes. Herein, the former the electrode is indicated as static electrode and can be a flow-through 3D one like carbon felt or a planar 2D one like a graphite plate; in the latter case it is indicated as flowable electrode.

Carbon-based static electrodes may be e.g., of graphite sheets, carbon felt, or carbon-based fabric; alternatively, carbon-based electrodes are formed of carbon-based conductive particles dispersed in a polymer matrix. Carbon-based electrodes are suitable for both the first and the second half-cells.

Preferably, metallic static electrodes for use in the first half-cell may consist in a Zn metallic plate, coated Zn metallic plate, Zn metallic foams, Zn coated metallic foams or net. In the second half-cell, the static electrodes, both metallic or carbon-based electrodes, are modified by a catalyst(s), as described later, necessary to promote and sustain redox reactions of the dissolved species. Preferably, in the second half-cell, the carbon-based electrode is a carbon felt modified electrode. In another preferred embodiment of the invention, the metallic electrodes to be used in the second half-cell are modified metallic foams.

Flowable dispersed electrodes, in the form of a percolated network of dispersed conductive particles, may consists in organic or inorganic conductive particles, functionalized particles or a fluidized bed electrode in the form of particles. These electrodes can be dispersed in both electrolytes; they are particles in/on which redox reactions can occur. Examples of these dispersed electrodes are metallic particles, expanded graphite, graphite, graphene, graphene oxide, reduced graphene oxide, active carbon, transition metal oxide particles, carbon-based, materials decorated with metal oxide particles, carbon nanotubes, carbon blacks particles, acetylene black particles, metal-coated particles or a combination of two or more thereof; The average size of these particles is in the range from 10 nm to 1000 µm, preferably from 20 nm to 500 µm, more preferably from 20 nm to 200 µm, still more preferably from 20 nm to 10 µm. In a preferred embodiment, the flowable electrodes in the Zn-based electrolyte may contain Zn particles, Zn oxide particles, Zn coated particles and/or carbon-based particles, selected among graphene, expanded graphite, reduced graphene oxide, active carbon, carbon blacks, acetylene black, carbon nanotubes or a combination of two or more thereof are then introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight.

In a preferred embodiment, the flowable electrode in the second half-cell may contain conductive particles, preferably carbon-based particles, selected among graphene, expanded graphite, reduced graphene oxide, active carbon, carbon blacks, acetylene black, carbon nanotubes or a combination of two or more thereof are then introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight.

Using flowable dispersed electrodes provide a high surface area to minimize the over potential for zinc plating/dissolution and a higher cycle life (compared to plating on a flat electrode); in case of flowable dispersed electrodes in the polysulfide half-cell, the addition of flowable electrodes can induce a higher battery capacity and a better behavior at high operative rates.

Slurry/flowable electrodes are in the form of an ink of electrically conductive particles in/on which redox reactions can occur. Materials useful for the production of these slurry electrodes are metallic particles, graphite, graphene, graphene oxide, transition metal oxide particles, carbon-based materials decorated with metal oxide particles, carbon nanotubes, carbon blacks particles, acetylene black particles, metal-coated particles, reduced graphene oxide, active carbon or a combination of two or more thereof. The average size of the particles of the slurry is in the range from 10 nm to 1000 µm, preferably from 20 nm to 500 µm, more preferably from 20 nm to 200 µm, still more preferably from 20 nm to 10 µm. Polymeric powders can be introduced in the mixture, acting as binders for the other particles. In a preferred embodiment the amount of conductive carbon particles in the slurry electrode is selected from 50% to 95%, in another embodiment from 60% to 90%, in still another embodiment from 70% to 80% of the overall electrode mass. The amount of active particles containing zinc can be selected from 1% to 50%, more preferably from 5% to 30%, still more preferably from 10% to 20% of the overall electrode mass. The amount of binder is selected from 0.1% to 20%, more preferably from 0.5% to 10%, still more preferably from 5% to 10% of the overall electrode mass. The composition of the slurry can be tuned in order to impart electrode conductivity to the two electrolytes.

In a preferred embodiment, slurry electrodes employed in the first half-cell are a slurry of electrically conductive particles in/on which the $Zn^{2+}/Zn$ redox reaction can occur. Materials useful for the production of these slurry electrodes are metallic particles, Zn particles, Zn coated particles, graphite, expanded graphite, graphene, graphene oxide, transition metal oxide particles, carbon-based materials decorated with metal oxide particles, carbon nanotubes, carbon blacks particles, acetylene black particles, reduced graphene oxide, active carbon or a combination of two or more thereof; The average size of the particles of the slurry is in the range from 10 nm to 1000 µm, preferably from 20 nm to 500 µm, more preferably from 20 nm to 200 µm, still more preferably from 20 nm to 10 µm.

In a preferred embodiment slurry electrodes for use in the second half-cell are formed of a slurry of electrically conductive particles on which sulfide redox reaction can occur; materials useful for the production of this slurry electrode are, e.g., metallic powder, graphite, expanded graphite, graphene oxide, carbon nanotubes, transition metal oxide particles, carbon-based materials decorated with metal oxide particles, reduced graphene oxide, active carbon, acetylene black, or a combination of two or more thereof; the average size of the particles of the slurry is in the range from 10 nm to 1000 µm, preferably from 20 nm to 500 µm, more preferably from 20 nm to 200 µm, still more preferably from 20 nm to 100 µm.

The Catalyst

In the present invention, the electrode contained in the second half-cell is modified with a catalytic material to promote and sustain the electrochemical reactions involving sulfur species during charge and discharge phases of the battery. Said catalytic material is generally a catalytic metal M, in particular selected from the group of metals Mo, Zr, Ti, Ni, In, Pb, Zn, Fe, Co, Cu, Mn, Cd, Bi, Al, Ga, Cr, W, Nb, Au, Ag, Pt, Ru, Ir, Pd, alloys and intermetallic compounds thereof, and compounds of one or more metals. Examples of alloys/intermetallic compounds useful for the objects of the invention are $Co_3Ni$, $Fe_3Co$, $Fe_9Co_7$ and $Co_3Cu$.

These compounds are indicated below adopting the general nomenclature M-X (or M-M'-X) which refers to any possible composition between metal cation(s) M, M' and the indicated anion(s), possibly in crystalline phases. Examples of possible catalytic compounds are metal oxides or mixed oxides (M-O or M-M'-O); chalcogenide compounds containing sulfur anions and at least one metal cation (M-X or M-M'-X=Co—S, Cu—S, Fe—S, Ni—S, Zn—S, Sn—S, Cu—Zn—S, Cu—Sn—S, etc.) or other chalcogenides such as selenides and tellurides (M-X=M-Se, M-Te); nitrides (M-N); oxonitrides (M-O—N) and carbonitrides (M-C—N); or carbon-based non-noble metals (M/N/C).

Said catalyst may comprise a mixture of two or more materials belonging to the same or different sub-class, as for example two different sulfides, a sulfide and an oxide, a sulfide and selenide, an oxide and a selenide, and all the combinations of chalcogenides. The present invention relates also to the mixture of different crystalline phases, for materials with the same (e.g. hexagonal or cubic Co) or different elemental composition (e.g. CoS, $CoS_2$, $Co_3S_4$, $Co_9S_8$); amorphous compounds are also considered. The preferred catalysts for use in the invention are CoOOH, $Co(OH)_2$, $Co_3O_4$, CoO, $CoO_2$, $Co_3S_4$, $Co_9S_8$, $CoS_2$, CoSe, $CoSe_2$, $Co_3Se_4$, $Co_9Se_8$, NiSe, $NiSe_2$, $Ni_3Se_4$, $Ni_9Se_8$, $MoSe_2$, $Bi_2S_3$, $WS_2$, $WSe_2$, CuO, $Cu_3Se_2$, $Co_2CuS_4$, $CoCuS_4$, CoNiOOH, CoFeOOH, $NiCo_2O_4$, $Co_5NiS_8$, $Co_2NiS_4$, $Co_2NiSe_4$, $CoNiSe_4$ or mixtures thereof. In a more preferred embodiment, $Co_3S_4$, $CoS_2$, or a mixture thereof is employed.

In the present invention, the catalyst, may be deposited directly onto the electrode surface following any suitable methods known in the art i.e. by chemical (e.g. hydrothermal, chemical bath deposition, etc), physical (e.g. sputtering, evaporation, reactive annealing, etc) and electrochemical (e.g. electrodeposition, etc) means or by a combination thereof. In one embodiment, a sulfide compounds may be synthesized through direct co-electrodeposition of the metal and sulfur or following a two steps process i.e. by the growth of the metallic layer, followed by reactive annealing in sulfur containing atmosphere. In another embodiment, the deposition of a metal oxide is followed by reactive process, either chemical or physical, to obtain the desired chalcogenide (e.g. sulfide, selenides, etc). Moreover, the formation of nanostructures, such as nanowires and nanorods, may be achieved by direct grown on the carbon collector electrode by hydrothermal annealing.

In another embodiment, the metal catalyst may be also in the form of slurry: catalytic powders, obtained through chemical reaction possibly in combination with ball milling, may be dispersed in a binder and applied on the electrode. The average size of the catalytic particles of the slurry is in the range from 10 nm to 1000 µm, preferably from 20 nm to 500 µm, more preferably from 20 nm to 200 µm, still more preferably from 20 nm to 10 µm. Polymeric powders can be introduced in the mixture, acting as binders for the other particles. In a preferred embodiment the amount of catalytic particles in the slurry is selected from 50% to 95%, in another embodiment from 60% to 90%, in still another embodiment from 70% to 80% of the overall electrode mass. The amount of binder is selected from 0.1% to 20%, more preferably from 0.5% to 10%, still more preferably from 5% to 10% of the overall electrode mass. In still another embodiment, the slurry contains also conductive particles selected among metallic particles, graphite, graphene, graphene oxide, reduced graphene oxide, active carbon, metal oxide particles, carbon-based materials decorated with metal oxide particles, carbon nanotubes, carbon blacks particles, acetylene black carbon, metal-coated particles or a combination of two or more thereof. The average size of the catalytic particles of the slurry is in the range from 10 nm to 1000 µm, preferably from 20 nm to 500 µm, more preferably from 20 nm to 200 µm, still more preferably from 20 nm to 10 µm.

In one embodiment of the invention, the catalyst is dispersed in form of particles in the polysulfide-based catholyte. The materials these particles are made of are the same reported above for the embodiment in which the catalyst modifies the electrode. These particles can be obtained by any suitable method known in the art e.g. chemical precipitation, hydrothermal synthesis, reactive annealing of metallic particles, reactive ball milling, chemical conversion.

The Membrane Separator

The two half-cells are in contact through a membrane separator. The separator can be chosen as desired for a particular purpose or intended use. In one embodiment, the separator is a porous separator without any active ion-exchange material; Celgard® separators or similar can be used. In a further embodiment, solid state glasses can be also used. In one embodiment Na-ion or Li-ion glasses, selected among sulfide-based ones, are used in order to guarantee a cationic exchange of $Na^+$ or $Li^+$ ions between the two half-cells. In another embodiment, the membrane is an ion-selective porous membrane. The separator can be chosen among all suitable materials acting as ionic membrane, depending on purpose. In a first possible embodiment, the membrane is an cationic membrane suitable for batteries where anolyte and catholyte have a different pH, to reduce as much as possible electrolytes cross mixing. In some battery configurations a Nafion™ (co-polymer of perfluorosulfonic acid and polytetrafluoroethylene) membrane is employed.

Figure 26:
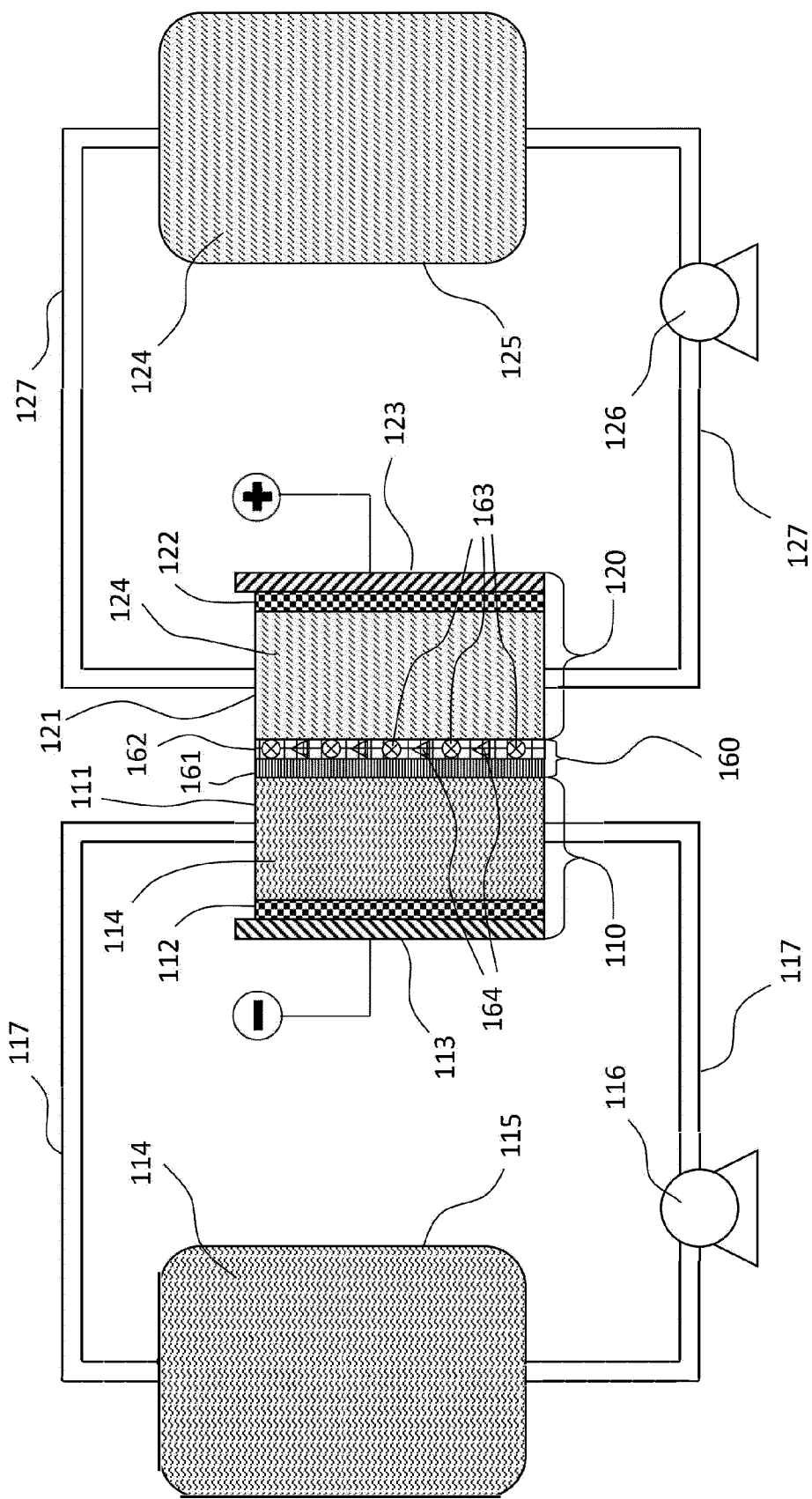
FIG. 26 shows a schematic representation of a flow battery according to the present invention where the two half-cells are divided by a separator membrane in the form of a multilayer, in which one of the layers contains catalytic and electrically active particles.

In another embodiment of the invention, ionic particles (cationic or anionic depending on purpose) are dispersed together with conductive particles, preferably carbon-based particles, in a solid/semi-solid polymeric electrolyte, selected among co-polymer of perfluorosulfonic acid and polytetrafluoroethylene, poly-vinyl alcohol (PVA), chitosan, poly-acrylic acid (PAA), gelatin, etc. and applied on any of the previously introduced ionic membranes, thus obtaining a multilayer separator. The role of the ionic particles is to block the active ions of the two electrolytes, reducing the cross mixing effect. In a still another embodiment of the invention, the catalyst is applied on the separator between the two half-cells. In this embodiment, the catalyst is dispersed together with conductive particles, preferably carbon-based particles, in a polymeric binder, selected among co-polymer of perfluorosulfonic acid and polytetrafluoroethylene, PVA, chitosan, PAA, gelatin, etc. and applied on any of the previously cited ionic membranes, obtaining multilayer separator, referred herein as catalyst-decorated separator. In a further embodiment of the invention, carbon-based particles decorated with catalyst are applied on the separator between the two half-cells. In this embodiment, the carbon-decorated particles are dispersed in a polymeric binder, selected among co-polymer of perfluorosulfonic acid and polytetrafluoroethylene, PVA, chitosan, PAA, gelatin, etc. and applied on any of the previously cited ionic membranes, obtaining multilayer separator, called herein as catalyst-decorated separator. An example of application is shown in FIG. 26, where a multilayer separator 160 consists of a first homogeneous layer 161 coupled to a second layer, 162, containing carbon-based particles decorated with catalyst (163) and non-catalytic particles (164). This kind of separator can be applied to any RFB configuration described in the present application. In a preferred embodiment, in case of any ion-exchange materials, in all configuration (i.e. mono- or multi-layer(s)), the membrane is swelled in 1 M NaOH or 1 M KOH solution, prior the utilization, in order to guarantee a proper efficient ion exchange between the anolyte and the catholyte during the electrochemical reaction. Swelling time is selected depending on the type of membrane. Alternative membranes, including all known solid/semi-solid organic-inorganic composite electrolytes are also contemplated.

An RFB can be obtained, according to the present invention, by combining any first half-cell with any second half-cell, and using any membrane separator described above.

A Zn-polysulfide flow battery in accordance with the present invention can generally have a cell potential from about 0.7 V to 1.4 V, depending on polysulfide amount and catalyst(s) used. The Zn-polysulfide RFB is generally environmentally friendly, non-toxic and safer if compared to other flow batteries. With respect to the commercially available RFBs, the electrochemical device of the present invention allows to work at higher pH values increasing the battery lifetime and reducing strongly the maintenance costs.

Moreover, the Zn-polysulfide flow battery of the invention is significantly cheaper than known RFBs: the cost of this battery may be lower than 200 USD/kWh for the battery components and lower than 60 USD/kWh for the electrolyte and tanks, providing an energy efficiency as high as 70-85%.

The RFB cell of the present invention can be also electrically coupled in a so-called stacked configuration, connected either in series to obtain higher voltage values, or in parallel to obtain higher current outputs.

The invention will be further illustrated by the examples that follow.

EXAMPLES

Example 1

Preparation of a Zinc-Based Electrolyte for the RFB Half-Cell

A solution has been prepared dissolving sodium hydroxide, NaOH, in Millipore water at room temperature with a concentration of 6 M, followed by 0.1 M of zinc oxide, ZnO. Bismuth oxide, $Bi_2O_3$, has been added to increase the conductivity of the final solution. The final formulation is shown in Table 1. The as-prepared solution can work from 25° C. to 70° C.

TABLE 1

| example of Zn based electrolyte | | | | |
|---|---|---|---|---|
| Chemical compound | Chemical formula | Molar mass [g/mol] | Concentration [g/L] | Concentration [mol/l] |
| Sodium hydroxide | NaOH | 40.00 | 240.00 | 6.00 |
| Zinc oxide | ZnO | 81.38 | 8.14 | 0.10 |
| Bismuth oxide | $Bi_2O_3$ | 465.90 | 2.33 | 0.005 |

Example 2

Preparation of a Zinc-Based Electrolyte for the RFB Half-Cell

A solution has been prepared dissolving potassium hydroxide, KOH, in Millipore water at room temperature with a concentration of 6 M, followed by 0.1 M of zinc acetate, $(Zn(CH_3COO)_2)$, lithium hydroxide, LiOH, has been added to increase the conductivity of the final solution. The final formulation is shown in Table 2. The as-prepared solution can work from 25° C. to 70° C.

TABLE 2

| example of Zn based electrolyte | | | | |
|---|---|---|---|---|
| Chemical compound | Chemical formula | Molar mass [g/mol] | Concentration [g/L] | Concentration [mol/l] |
| Potassium hydroxide | KOH | 56.11 | 336.66 | 6.00 |
| Zinc acetate | $Zn(CH_3COO)_2 \cdot 2H_2O$ | 219.50 | 21.95 | 0.10 |
| Lithium hydroxide | LiOH | 23.95 | 2.39 | 0.10 |

Example 3

Preparation of a Zinc-Based Electrolyte for the RFB Half-Cell

A solution has been prepared dissolving potassium hydroxide, KOH, in Millipore water at room temperature with a concentration of 6 M, followed by 0.1 M of zinc acetate, $(Zn(CH_3COO)_2)$, 3% by weight of carbon black particles with an average diameter in the range from 500 and 700 nm, has been added as flowable electrodes. The final formulation is shown in Table 3. The as-prepared solution can work from 25° C. to 70° C.

TABLE 3

| example of Zn based electrolyte | | | | |
|---|---|---|---|---|
| Chemical compound | Chemical formula | Molar mass [g/mol] | Concentration [g/L] | Concentration [mol/l] |
| Potassium hydroxide | KOH | 56.11 | 336.66 | 6.00 |
| Zinc acetate | $Zn(CH_3COO)_2 \cdot 2H_2O$ | 219.50 | 21.95 | 0.10 |
| Carbon Black | C | 12.01 | 8.52 | 0.71 |

Example 4

Preparation of a Zinc-Based Electrolyte for the RFB Half-Cell

A solution has been prepared dissolving sodium hydroxide, NaOH, and potassium hydroxide, KOH, in Millipore water at room temperature with an overall concentration of 7 M, followed by 0.3 M of zinc acetate, $(Zn(CH_3COO)_2)$. Lithium hydroxide, LiOH, has been added to increase the conductivity of the final solution. The final formulation is shown in Table 4. The as-prepared solution can work from 25° C. to 70° C.

TABLE 4 example of Zn based electrolyte

| Chemical compound | Chemical formula | Molar mass [g/mol] | Concentration [g/L] | Concentration [mol/l] |
|---|---|---|---|---|
| Sodium hydroxide | NaOH | 40.00 | 80.00 | 2.00 |
| Potassium hydroxide | KOH | 56.11 | 280.55 | 5.00 |
| Zinc acetate | $Zn(CH_3COO)_2 \cdot 2H_2O$ | 219.50 | 65.85 | 0.30 |
| Lithium hydroxide | LiOH | 23.95 | 2.39 | 0.10 |

Example 5

Preparation of a Zinc-Based Electrolyte with Dispersed Electrodes

In order to increase battery capacity, power and energy density dispersed electrodes were added to a 6 M KOH supporting electrolyte. In order to properly disperse functionalized particles, acting as electrodes in the half-cell, the electrolyte formulation has been slightly modified. As an example, 1% by weight of xanthan gum has been added as a thickener additive in order to increase the electrolyte viscosity. 2% by weight of zinc oxide particles and 15% by weight of zinc particles are added. The diameter of the particles is comprised in the range from 10 μm to 60 μm. The final formulation is shown in Table 5.

TABLE 5 example of Zn based electrolyte

| Chemical compound | Chemical formula | Molar mass [g/mol] | Concentration [g/L] | Concentration [mol/l] |
|---|---|---|---|---|
| Potassium hydroxide | KOH | 56.11 | 336.66 | 6.00 |
| Xanthan gum | $(C_{35}H_{49}O_{29})_x$ | 933.00 | 10.00 | 0.01 |
| Zinc oxide (particles) | ZnO | 81.38 | 20.00 | 0.25 |
| Zinc (particles) | Zn | 65.3 | 150.00 | 2.29 |

Example 6

Preparation of Aqueous Polysulfide-Based Electrolyte for the RFB Half-Cell

A solution has been prepared dissolving NaOH in Millipore water at room temperature with a concentration of 4 M, followed by 3 M of elemental sulfur, S. Once the S was completely dissolved, 1 M of $Na_2S$ were added to the solution in order to increase the S content inside the solution. The final formulation is shown in Table 6. The as prepared solution can work from 25° C. to 70° C.

TABLE 6 example of Zn based electrolyte

| Chemical compound | Chemical formula | Molar mass [g/mol] | Concentration [g/L] | Concentration [mol/l] |
|---|---|---|---|---|
| Sodium hydroxide | NaOH | 40.00 | 160.00 | 4.00 |
| Sulfur | S | 32.06 | 96.18 | 3.00 |
| Sodium sulfide | $Na_2S$ | 142.04 | 142.04 | 1.00 |

Example 7

Preparation of Aqueous Polysulfide-Based Electrolyte for the RFB Half-Cell

A solution has been prepared dissolving KOH in Millipore water at room temperature with a concentration of 3 M, followed by 1 M of elemental sulfur, S. Once the S was completely dissolved, 1 M of $K_2S$ were added to the solution in order to increase the S content inside the solution. The final formulation is shown in Table 7. The as-prepared solution can work from 25° C. to 70° C.

TABLE 7 example of polysulfide-based electrolyte

| Chemical compound | Chemical formula | Molar mass [g/mol] | Concentration [g/L] | Concentration [mol/l] |
|---|---|---|---|---|
| Potassium hydroxide | KOH | 56.11 | 168.33 | 3.00 |
| Sulfur | S | 32.06 | 32.06 | 1.00 |
| Potassium sulfide | $K_2S$ | 110.26 | 110.26 | 1.00 |

Example 8

Preparation of a Polysulfide-Based Electrolyte with Dispersed Electrodes

A solution has been prepared dissolving NaOH and KOH in Millipore water at room temperature with an overall concentration of 5 M, followed by 2 M of elemental sulfur. Once sulfur was completely dissolved, 0.5 M of $Na_2S$ and 0.5 M of $K_2S$ were added to the solution in order to increase the S content inside the solution. 3% by weight of carbon black particles with an average diameter between 100 and 200 μm has been added as flowable electrodes. The final formulation is shown in Table 8. The as-prepared solution can work from 25° C. to 70° C.

TABLE 8 example of polysulfide-based electrolyte

| Chemical compound | Chemical formula | Molar mass [g/mol] | Concentration [g/L] | Concentration [mol/l] |
|---|---|---|---|---|
| Sodium hydroxide | NaOH | 40.00 | 80.00 | 2.00 |
| Potassium hydroxide | KOH | 56.11 | 168.33 | 3.00 |
| Sulfur | S | 32.06 | 64.12 | 2.00 |
| Sodium sulfide | $Na_2S$ | 142.04 | 71.02 | 0.50 |
| Potassium sulfide | $K_2S$ | 110.26 | 55.13 | 0.50 |
| Carbon Black | C | 12.01 | 13.56 | 1.13 |

Example 9

Preparation of a Polysulfide-Based Electrolyte with Dispersed Catalytic Particles A solution has been prepared dissolving NaOH and KOH in Millipore water at room temperature with an overall concentration of 5 M, followed by 2 M of elemental sulfur, S. Once the S was completely dissolved, 0.5 M of $Na_2S$ and 0.5 M of $K_2S$ were added to the solution in order to increase the S content inside the solution. The final formulation is shown in Table 8. 1% by weight of $Co_3S_4$ is then added to the electrolyte as a dispersed catalyst. The as-prepared solution can work from 25° C. to 70° C.

TABLE 9 example of polysulfide-based electrolyte

| Chemical compound | Chemical formula | Molar mass [g/mol] | Concentration [g/L] | Concentration [mol/l] |
|---|---|---|---|---|
| Sodium hydroxide | NaOH | 40.00 | 80.00 | 2.00 |
| Potassium hydroxide | KOH | 56.11 | 168.33 | 3.00 |
| Sulfur | S | 32.06 | 64.12 | 2.00 |
| Sodium sulfide | $Na_2S$ | 142.04 | 71.02 | 0.50 |
| Potassium sulfide | $K_2S$ | 110.26 | 55.13 | 0.50 |
| Cobalt sulfide | $Co_3S_4$ | 305.07 | 4.43 | 0.0145 |

Example 10

Synthesis of the Catalyst

The catalyst deposition was obtained in this case following a two steps procedure: (i) cobalt deposition on the carbon felt electrode, followed by (ii) reactive annealing in a tubular furnace in a sulfur-containing atmosphere. The electrodeposition of metallic Co layer was performed in acidic conditions applying a current density of 20 mA/cm² applied for 10 minutes. The metalized sample was subjected to sulfurization process in a tubular furnace at temperature of 400° C. for 30 minutes, under a nitrogen flow of 3 L/min. The sample has been directly inserted in the pre-heated furnace followed by cooling in air. Sulfur powder (20 mg) was placed along with the cobalt coated carbon felt electrode.

Example 11

Synthesis of the Catalyst

The catalyst deposition was obtained in this case following a two steps procedure: (i) cobalt deposition on the carbon felt electrode, followed by (ii) reactive annealing in a tubular furnace in a sulfur-containing atmosphere. The electrodeposition of metallic Co layer was performed in acidic conditions applying a current density of 20 mA/cm² applied for 10 minutes. The metalized sample was subjected to sulfurization process in a tubular at temperature of 400° C. for 60 minutes, under a nitrogen flow of 3 L/h. The sample has been directly inserted in the pre-heated furnace followed by cooling in air. Sulfur powder (100 mg) was placed along with the cobalt coated carbon felt electrode.

Example 12

Figure 27:
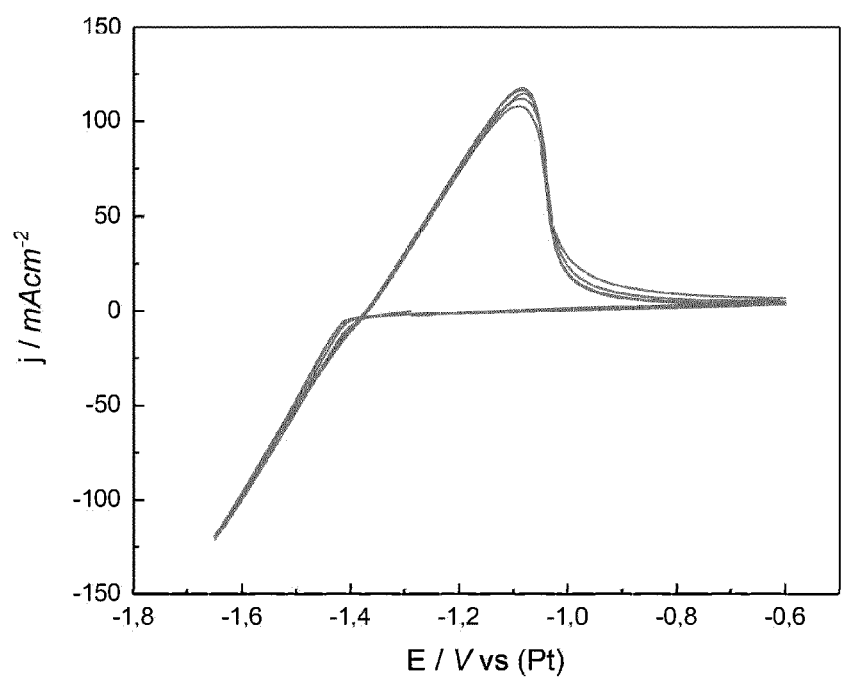
FIGS. 27 and 28 show graphs of cyclic voltammetry for Zn-based electrolytes with slurry electrodes of the invention.

Electrochemical Characterization of a Zinc-Based Electrolyte for the RFB Half-Cell The electrochemical behavior of solution prepared according to Example 1 has been characterized with cyclic voltammetry performed in a classical three electrodes cell using carbon felt as working electrode, MMO (mixed metal oxides) net as counter electrode and Pt as pseudo-reference electrode with Biologic VSP 300 Potentiostat/galvanostat at 25° C. The results are shown in FIG. 27.

Example 13

Figure 28:
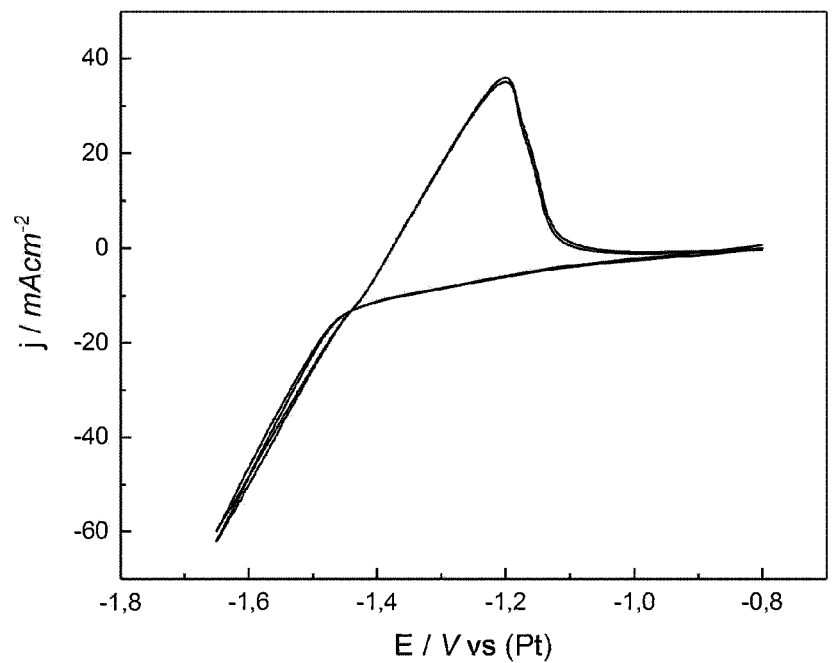

Electrochemical Characterization of a Zinc-Based Electrolyte for the RFB Half-Cell The electrochemical behavior of the solution prepared according to Example 2 has been characterized with cyclic voltammetry performed in a classical three electrodes cell using carbon felt as working electrode, MMO (mixed metal oxides) net as counter electrode and Pt as pseudo-reference electrode with Biologic VSP 300 Potentiostat/galvanostat at 25° C. The results are shown in FIG. 28.

Example 14

Figure 29:
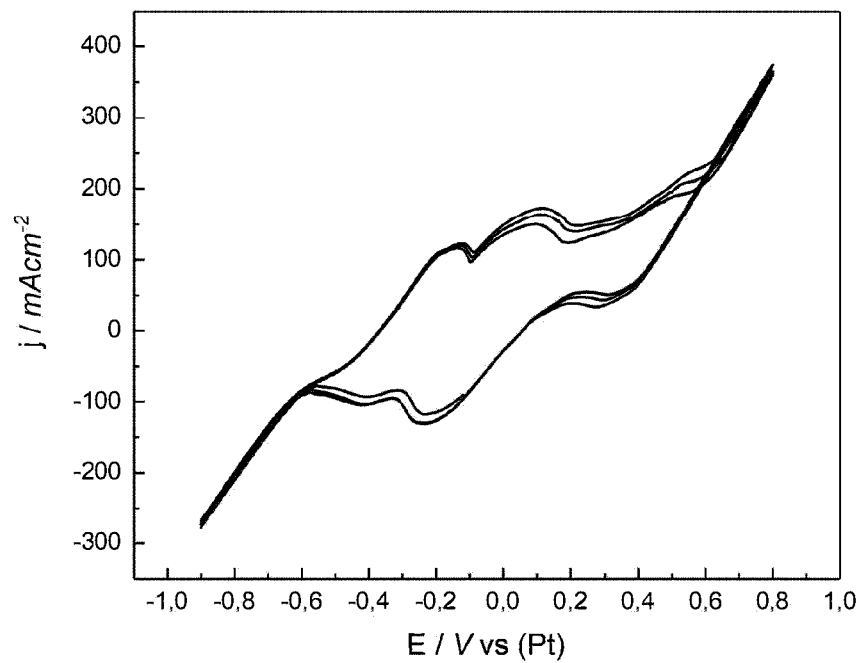
FIG. 29 shows a graph of cyclic voltammetry for a polysulfide-based electrolyte with slurry electrode of the invention.

Electrochemical Characterization of an Aqueous Polysulfide-Based Electrolyte for the RFB Half-Cell The electrochemical behavior of solution prepared according to Example 5 has been characterized with cyclic voltammetry performed in a classical three electrodes cell using carbon felt as working electrode modified with a catalyst prepared according to Example 11, MMO (mixed metal oxides) net as counter electrode and Pt as pseudo-reference electrode with Biologic VSP 300 Potentiostat/galvanostat at 25° C. The results are shown in FIG. 29.

Example 15

Characterization of the Catalyst

Figure 30:
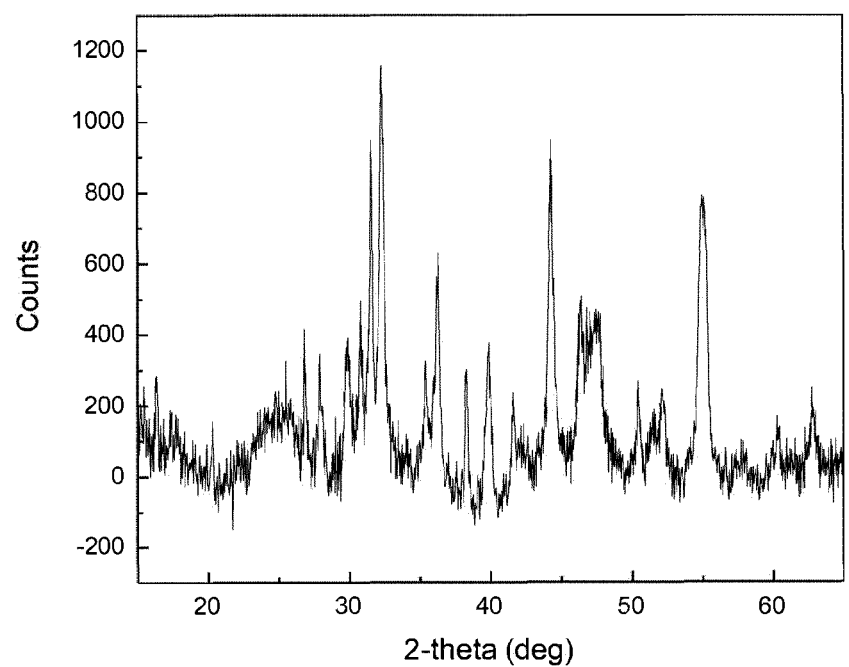
FIGS. 30 and 31 show X-ray diffraction results of catalysts for use in a second half-cell of the invention.

The catalyst prepared according to Example 10 has been characterized by X-ray diffraction (XRD) technique. The results are shown in FIG. 30. The synthesis resulted in the formation of different sulfide phases, predominantly $CoS_2$ and $Co_3S_4$ along with unreacted Co.

Example 16

Characterization of the Catalyst

Figure 31:
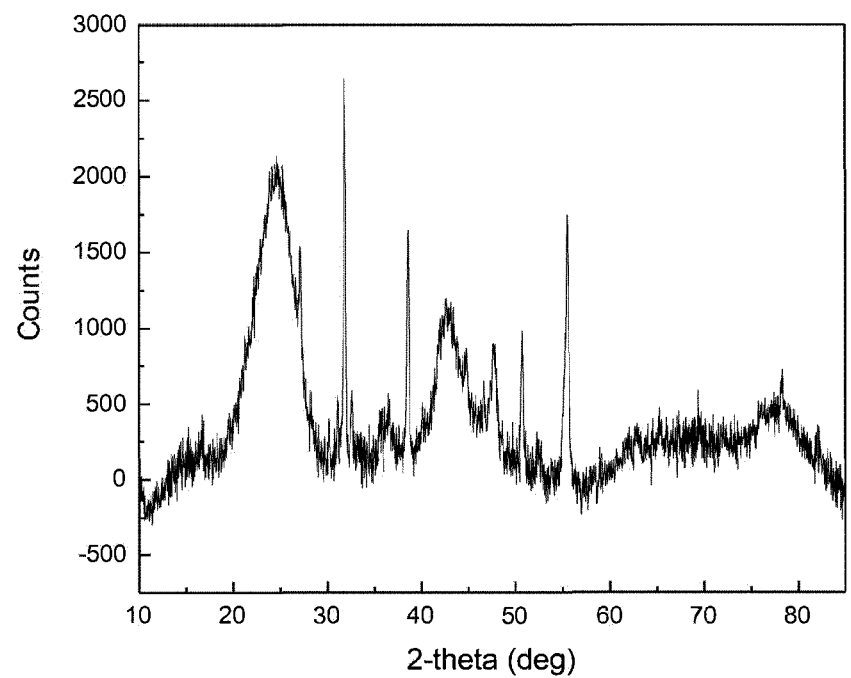

The catalyst prepared according to Example 11 has been characterized by X-ray diffraction (XRD) technique. The results are shown in FIG. 31. The synthesis resulted in the formation of different sulfide phases, predominantly $Co_3S_4$.

Example 17

Zn-Polysulfide RFB, Effect of the Catalysts

In this example are compared the performance results of a RFB produced according to the invention and, for comparison, of a RFB not comprising a catalyst and of a RFB produced according to the prior art.

Figure 2:
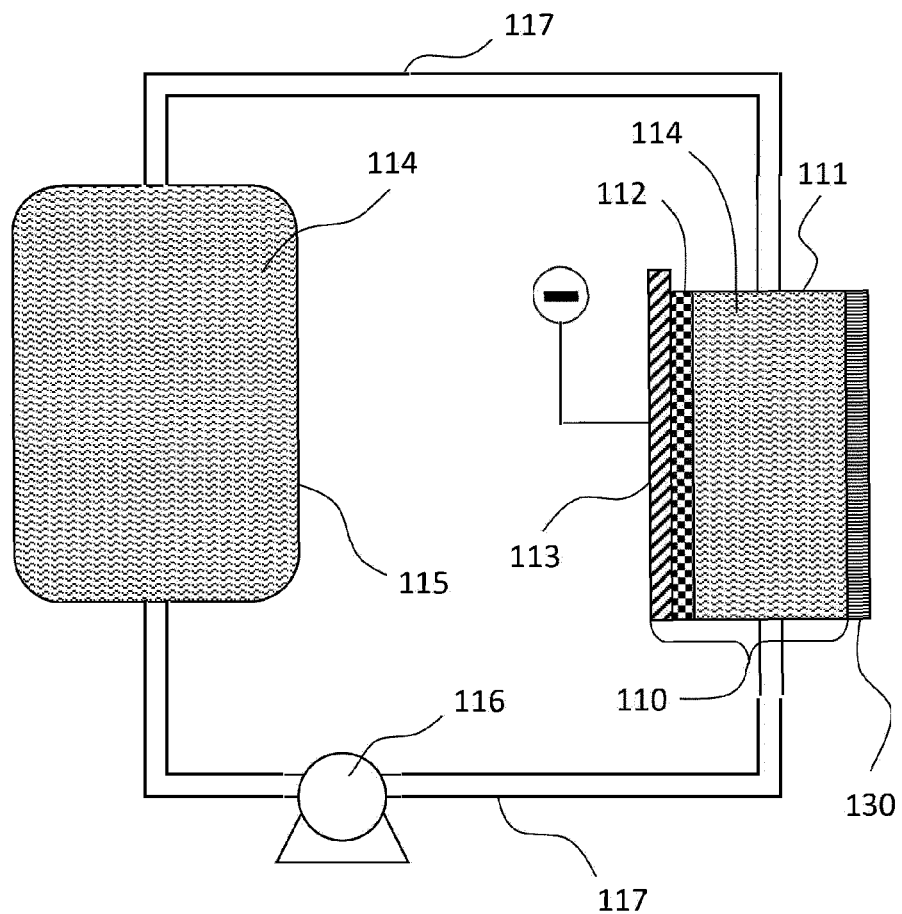
FIGS. 2 to 7 show schematic representations of possible first half-cells for the construction of a flow battery according to the present invention.
Figure 32:
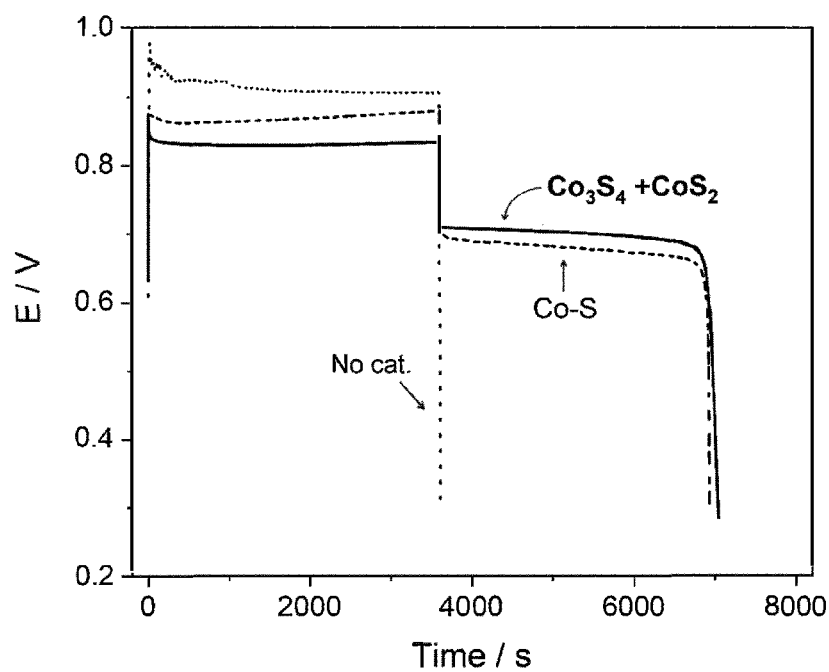
FIG. 32 shows the effect of the catalyst on the charge and discharge single cycle for a Zn-polysulfide RFB according to the present invention.

The electrolytes prepared in Examples 1 and 6 have been used to produce a Zn-polysulfide RFB obtained by coupling a first half-cell according to FIG. 2 with a second half-cell according to FIG. 8, through a single-layer membrane separator 130; in this first RFB a catalyst was not included. Electrochemical tests have been carried out in this RFB with a pumping system using a Biologic VMP-300 potentiostat/galvanostat, applying a current density of 10 mA cm$^{-2}$. The nominal area for the two electrodes was equal to 25 cm$^2$, resulting in a total applied current of 250 mA in the charge phase and −250 mA in the discharge phase. The catalyst effect on the battery performance is highlighted on single charge/discharge cycle; the graph obtained in this test is shown in FIG. 32 as a dotted line. Without the implementation of a catalyst, a high cell voltage was recorded during the charge phase as an indication of the high overpotential required to sustain the oxidation processes. Besides, the cell voltage immediately dropped to 0.3 V during the discharge phase, indicating the inability of the bare carbon felt to trigger the polysulfides redox reactions.

Figure 33:
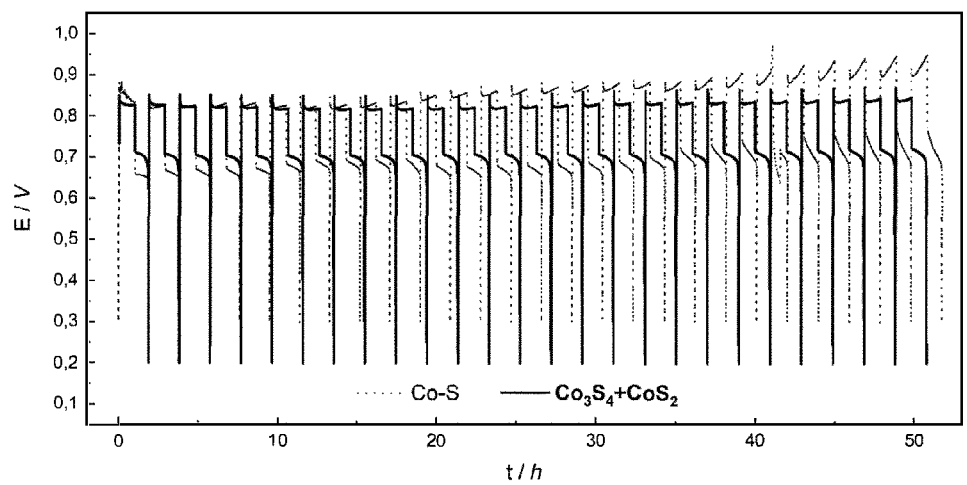
FIG. 33 shows the effect of the catalyst on the charge and discharge cycles for a Zn-polysulfide RFB according to the present invention.

The same procedure has been used to prepare a second RFB, comprising in this case a cobalt sulfide material obtained by following the procedure described in Gross et al. paper (page 10614) indicated in FIGS. 32 and 33 as (Co—S). The performance of this RFB has been tested in single charge/discharge cycle as for the previous case; the result of this test is represented by the dashed line in FIG. 32. This RFB gave rise to a faradaic efficiency (FE) of 92.2% and an energy efficiency (EE) of 71.6%.

Finally, a RFB has been produced as in the two previous cases, with the difference that in this case (according to the invention) a cobalt sulfide catalyst obtained as described in Example 11 was used in the catholyte half-cell. The adoption of a catalyst of the invention increased the overall performances of the battery: the charge and discharge cycle for this RFB is reproduced in FIG. 32 a solid line, and shows values FE=96.1% and EE=79.4%, enhancing the energy efficiency of 10.9% over the RFB using the catalyst of the prior art. Moreover, the RFB performances over cycles with the catalyst of the prior art (Gross et al.) resulted unstable over time, detrimentally affecting the RFB performances and the cyclelife. On the other hand, the novel implementation of the sulfide catalyst obtained as described in Example 11 of the present invention resulted in a higher stability over cycles: FIG. 33 shows charge and discharge cycles for the RFB produced with the catalyst of the prior art (Gross et al.), represented as dotted lines, and for the RFB produced with the catalyst of the present invention, represented as solid lines.

Example 18

Zn-Polysulfide RFB with Tuned Electrolytes

Figure 34:
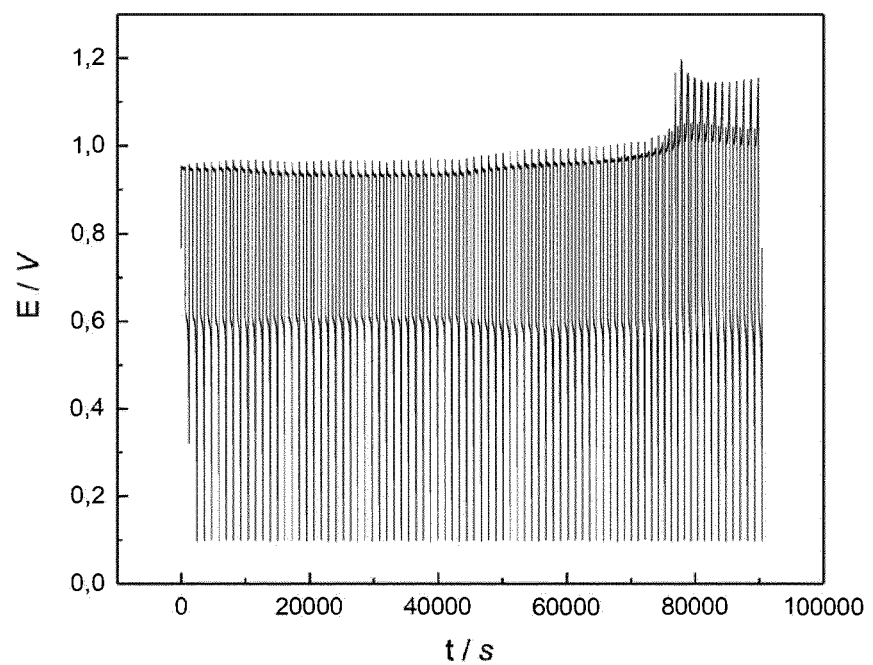
FIG. 34 shows charge and discharge cycles for a Zn-polysulfide RFB according to the present invention.
Figure 35:
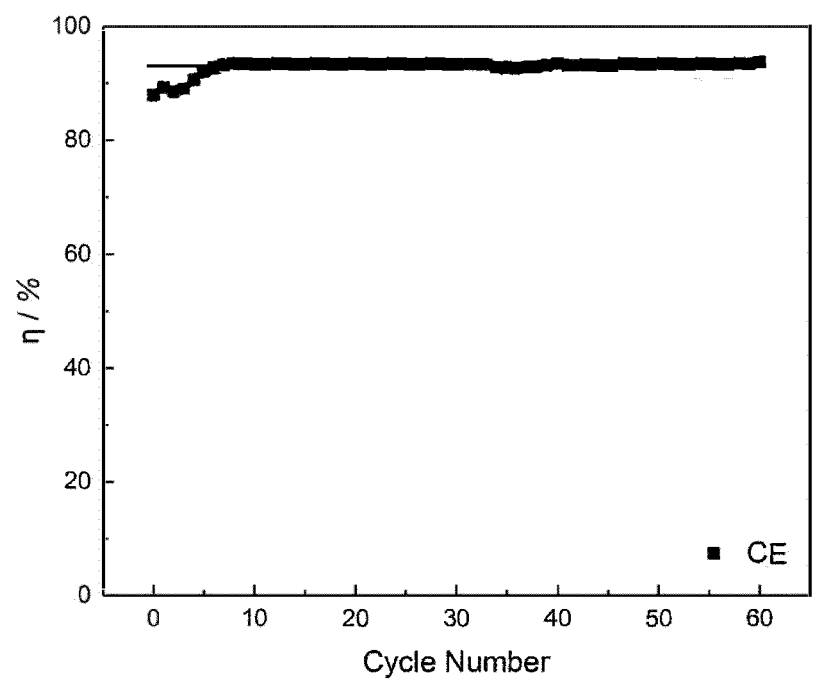
FIG. 35 represents the coulombic efficiency vs number of cycles for a Zn-polysulfide RFB of the present invention.

The electrolytes prepared in Examples 1 and 6 have been used to produce a Zn-polysulfide RFB obtained by coupling a first half-cell according to FIG. 2 with a second half-cell according to FIG. 8, through a single-layer membrane separator 130. The catalyst of the catholyte half-cell was obtained according to Example 11. Electrochemical tests have been carried out in this RFB with a pumping system using a Biologic VMP-300 potentiostat/galvanostat, applying a current density of 10 mA cm$^{-2}$. The nominal area for the two electrodes was equal to 25 cm$^2$, resulting in a total applied current of 250 mA in the charge phase and −250 mA in the discharge phase. FIG. 34 shows the classical graph of charge and discharge cycles for this RFB. In FIG. 35 the current efficiency relative cycles are also reported.

Example 19

Zn-Polysulfide RFB with Tuned Electrolytes

Figure 36:
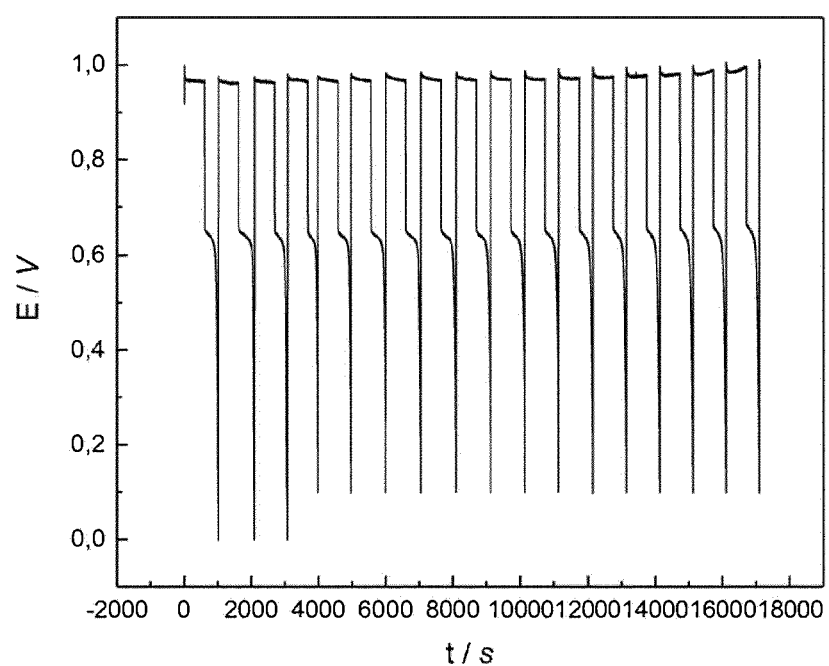
FIGS. 36 to 39 show charge and discharge cycles for different Zn-polysulfide RFBs according to the present invention.

The electrolytes prepared in Examples 1 and 7 have been used to produce a Zn-polysulfide RFB having the same structure as the battery of Example 18. Electrochemical tests have been carried out in this RFB with a pumping system using a Biologic VMP-300 potentiostat/galvanostat, applying a current density of 10 mA cm$^{-2}$. The nominal area for the two electrodes was equal to 25 cm$^2$, resulting in a total applied current of 250 mA during the charge phase and −250 mA during the discharge phase. FIG. 36 shows the classical graph of charge and discharge cycles for this RFB.

Example 20

Zn-Polysulfide RFB with Tuned Electrolytes

Figure 37:
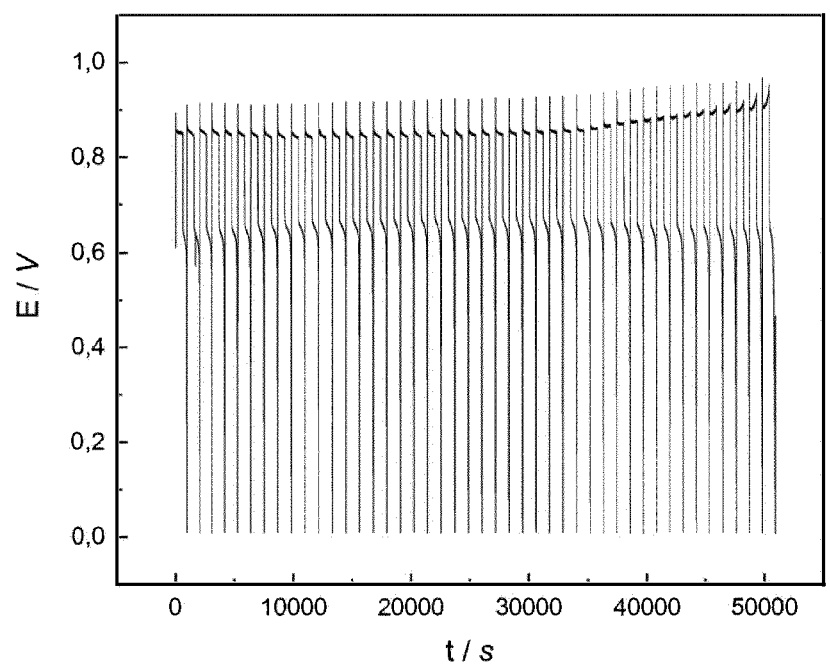

The electrolytes prepared in Examples 4 and 6 have been used to produce a Zn-polysulfide RFB having the same structure as the battery of Example 18. Electrochemical tests have been carried out in this RFB with a pumping system using a Biologic VMP-300 potentiostat/galvanostat, applying a current density of 10 mA cm$^{-2}$. The nominal area for the two electrodes was equal to 25 cm$^2$, resulting in a total applied current of 250 mA during the charge phase and −250 mA during the discharge phase. FIG. 37 shows the classical graph of charge and discharge cycles for this RFB.

Example 21

Zn-Polysulfide RFB with Tuned Electrolytes

Figure 38:
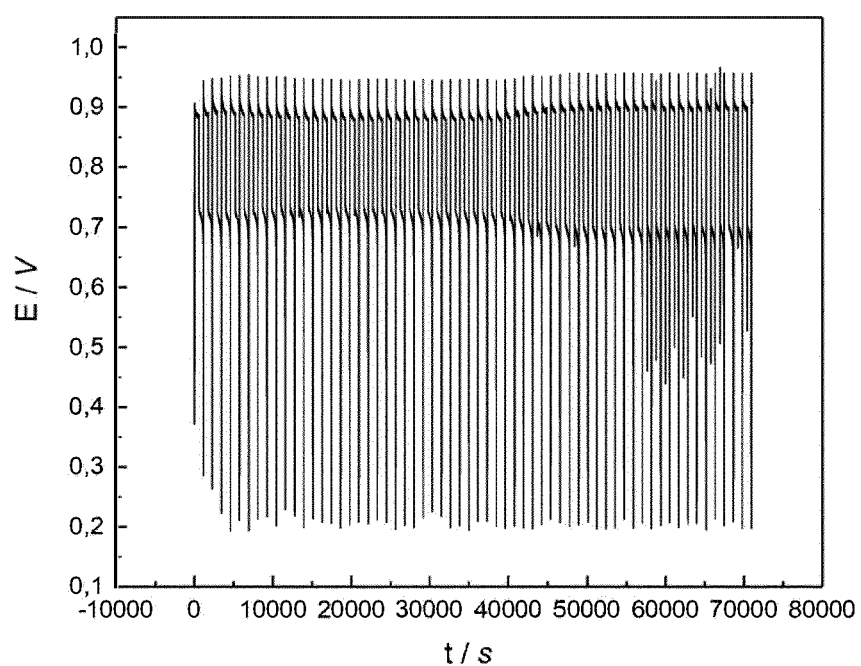

The electrolytes prepared in Examples 3 and 7 have been used to produce a Zn-polysulfide RFB having the same structure as the battery of Example 18. Electrochemical tests have been carried out in this RFB with a pumping system using a Biologic VMP-300 potentiostat/galvanostat, applying a current density of 10 mA cm$^{-2}$. The nominal area for the two electrodes was equal to 25 cm$^2$, resulting in a total applied current of 250 mA during the charge phase and −250 mA during the discharge phase. FIG. 38 shows the classical graph of charge and discharge cycles for this RFB.

Example 22

Zn-Polysulfide RFB with Tuned Electrolytes

Figure 39:
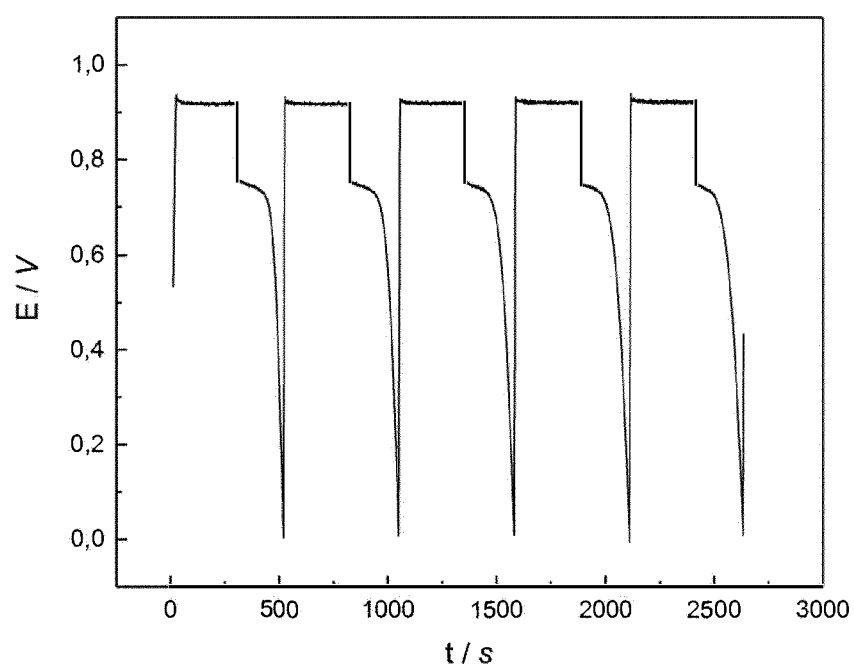
Figure 40:
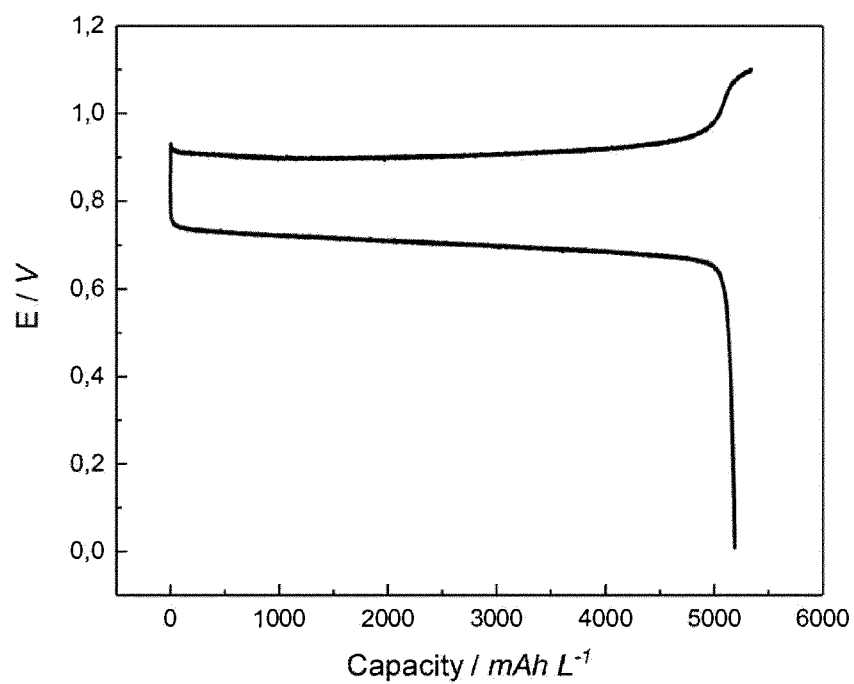
FIG. 40 shows the volumetric capacity of an RFB of the invention.

The electrolytes prepared in Examples 2 and 6 have been used to produce a Zn-polysulfide RFB having the structure obtained combining the first half cell of FIG. 3 and the second half cell of FIG. 8. The catalyst of the catholyte half-cell was obtained according to Example 11. Electrochemical tests have been carried out in this RFB with a pumping system using a Biologic VMP-300 potentiostat/galvanostat, applying a current density of 10 mA cm$^{-2}$. The nominal area for the two electrodes was equal to 25 cm$^2$, resulting in a total applied current of 250 mA during the charge phase and −250 mA during the discharge phase. FIG. 39 shows the classical graph of charge and discharge cycles for this RFB. The volumetric capacity for the battery using the same electrolyte is shown in FIG. 40.

The invention claimed is:

1. A zinc-polysulfide rechargeable flow battery comprising:
 a first half-cell comprising a first electrolyte containing a source of $Zn^{2+}$ ions and a static or flowable electrode disposed within the first half-cell, said first half-cell being connected in a closed-loop configuration through a first pump to a first external tank containing the first electrolyte, the first electrolyte further comprising:
 one or more compounds selected among sodium hydroxide, potassium hydroxide, lithium hydroxide, ammonium hydroxide or bismuth hydroxide, in an overall concentration between 5 M and 20 M;
 a second half-cell comprising a second electrolyte in which polysulfides are dissolved and a static or flowable electrode, disposed within the second half-cell, said second half-cell being connected in a closed-loop configuration through a second pump to a second external tank containing the second electrolyte;
 in the second half-cell, a catalyst on the surface of the static electrode or dispersed in the second electrolyte in the form of particles; and
 a separator between the two half-cells.

2. Zinc-polysulfide rechargeable flow battery according to claim 1, wherein said first electrolyte comprises:
 a solvent selected between water and a water-based mixtures containing at least 40% by volume of water with one or more compounds selected among C1-C4 alcohols, ethylene glycol, acetic acid, glycerol, or a combination of two or more thereof;
 a source of zinc ions selected among zinc oxide, zinc hydroxide, zinc acetate, zinc chloride, zinc carbonate or a combination thereof, in such an amount to have a concentration of $Zn^{2+}$ ions between 0.001 M and 1.5 M.

3. Zinc-polysulfide rechargeable flow battery according to claim 2, wherein said first electrolyte further comprises:
 zinc-based and/or carbon-based conductive particles, selected among zinc particles, zinc oxide particles, zinc coated particles, graphene, expanded graphite, reduced graphene oxide, active carbon, carbon blacks, acetylene black, carbon nanotubes or a combination thereof, in an overall concentration from 0.01% by weight to 20% by weight; and/or
 organic and/or inorganic electroactive particles containing zinc ions in different oxidation states, in an amount in the range from 0.01% by weight to 50% by weight.

4. Zinc-polysulfide rechargeable flow battery according to claim 1, wherein said first electrolyte comprises:
 a solvent selected between water and a water-based mixtures containing at least 40% by volume of water with one or more compounds selected among C1-C4 alcohols, ethylene glycol, acetic acid, glycerol, or a combination of two or more thereof;
 as a source of zinc ions, organic and/or inorganic electroactive particles containing zinc ions in different oxidation states, in an amount in the range from 0.01% by weight to 50% by weight;
 optionally, zinc-based and/or carbon-based conductive particles, selected among zinc particles, zinc oxide particles, zinc coated particles, graphene, expanded graphite, reduced graphene oxide, active carbon, carbon blacks, acetylene black, carbon nanotubes or a combination thereof, in an overall concentration from 0.01% by weight to 20% by weight.

5. Zinc-polysulfide rechargeable flow battery according to claim 1, wherein said first electrolyte further comprises one or more of:
 a salt, oxide or hydroxide of one or more metals capable of shifting the zinc electrochemical potential and to increase the overvoltage of hydrogen evolution, selected among Pb, Mn, Sn, Fe, Ni, Cu, Mg, Ti, Co, Al, Li, Zr, in a concentration ranging from 0.001 M to 1M;
 a hydrogen evolution suppressor selected among silicates, boric acid, the metals Pb, Bi, Mn, W, Cd, As, Sb, Sn or In, the oxides of said metals, or a combination thereof, in an overall concentration in the range between 0.001 M to 5 M;
 Rochelle salts in a concentration between 0.001 M and 10 M;
 a leveling agent selected among polyethylene glycol, polyethyleneimine, thiourea, quaternary ammonium salts, dextrins, cyclodextrins, sucrose, polytetrafluoroethylene, sodium dodecyl sulfate, polyacrylic acid, glucose, cellulose and combinations thereof, with a concentration between 0.0001 ppm to 10000 ppm;
 a plasticizer additive selected among polyols, ethylene glycol, diethylene glycol, tetraethylene glycol, propylene glycol, glycerol, mannitol, sorbitol, xylitol, monosaccharides, fatty acids, urea, ethanolamine, triethanolamine, vegetable oils, lecithin, waxes, amino acids, surfactants or oleic acid, in a range between 0.1% by weight and 5% by weight of the first electrolyte;
 a thickener additive in a range between 0.0001% to 10% by weight of the first electrolyte; or
 an organic additive selected among xanthan gum, gum arabic, carboxymethyl cellulose, chitosan, agar-agar, sodium alginate or polyethylene oxide in an amount between 0.0001% to 10% by weight of the first electrolyte.

6. Zinc-polysulfide rechargeable flow battery according to claim 1, wherein said second electrolyte comprises:
 a solvent selected between water and a water-based mixtures containing at least 40% by volume of water with one or more compounds selected among C1-C4 alcohols, ethylene glycol, acetic acid, glycerol, or a combination of two or more thereof;
 one or more compounds selected among sodium hydroxide, potassium hydroxide, lithium hydroxide, ammonium hydroxide or bismuth hydroxide, in an overall concentration between 0.01 M and 20 M; and
 a source of polysulfides selected among lithium sulfide, sodium sulfide, potassium sulfide or a combination of two or more thereof in such an amount to have an overall concentration of $S^{2-}$ ions between 0.01 M and 20 M; and
 elemental sulfur, S, in stoichiometric amount in order to form $A_2S_4$ chains, where A is Li, Na, K or a combination thereof.

7. Zinc-polysulfide rechargeable flow battery according to claim 6, wherein said second electrolyte further comprises at least one of:
 catalytic particles in an amount from 0.001% by weight to 10% by weight of the second electrolyte;
 conductive particles selected among graphene, expanded graphite, reduced graphene oxide, active carbon, carbon blacks, acetylene black, carbon nanotubes or a combination of two or more thereof in an overall concentration from 0.01% by weight to 20% by weight of the second electrolyte;
 conductive particles decorated by catalyst particles, wherein the conductive particles are selected among graphene, expanded graphite, reduced graphene oxide, active carbon, carbon blacks, acetylene black, carbon nanotubes or a combination of two or more thereof, and wherein said conductive particles decorated by catalyst particles are present in a concentration from 0.01% by weight to 20% by weight of the second electrolyte;
organic and/or inorganic sulfide-based electroactive particles containing sulfide ions in different oxidation states in an amount in the range from 0.01% by weight to 50% by weight of the second electrolyte; or
organic and/or inorganic sulfide-based electroactive particles containing sulfide ions and decorated by catalyst particles, in an amount from 0.01% by weight to 50% by weight of the second electrolyte.

8. Zinc-polysulfide rechargeable flow battery according to claim 1, wherein said second electrolyte comprises:
a solvent selected between water and a water-based mixtures containing at least 40% by volume of water with one or more compounds selected among C1-C4 alcohols, ethylene glycol, acetic acid, glycerol, or a combination of two or more thereof;
one or more compounds selected among sodium hydroxide, potassium hydroxide, lithium hydroxide, ammonium hydroxide or bismuth hydroxide, in an overall concentration between 0.01 M and 20 M; and
organic and/or inorganic sulfide-based electroactive particles containing sulfide ions acting as source of polysulfide ions, in an amount in the range from 0.01% by weight to 50% by weight.

9. Zinc-polysulfide rechargeable flow battery according to claim 1, wherein said second electrolyte comprises:
a solvent selected between water and a water-based mixtures containing at least 40% by volume of water with one or more compounds selected among C1-C4 alcohols, ethylene glycol, acetic acid, glycerol, or a combination of two or more thereof;
one or more compounds selected among sodium hydroxide, potassium hydroxide, lithium hydroxide, ammonium hydroxide or bismuth hydroxide, in an overall concentration between 0.01 M and 20 M; and
organic and/or inorganic sulfide-based electroactive particles containing sulfide ions and decorated by catalyst particles, in an amount from 0.01% by weight to 50% by weight of the second electrolyte.

10. Zinc-polysulfide rechargeable flow battery according to claim 8, wherein said second electrolyte further comprises at least one of:
catalytic particles in an amount from 0.001% by weight to 10% by weight of the second electrolyte;
conductive particles selected among graphene, expanded graphite, reduced graphene oxide, active carbon, carbon blacks, acetylene black, carbon nanotubes or a combination of two or more thereof in an overall concentration from 0.01% by weight to 20% by weight of the second electrolyte; or
conductive particles decorated by catalyst particles, wherein the conductive particles are selected among graphene, expanded graphite, reduced graphene oxide, active carbon, carbon blacks, acetylene black, carbon nanotubes or a combination of two or more thereof, and wherein said conductive particles decorated by catalyst particles are present in a concentration from 0.01% by weight to 20% by weight of the second electrolyte.

11. Zinc-polysulfide rechargeable flow battery according to claim 1, wherein said catalyst on the surface of a static electrode or dispersed in the second electrolyte in the form of particles is a metal selected from the group of metals Mo, Zr, Ti, Ni, In, Pb, Zn, Fe, Co, Cu, Mn, Cd, Bi, Al, Ga, Cr, W, Nb, Au, Ag, Pt, Ru, Ir, Pd, alloys of said metals, intermetallic compounds of said metals, or compounds of said metals.

12. Zinc-polysulfide rechargeable flow battery according to claim 11, wherein said metal compounds are selected among oxides, mixed oxides, chalcogenides, mixed chalcogenides, nitrides, oxynitrides and carbonitrides of said metals, or carbon-based compounds of non-noble metals.

13. Zinc-polysulfide rechargeable flow battery according to claim 12, wherein said metal compounds are selected among $CoOOH$, $Co(OH)_2$, $Co_3O_4$, $CoO$, $CoO_2$, $Co_3S_4$, $Co_9S_8$, $CoS_2$, $CoSe$, $CoSe_2$, $Co_3Se_4$, $Co_9Se_8$, $NiSe$, $NiSe_2$, $Ni_3Se_4$, $Ni_9Se_8$, $MoSe_2$, $Bi_2S_3$, $WS_2$, $WSe_2$, $CuO$, $Cu_3Se_2$, $Co_2CuS_4$, $CoCuS_4$, $CoNiOOH$, $CoFeOOH$, $NiCo_2O_4$, $Co_5NiS_8$, $CO_2NiS_4$, $Co_2NiSe_4$, $CoNiSe_4$ or mixtures thereof.

14. Zinc-polysulfide rechargeable flow battery according to claim 1, wherein said second electrolyte further comprises one or more of:
a plasticizer additive selected among polyols, ethylene glycol, diethylene glycol, tetraethylene glycol, propylene glycol, glycerol, mannitol, sorbitol, xylitol, monosaccharides, fatty acids, urea, ethanolamine, triethanolamine, vegetable oils, lecithin, waxes, amino acids, surfactants or oleic acid, in a range between 0.1% by weight and 5% by weight of the second electrolyte;
a thickener additive in a range between 0.0001% to 10% by weight of the first electrolyte; or
an organic additive selected among xanthan gum, gum arabic, carboxymethyl cellulose, chitosan, agar-agar, sodium alginate or polyethylene oxide in an amount between 0.0001% to 10% by weight of the first electrolyte.

15. Zinc-polysulfide rechargeable flow battery according to claim 1, wherein said separator is selected between:
a separator of uniform composition selected among a porous separator without active ion-exchange material, an ion-selective porous membrane, a solid state ceramic separators or a glass-ceramic separator, a Na-ion sulfide-based glass, a Li-ion sulfide-based glass, or a membrane made of a co-polymer of perfluorosulfonic acid and polytetrafluoroethylene; and
a multilayer separator consisting of at least a first homogeneous layer coupled to a second layer, said second layer being made of one among poly-vinyl alcohol, chitosan, poly-acrylic acid, gelatin or co-polymer of perfluorosulfonic acid and polytetrafluoroethylene, said second layer containing ionic particles and/or carbon-based conductive particles.

16. Zinc-polysulfide rechargeable flow battery according to claim 9, wherein said second electrolyte further comprises at least one of:
catalytic particles in an amount from 0.001% by weight to 10% by weight of the second electrolyte;
conductive particles selected among graphene, expanded graphite, reduced graphene oxide, active carbon, carbon blacks, acetylene black, carbon nanotubes or a combination of two or more thereof in an overall concentration from 0.01% by weight to 20% by weight of the second electrolyte; or
conductive particles decorated by catalyst particles, wherein the conductive particles are selected among graphene, expanded graphite, reduced graphene oxide, active carbon, carbon blacks, acetylene black, carbon nanotubes or a combination of two or more thereof, and wherein said conductive particles decorated by catalyst particles are present in a concentration from 0.01% by weight to 20% by weight of the second electrolyte.

17. A zinc-polysulfide rechargeable flow battery comprising:
- a first half-cell comprising a first electrolyte containing a source of $Zn^{2+}$ ions and a static or flowable electrode disposed within the first half-cell, said first half-cell being connected in a closed-loop configuration through a first pump to a first external tank containing the first electrolyte;
- a second half-cell comprising a second electrolyte in which polysulfides are dissolved and a static or flowable electrode, disposed within the second half-cell, said second half-cell being connected in a closed-loop configuration through a second pump to a second external tank containing the second electrolyte;
- in the second half-cell, a catalyst on the surface of the static electrode or dispersed in the second electrolyte in the form of particles and
- a separator between the two half-cells,
- wherein said first electrolyte further comprises one or more of:
  - a salt, oxide or hydroxide of one or more metals capable of shifting the zinc electrochemical potential and to increase the overvoltage of hydrogen evolution, selected among Pb, Mn, Sn, Fe, Ni, Cu, Mg, Ti, Co, Al, Li, Zr, in a concentration ranging from 0.001 M to 1 M;
  - a hydrogen evolution suppressor selected among silicates, boric acid, the metals Pb, Bi, Mn, W, Cd, As, Sb, Sn or In, the oxides of said metals, or a combination thereof, in an overall concentration in the range between 0.001 M to 5 M;
  - Rochelle salts in a concentration between 0.001 M and 10 M;
  - a leveling agent selected among polyethylene glycol, polyethyleneimine, thiourea, quaternary ammonium salts, dextrins, cyclodextrins, sucrose, polytetrafluoroethylene, sodium dodecyl sulfate, polyacrylic acid, glucose, cellulose and combinations thereof, with a concentration between 0.0001 ppm to 10000 ppm;
  - a plasticizer additive selected among polyols, ethylene glycol, diethylene glycol, tetraethylene glycol, propylene glycol, glycerol, mannitol, sorbitol, xylitol, monosaccharides, fatty acids, urea, ethanolamine, triethanolamine, vegetable oils, lecithin, waxes, amino acids, surfactants or oleic acid, in a range between 0.1% by weight and 5% by weight of the first electrolyte;
  - a thickener additive in a range between 0.0001% to 10% by weight of the first electrolyte; or
  - an organic additive selected among xanthan gum, gum arabic, carboxymethyl cellulose, chitosan, agar-agar, sodium alginate or polyethylene oxide in an amount between 0.0001% to 10% by weight of the first electrolyte.

18. A zinc-polysulfide rechargeable flow battery comprising:
- a first half-cell comprising a first electrolyte containing a source of $Zn^{2+}$ ions and a static or flowable electrode disposed within the first half-cell, said first half-cell being connected in a closed-loop configuration through a first pump to a first external tank containing the first electrolyte;
- a second half-cell comprising a second electrolyte in which polysulfides are dissolved and a static or flowable electrode, disposed within the second half-cell, said second half-cell being connected in a closed-loop configuration through a second pump to a second external tank containing the second electrolyte;
- in the second half-cell, a catalyst on the surface of the static electrode or dispersed in the second electrolyte in the form of particles and
- a separator between the two half-cells,
- wherein said second electrolyte is selected from the group consisting of:
- A) a second electrolyte further comprising:
  - a solvent selected between water and a water-based mixtures containing at least 40% by volume of water with one or more compounds selected among C1-C4 alcohols, ethylene glycol, acetic acid, glycerol, or a combination of two or more thereof,
  - one or more compounds selected among sodium hydroxide, potassium hydroxide, lithium hydroxide, ammonium hydroxide or bismuth hydroxide, in an overall concentration between 0.01 M and 20 M; and
  - organic and/or inorganic sulfide-based electroactive particles containing sulfide ions and decorated by catalyst particles, in an amount in the range from 0.01% by weight to 50% by weight;
- B) a second electrolyte further comprising:
  - a solvent selected between water and a water-based mixtures containing at least 40% by volume of water with one or more compounds selected among C1-C4 alcohols, ethylene glycol, acetic acid, glycerol, or a combination of two or more thereof;
  - one or more compounds selected among sodium hydroxide, potassium hydroxide, lithium hydroxide, ammonium hydroxide or bismuth hydroxide, in an overall concentration between 0.01 M and 20 M; and
  - organic and/or inorganic sulfide-based electroactive particles containing sulfide ions acting as source of polysulfide ions, in an amount in the range from 0.01% by weight to 50% by weight;
  - and further comprises at least one of:
  - catalytic particles in an amount from 0.001% by weight to 10% by weight of the second electrolyte;
  - conductive particles selected from graphene, expanded graphite, reduced graphene oxide, active carbon, carbon blacks, acetylene black, carbon nanotubes or a combination of two or more thereof in an overall concentration from 0.01% by weight to 20% by weight of the second electrolyte; or
  - conductive particles decorated by catalyst particles, wherein the conductive particles are selected among graphene, expanded graphite, reduced graphene oxide, active carbon, carbon blacks, acetylene black, carbon nanotubes or a combination of two or more thereof, and wherein said conductive particles decorated by catalyst particles are present in a concentration from 0.01% by weight to 20% by weight of the second electrolyte;
- C) a second electrolyte further comprising one or more of:
  - a plasticizer additive selected among polyols, ethylene glycol, diethylene glycol, tetraethylene glycol, propylene glycol, glycerol, mannitol, sorbitol, xylitol, monosaccharides, fatty acids, urea, ethanolamine, triethanolamine, vegetable oils, lecithin, waxes, amino acids, surfactants or oleic acid, in a range between 0.1% by weight and 5% by weight of the second electrolyte;
  - a thickener additive in a range between 0.0001% to 10% by weight of the first electrolyte; or
  - an organic additive selected among xanthan gum, gum arabic, carboxymethyl cellulose, chitosan, agar-agar, sodium alginate or polyethylene oxide in an amount between 0.0001% to 10% by weight of the first electrolyte.

19. Zinc-polysulfide rechargeable flow battery according to claim 18, wherein the second electrolyte is selected from (A) and further comprises at least one of:
- catalytic particles in an amount from 0.001% by weight to 10% by weight of the second electrolyte;
- conductive particles selected among graphene, expanded graphite, reduced graphene oxide, active carbon, carbon blacks, acetylene black, carbon nanotubes or a combination of two or more thereof in an overall concentration from 0.01% by weight to 20% by weight of the second electrolyte; or
- conductive particles decorated by catalyst particles, wherein the conductive particles are selected among graphene, expanded graphite, reduced graphene oxide, active carbon, carbon blacks, acetylene black, carbon nanotubes or a combination of two or more thereof, and wherein said conductive particles decorated by catalyst particles are present in a concentration from 0.01% by weight to 20% by weight of the second electrolyte.

* * * * *